United States Patent
Yasui et al.

(10) Patent No.: US 7,340,336 B2
(45) Date of Patent: Mar. 4, 2008

(54) PLANT CONTROL SYSTEM

(75) Inventors: Yuji Yasui, Wako (JP); Kanako Shimojo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 752 days.

(21) Appl. No.: 10/864,552

(22) Filed: Jun. 10, 2004

(65) Prior Publication Data

US 2004/0260412 A1 Dec. 23, 2004

(30) Foreign Application Priority Data

| Jun. 13, 2003 | (JP) | ............................. 2003-168727 |
| Jun. 18, 2003 | (JP) | ............................. 2003-173934 |
| Dec. 17, 2003 | (JP) | ............................. 2003-419798 |

(51) Int. Cl.
*G06F 17/00* (2006.01)

(52) U.S. Cl. .................... 701/67; 701/112; 60/284

(58) Field of Classification Search ................ 701/25, 701/67, 110–113, 208; 123/339.2, 352; 700/55, 700/86; 60/284, 285
See application file for complete search history.

(56) References Cited

U.S. PATENT DOCUMENTS

| 7,260,463 B2 * | 8/2007 | Yasui et al. .................... 701/67 |
| 2003/0033075 A1 | 2/2003 | Yasui et al. | |

FOREIGN PATENT DOCUMENTS

| EP | 1 315 054 A | 5/2003 |
| EP | 1 318 438 A | 6/2003 |
| JP | 7-121209 | 5/1995 |
| JP | 7-121209 A | 5/1995 |
| JP | 2000-110657 | 4/2000 |
| JP | 2002-318605 | 10/2002 |
| JP | 2002-341905 | 11/2002 |
| WO | WO 98/43025 A | 10/1998 |

* cited by examiner

*Primary Examiner*—Gertrude A. Jeanglaude
(74) *Attorney, Agent, or Firm*—Arent Fox LLP

(57) ABSTRACT

A plant control system using response specifying control that makes it possible to independently set a follow-up behavior for an output value of a plant when a target output value of the plant changes and a convergent behavior for a difference between a target output value and an output value when the output value of the plant changes. The control system has a controller for determining a clutch stroke on the basis of a model equation of a clutch device such that a target rotational speed and an actual rotational speed of the clutch device coincide with each other. The controller includes a target value filter for carrying out filtering computation on a target rotational speed to calculate a filtering target value that converges to the target rotational speed with a response delay, and a response specifying control unit that determines the clutch stroke by response specifying control such that the filtering target value and the clutch rotational speed coincide with each other.

20 Claims, 41 Drawing Sheets

[NC/a1base MAP]

[Pcl/b1base MAP]

(a) 2ND GEAR IN USE (b) DISENGAGE 2ND GEAR (c) SELECT 3RD GEAR (d) SHIFT TO 3RD GEAR

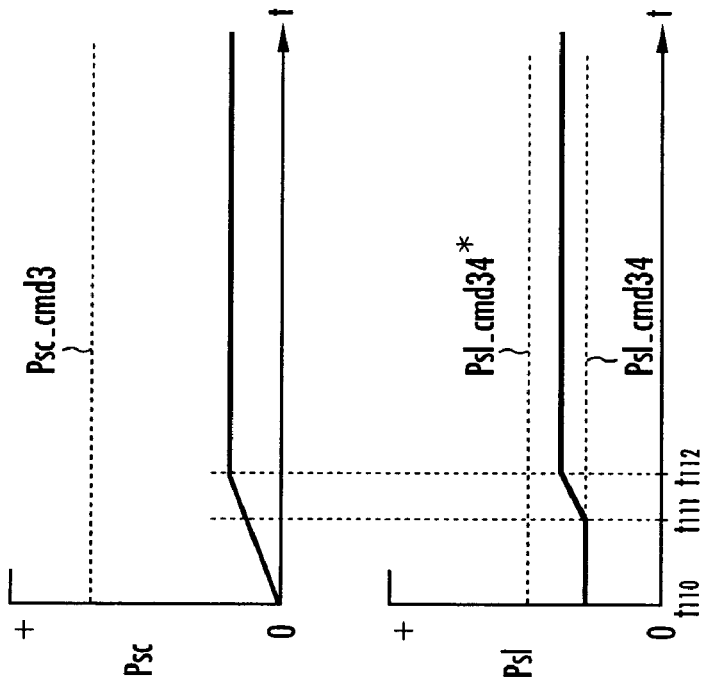
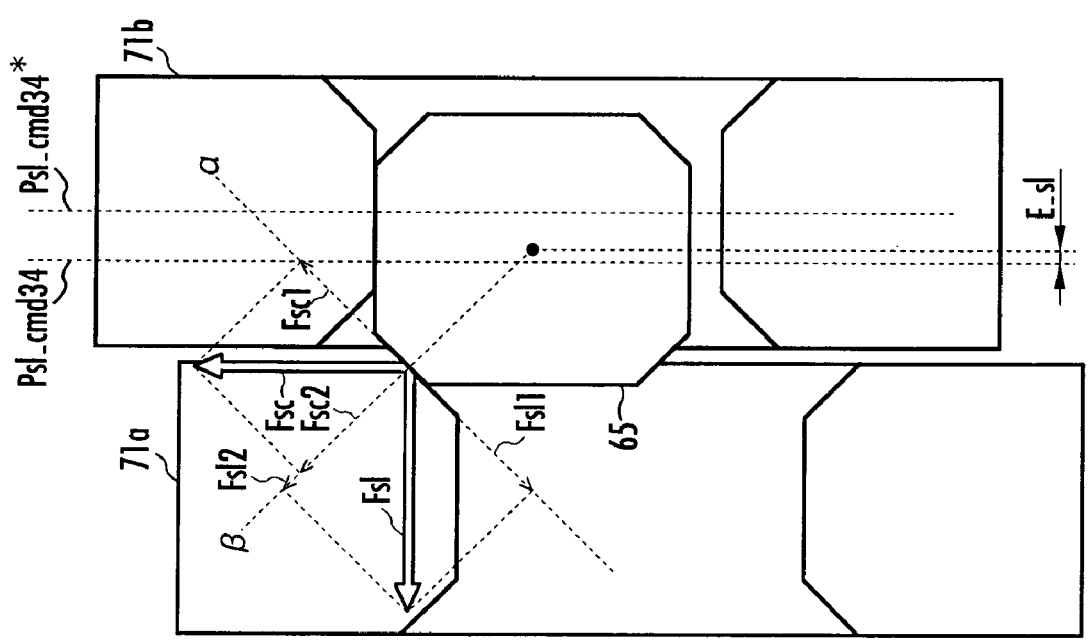
FIG. 32 (a)
FIG. 32 (b)

PLANT CONTROL SYSTEM

BACKGROUND OF THE INVENTION

1. Field of the Invention

The present invention relates to a system for controlling outputs of a plant, which is to be controlled, by adopting response specifying control.

2. Description of the Related Art

As a system for controlling outputs of a plant, which is to be controlled, by using response specifying control, there has been proposed, for example, a throttle valve control apparatus adapted to adjust the degree of opening of a throttle valve provided in an intake passage of an engine by using sliding mode control (Japanese Laid-Open Patent Publication No. 2002-318605).

The throttle valve control apparatus corrects a model parameter in a model equation of a throttle valve drive mechanism by an identifying error, i.e., a deviation from a model parameter reference value. This makes it possible to reduce a modeling error or disturbance influences in determining a manipulated variable of the throttle valve drive mechanism.

In making an output value of a plant follow a target output value, a difference between the output value and the target output value is produced due to two major causes, one being a change in the target output value and the other being a change in the output value caused by disturbance or the like. There has been a demand for achieving quicker convergence of a difference caused by a change in an output value and for slow convergence of a difference caused by a change in a target output value with some delay so as to stabilize the behavior of the plant.

In the aforesaid throttle valve control system, a convergent behavior for a difference between a target value and an actual value of the degree of opening of the throttle valve is determined by an arithmetic coefficient of a switching function in a sliding mode. For this reason, the convergent behavior for the difference caused by a change in a target output value and the convergent behavior for the difference caused by a change in an output value are inevitably set in an associated manner and cannot be set independently, thus failing to respond to the aforesaid demand.

SUMMARY OF THE INVENTION

The present invention has been made with a view toward solving the problem described above, and it is an object of the present invention to provide a control system employing response specifying control that makes it possible to independently set a follow-up behavior for an output value with respect to a target output value when the target output value of a plant changes and a convergent behavior for a difference between a target output value and an output value caused by a change in an output value of the plant. The present invention relates to an improvement in a plant control system for determining a control input value for the plant such that an output value of the plant coincides with a target output value.

According to a first aspect of the present invention, there is provided a plant control system, including a filtering device for carrying out predetermined filtering computation on a target output value to calculate a filtering target value that converges to the target output value with a response delay, and control input determiner that uses response specifying control that allows a convergent behavior for a difference between the filtering target value and the output value of the plant to be variably specified so as to calculate a reaching law input based on a switching function value that defines the convergent behavior for the difference, thereby determining a control input value to be supplied to the plant on the basis of the reaching law input.

With this arrangement, changing a specification of the aforesaid filtering process makes it possible to independently set the convergent behavior for a difference between a target output value and an output value of the plant when the target output value changes. Furthermore, changing a specification of the switching function makes it possible to independently set a convergent behavior for a difference between an output value and the target output value when the output value of the plant changes due to disturbance.

Preferably, the control input determiner calculates an equivalent control input in the response specifying control on the basis of the filtering target value and the output value of the plant, and determines a control input value for the plant on the basis of the equivalent control input.

This arrangement makes it possible to improve the accuracy of a follow-up behavior of an output of the plant with respect to the target output value by determining a control input value for the plant on the basis of the equivalent control input.

Preferably, the control input determiner calculates an adaptation law input in the response specifying control based on the switching function value and determines a control input value for the plant on the basis of the adaptation law input.

With this arrangement, determining a control input value for the plant on the basis of the equivalent control input and the adaptation law input makes it possible to enhance convergence of a difference between the target output value and an output value of the plant attributable to a modeling error of the plant and disturbance applied to the plant. Moreover, determining a control input for the plant on the basis of the reaching law input and the equivalent control input and the adaptation law input makes it possible to improve the accuracy of follow-up behavior for an output of the plant with respect to a change in the target output value and also the accuracy of a convergent behavior for a difference between the target output value and an output value of the plant caused by disturbance.

Preferably, a convergent speed of the difference between the filtering target value and the output value of the plant that is specified by the switching function is set to be higher than a speed at which the filtering target value specified in the filtering computation converges to the target output value.

With this arrangement, the convergent speed for a difference between the target output value defined by the switching function and an output value of the plant that is specified by the switching function is set to be relatively higher than a speed at which the filtering target value defined by the filtering computation converges to the target output value. This makes it possible to specify a convergent speed for a difference between the target output value and an output of the model by means of the switching function further independently from specifying a speed at which an output value of the plant converges to the target output value by the filtering computation.

Preferably, the plant control system further includes an identifier for identifying a model parameter for setting a model equation of the plant on the basis of the control input value for the plant and the output value of the plant, wherein the control input determiner determines the control input value for the plant by using the model parameter identified by the identifying device.

With this arrangement, even if dynamic characteristics of the plant changes or if the plant has individual variations, the accuracies of a follow-up behavior for an output value of the plant with respect to a change in the target output value and a convergent behavior for a difference between the target output value and an output value of the plant caused by disturbance can be maintained.

Preferably, the plant control system further includes a storing device that stores data of a correlation map showing a correlation between output values of the plant and reference values of the model parameter that changes according to the output values, wherein the identifier modifies the reference values determined by applying output values of the plant to the correlation map on the basis of the control input values for the plant and output values of the plant so as to identify the model parameters.

With this arrangement, even if an abrupt change occurs in the dynamic characteristics of the plant, the reference value based on the change can be determined according to the correlation map, and the model parameter is identified by carrying out corrective computation on the reference value. Hence, even if the dynamic characteristics of the plant abruptly change, a control input value for the plant is stably and quickly determined, making it possible to maintain the accuracy of the follow-up behavior of an output value of the plant in response to a change in the target output value, and the accuracy of the convergent behavior for a difference between the target output value and an output value of the plant caused by disturbance.

Preferably, the model equation of the plant is set using a plurality of the model parameters, and some of a plurality of the model parameters are used as identifying model parameters for identification, and the identifying device identifies the identifying model parameter so as to minimize a difference between an output of a virtual plant that outputs an equation comprised of a component term other than a component term related to the identifying model parameter of the model equation and an output of a model equation of the virtual plant comprised of a component term related to the identifying parameter of the model equation.

This arrangement allows only some of the plurality of model parameters to be easily identified. Limiting the number of model parameters to be identified shortens the time required for identification, so that a control cycle can be set to be shorter, permitting improved controllability.

Preferably, the plant control system further includes an estimator for estimating a level of disturbance applied to the plant, wherein the control input determiner uses the level of disturbance estimated by the estimator to calculate the equivalent control input.

With this arrangement, when disturbance is applied to the plant, the equivalent control input is calculated on the basis of a level of the disturbance estimated by the estimator. Thus, influences of disturbance applied to the plant can be promptly restrained, allowing stability against disturbance to be improved.

Preferably, the plant comprises a transmission having a plurality of speed stages, a shift arm provided on the transmission establishes each predetermined speed stage by being displaced from a neutral position by a shifting operation, the output of the plant comprises a position of the shift arm, and the control input to the plant comprises the control input for an actuator that moves the shift arm.

This arrangement makes it possible to separately set a capability of follow-up for a target position of the shift arm in a shifting operation of the shift arm and a capability of compensating for a modeling error and disturbance. Thus, the follow-up capability and the compensating capability can be set so as to restrain overshoots or vibration of the shift arm with respect to a target position, making it possible to restrain prolongation of convergent time for a target position.

Preferably, the plant comprises a selecting mechanism of a transmission having a plurality of speed stages, a shift arm provided on the transmission selectively engages, by a selecting operation, with a shift piece fixed to each shift fork for the plurality of speed stages, a shift fork corresponding to the selectively engaged shift piece is displaced by the shifting operation from the neutral position to establish each predetermined speed stage, the output of the plant comprises a position of the shift arm in the selecting direction, and the control input for the plant comprises a control input for a selecting actuator for moving the shift arm in the selecting direction.

With this arrangement, the time required for identifying the identifying model parameters in the selecting operation of the selecting mechanism is shortened, so that a control cycle of the selecting actuator can be set to be shorter to improve the controllability of the selecting actuator.

Preferably, the model equation of the plant expresses a position of the shift arm in the selecting direction at each predetermined control cycle by a positional component term related to a selecting direction of the shift arm in a previous control cycle, a control input component term related to a control input for the selecting actuator in the previous control cycle, and a disturbance component term, a plurality of the model parameters comprise coefficients of the position component term and the control input component term and the disturbance component term, and a coefficient of the control input component term and the disturbance component term are taken as the identifying model parameters.

With this arrangement, a coefficient of the control input component term closely connected to changes in the dynamic characteristics of the selecting mechanism of the transmission and the disturbance component term are taken as the identifying model parameters. This makes it possible to promptly compensate for disturbance if the disturbance is produced by a change in dynamic characteristics of the selecting mechanism. It is possible, therefore, to restrain prolongation of the time required for the selecting operation caused by disturbance.

If a plant to be controlled has a dead time characteristic, then it is further required to secure stability and adaptation of the control system against the dead time. Accordingly, an object of a second aspect of the present invention is to provide a control system with enhanced stability against a dead time characteristic of a plant.

According to the second aspect of the present invention, there is provided a plant control system equipped with a filtering device for carrying out predetermined filtering computation on the target output value to calculate a filtering target value that converges to the target output value with a response delay, an output predictor for calculating an output predicted value that predicts an output value of the plant after elapse of a dead time of the plant on the basis of an output value of the plant and the control input value, and control input determiner that uses response specifying control that allows a convergent behavior for a difference between the filtering target value and the output predicted value to be variably specified so as to calculate a reaching law input based on a switching function value that defines the convergent behavior for the difference, thereby determining a control input for the plant on the basis of the reaching law input.

With this arrangement, the output predictor calculates the output predicted value predicting an output value of the plant after the elapse of the dead time of the plant, and the control input determiner determines a control input for the plant such that the output predicted value follows the filtering target value. This makes it possible to restrain influences of the dead time of the plant and therefore to maintain good follow-up of the output of the plant with respect to the target output value and good convergence of a difference between the output value of the plant and the target output value caused by disturbance or the like.

In addition, by changing the filtering specification, it is possible to independently set the convergent behavior for a difference between the target output value and the output value of the plant when a target output value changes. Moreover, by changing the specification of the switching function, it is possible to independently set the convergent behavior for a difference between the output value and the target output value when an output value of the plant changes due to disturbance.

Preferably, the control input determiner calculates an equivalent control input in the response specifying control on the basis of the filtering target value and the output predicted value, and determines the control input value for the plant on the basis of the equivalent control input.

With this arrangement, the accuracy of a follow-up behavior for the plant output with respect to the target output value can be improved by determining a control input value for the plant on the basis of the equivalent control input.

Preferably, the control input determiner calculates an adaptation law input in the response specifying control based on the switching function value and determines a control input value for the plant on the basis of the adaptation law input.

With this arrangement, the convergence of a difference between the target output value and the plant output value caused by a modeling error of the plant or disturbance applied to the plant can be improved by determining a control input value for the plant on the basis of the equivalent control input and the adaptation law input. Furthermore, determining a control input for the plant on the basis of the reaching law input, the equivalent control input, and the adaptation law input makes it possible to improve the accuracy of follow-up behavior for an output of the plant with respect to a change in the target output value and also the accuracy of a convergent behavior for a difference between the target output value and an output value of the plant caused by disturbance.

Preferably, a convergent speed for the difference between the filtering target value and the output predicted value that is specified by the switching function is set to be higher than a speed at which the filtering target value specified by the filtering computation converges to the target output value of the filtering target value.

With this arrangement, a convergent speed of the difference between the target output value defined by the switching function and the plant output value is set to be relatively higher than a speed at which the filtering target value specified by the filtering computation converges to the target output value of the filtering target value. This makes it possible to specify a convergent speed for a difference between the target output value based on the switching function and an output of the model further independently from specifying a speed at which an output value of the plant obtained by the filtering computation converges to the target output value.

Preferably, the plant control system further includes an identifier for identifying a model parameter for setting a model equation of the plant on the basis of the control input value for the plant and the output value of the plant, and the control input determiner determines a control input value for the plant by using the model parameter identified by the identifier.

This arrangement makes it possible to maintain the accuracy of the follow-up behavior of the output value of the plant with respect to a change in the target output value and the accuracy of the convergent behavior for a difference between the target output value and the plant output value caused by disturbance.

Preferably, the plant control system further includes a storage that stores data of a correlation map showing a correlation between the output values of the plant and the reference values of the model parameter that change according to the output values, and the identifier modifies the reference values determined by applying the output values of the plant to the correlation map on the basis of the control input values for the plant and output values of the plant so as to identify the model parameters.

With this arrangement, even if an abrupt change occurs in the dynamic characteristics of the plant, the reference value based on the change can be determined according to the correlation map, and the model parameter is identified by carrying out corrective computation on the reference value. Hence, even if the dynamic characteristics of the plant abruptly change, a control input value for the plant is stably and quickly determined, making it possible to maintain the accuracy of the follow-up behavior of an output value of the plant with respect to a change in the target output value and the accuracy of the convergent behavior for a difference between the target output value and the plant output value caused by disturbance.

Preferably, the plant control system further includes an estimator for estimating a level of disturbance applied to the plant, and the control input determiner uses the level of disturbance estimated by the estimator to calculate the equivalent control input.

With this arrangement, when disturbance is applied to the plant, the equivalent control input is calculated on the basis of a level of the disturbance estimated by the estimator. Hence, stability against disturbance can be improved by promptly restraining influences of disturbance applied to the plant.

According to the first or second aspect of the present invention, the plant comprises a transmission mechanism for transmitting motive power to a driven shaft from a drive shaft through the intermediary of a clutch, and includes an actuator for actuating at least one of a clutch disc of a drive shaft and a clutch disc of a driven shaft so as to change a distance between the clutch disc of the drive shaft and the clutch disc of the driven shaft, and the output value of the plant comprises a rotational speed of the driven shaft and a control input value for the plant comprises the distance between the clutch disc of a drive shaft and a clutch disc of the driven shaft.

With this arrangement, the slip rate of the clutch can be smoothly controlled by adjusting the distance between the clutch disc of the drive shaft and the clutch disc of the driven shaft. This restrains driving forces from becoming vibrant when transmitted from the drive shaft to the driven shaft, thus permitting accurate control of the convergent behavior for an actual rotational speed in response to a change in a target rotational speed of the driven shaft and accurate control of the convergent behavior for a difference between a target rotational speed and an actual rotational speed of the driven shaft caused by disturbance.

Moreover, according to the second aspect of the present invention, the slip rate of the clutch can be smoothly controlled by restraining influences of the dead time of the actuator and by adjusting the distance between the clutch disc of the drive shaft and the clutch disc of the driven shaft.

According to the first or second aspect of the present invention, the plant comprises an internal combustion engine having an intake air volume adjustor for adjusting an intake air volume, the output value of the plant comprises a rotational speed of the internal combustion engine, and the control input value for the plant comprises a manipulated variable for the intake air volume adjustor.

With this arrangement, the air intake volume of the internal combustion engine can be smoothly adjusted by the intake air volume adjustor. This makes it possible to prevent an actual rotational speed from overshooting a target rotational speed of the internal combustion engine or prevent the rotational speed of the internal combustion engine from significantly changing due to disturbance, thus permitting accurate control of the convergent behavior of the actual rotational speed of the internal combustion engine in response to a change in a target rotational speed and the convergent behavior of a difference between a target rotational speed and an actual rotational speed of the internal combustion engine caused by disturbance.

According to the second aspect of the present invention, the air intake volume of the internal combustion engine can be smoothly adjusted by the intake air volume adjustor by restraining influences of dead time of the internal combustion engine.

BRIEF DESCRIPTION OF THE DRAWINGS

FIGS. 32A and 32B are explanatory diagrams of the shifting operation in an automated manual transmission;

DESCRIPTION OF THE PREFERRED EMBODIMENTS

First Embodiment

Figure 1:
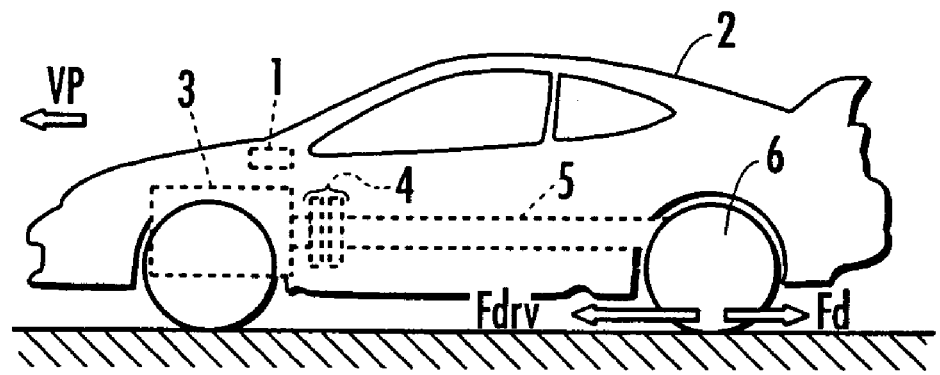
FIGS. 1A and 1B are block diagrams of a vehicle provided with a controller, which is a plant control system in accordance with the present invention.
Figure 1:
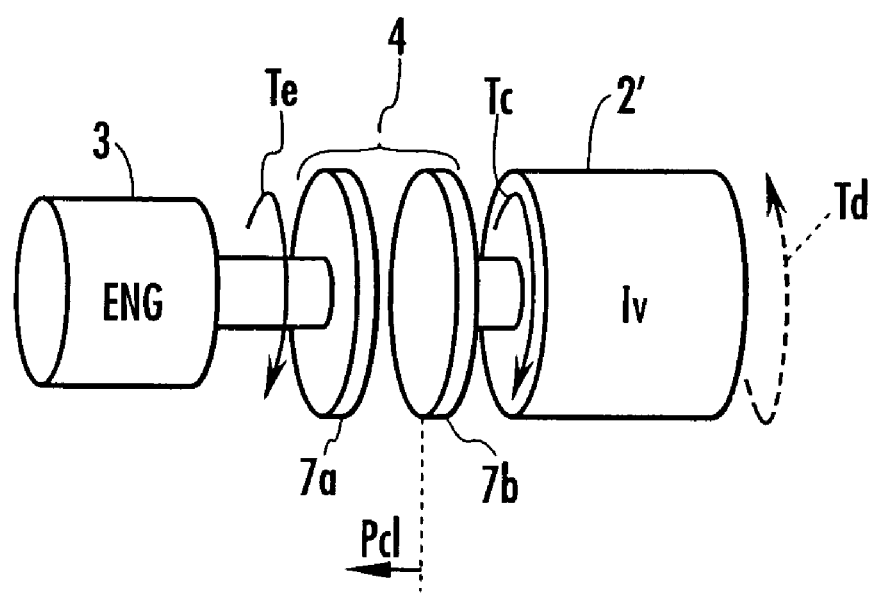
Figure 2:
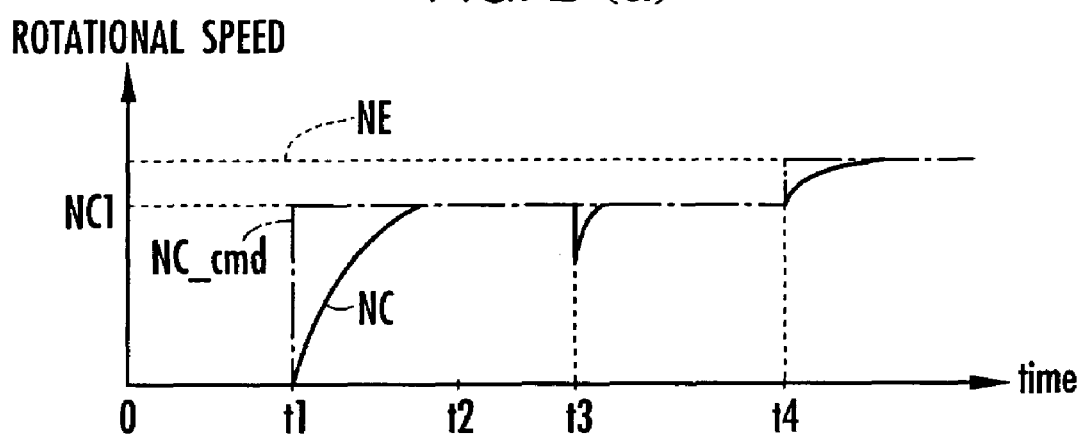
FIGS. 2A and 2B are explanatory diagrams of modeling of a transmission mechanism shown in FIGS. 1A and 1B.
Figure 2:
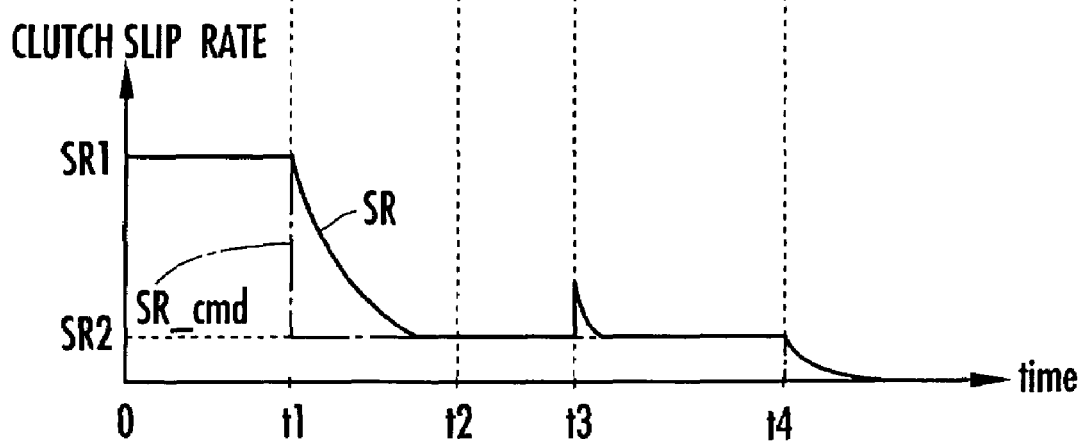
Figure 3:
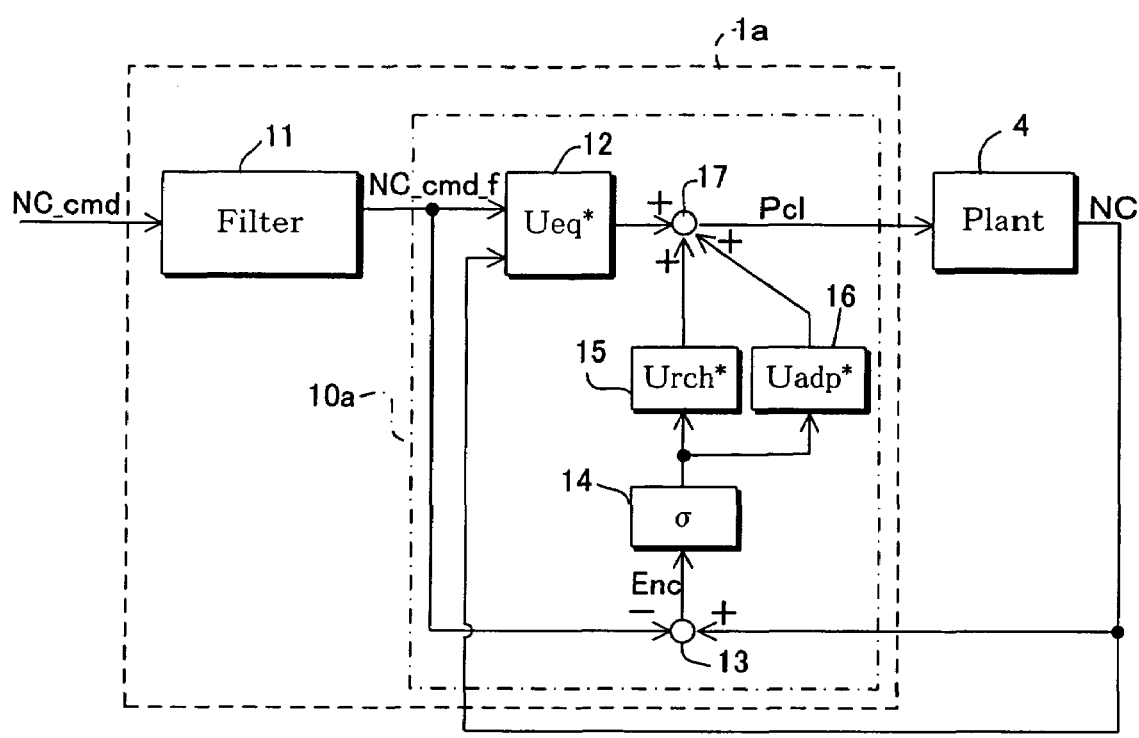
FIG. 3 is a control block diagram of a first construction example of the controller shown in FIG. 1.
Figure 4:
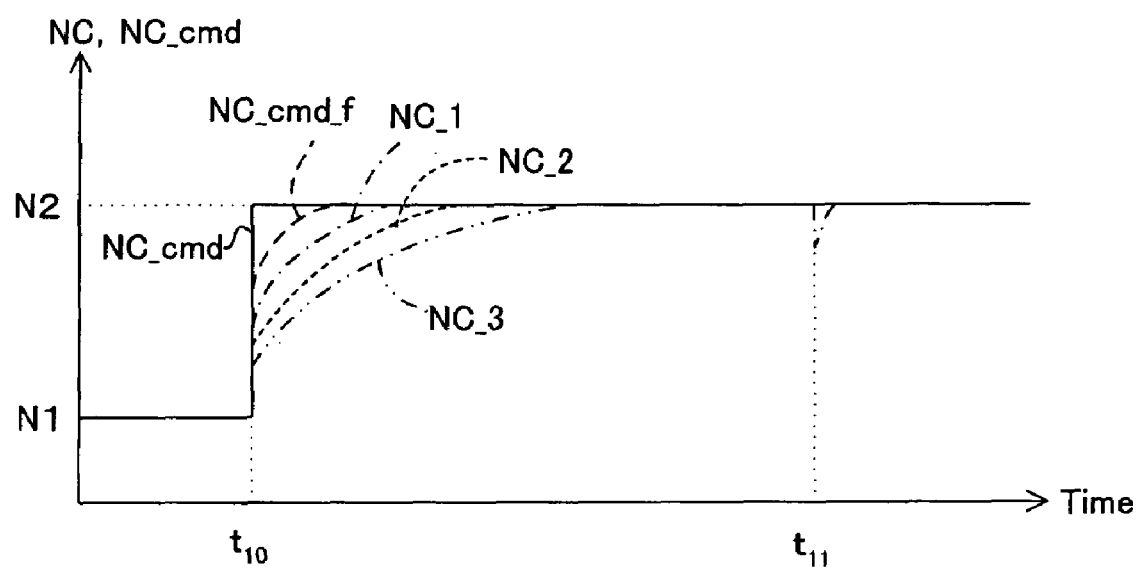
FIG. 4 is a time series graph explaining an operation of the controller.
Figure 5:
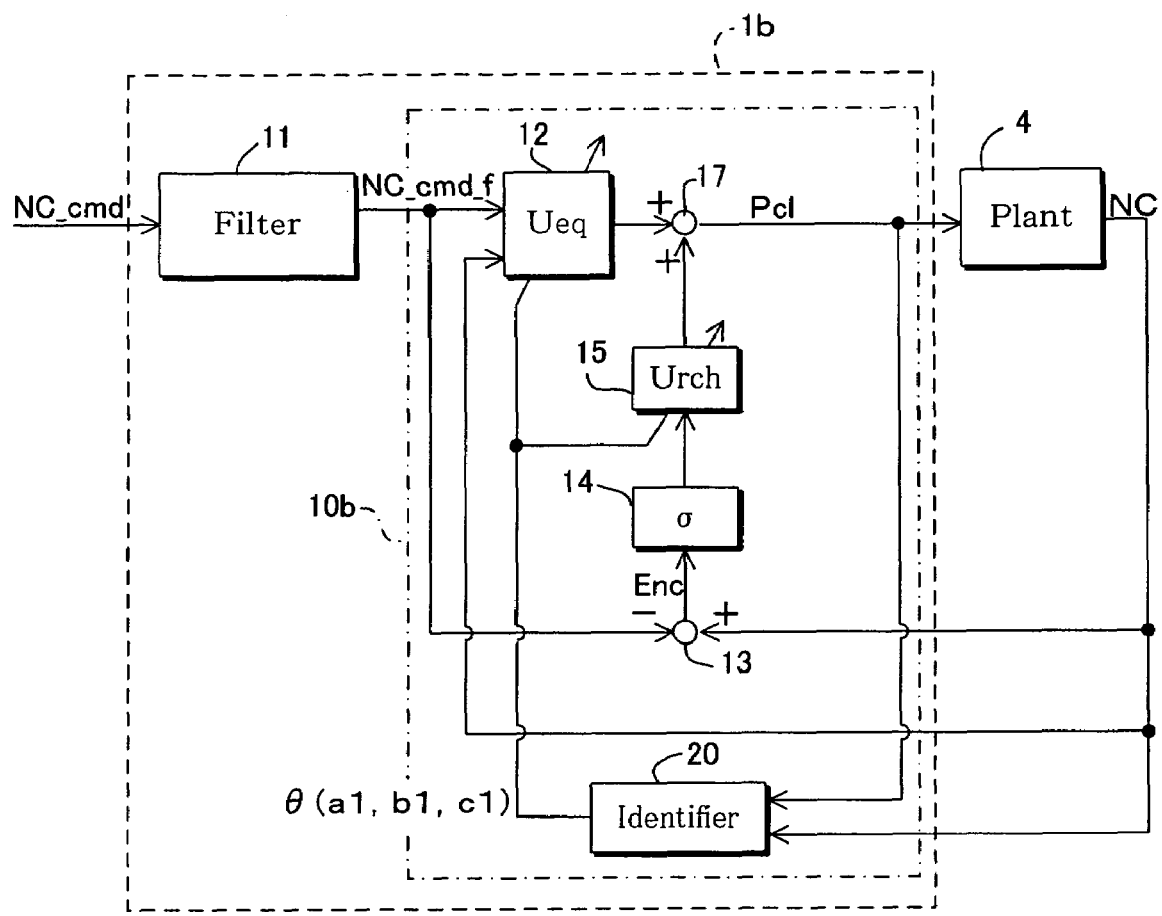
FIG. 5 is a control block diagram of a second construction example of the controller shown in FIGS. 1A and 1B.
Figure 6:
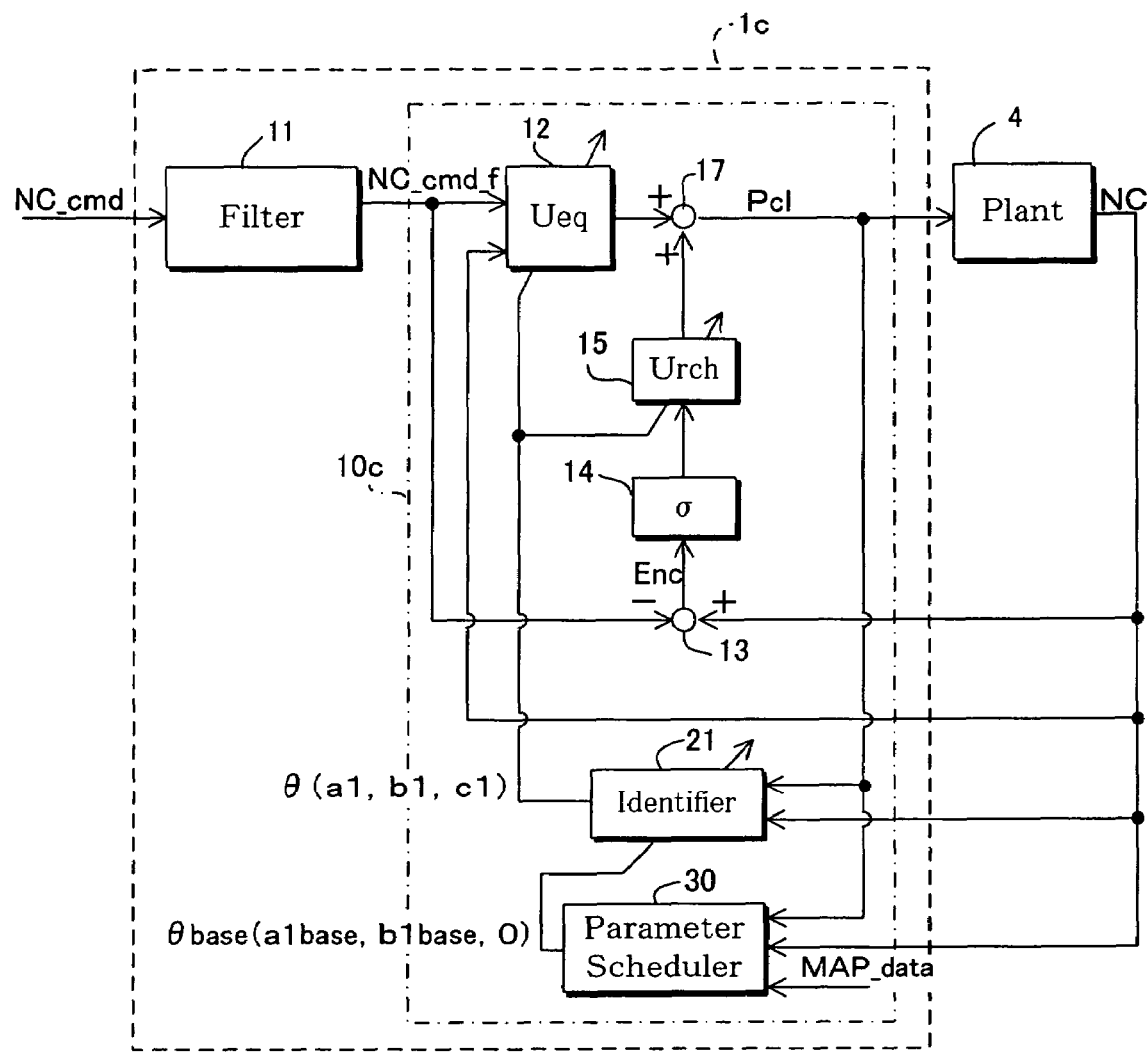
FIG. 6 is an explanatory diagram of a map prepared for determining reference parameters.
Figure 7A:
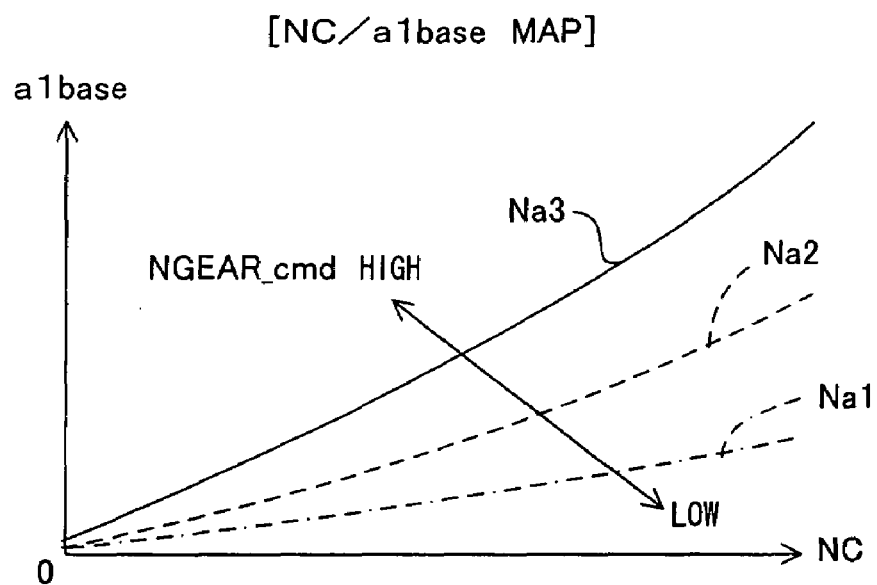
FIGS. 7A and 7B are control block diagrams of a third construction example of the controller shown in FIGS. 1A and 1B.
Figure 7B:
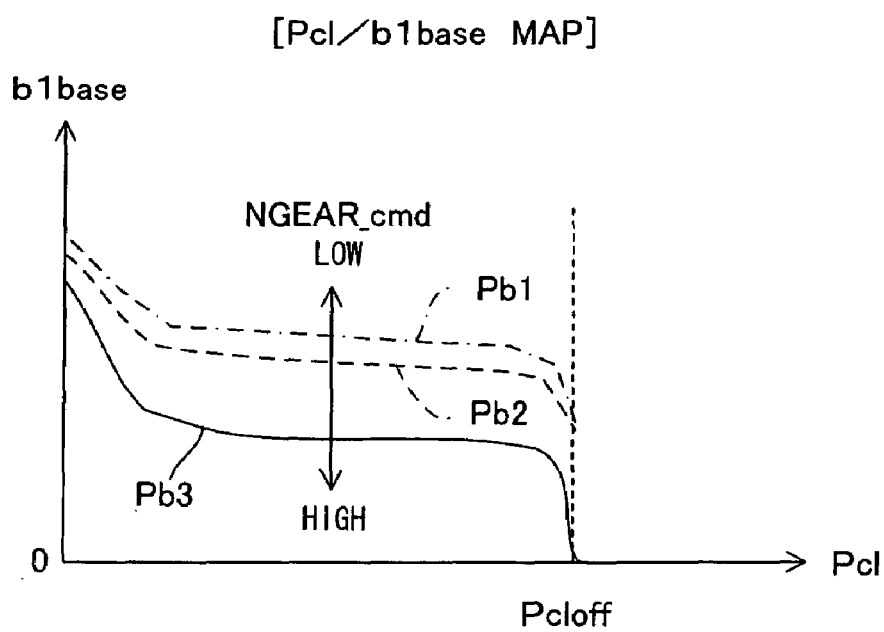
Figure 8:
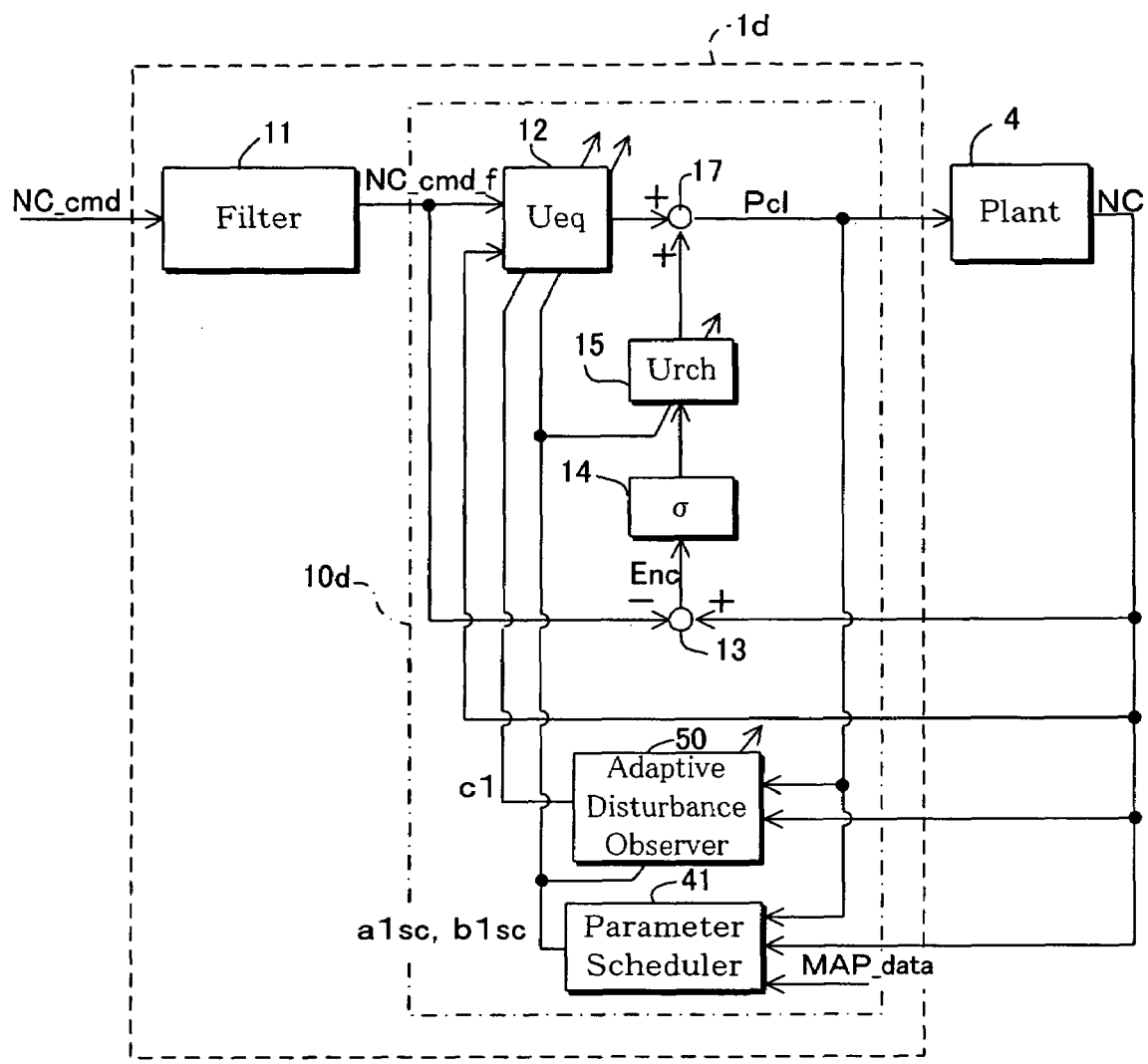
FIG. 8 is a control block diagram of a fourth construction example of the controller shown in FIGS. 1A and 1B.
Figure 9:
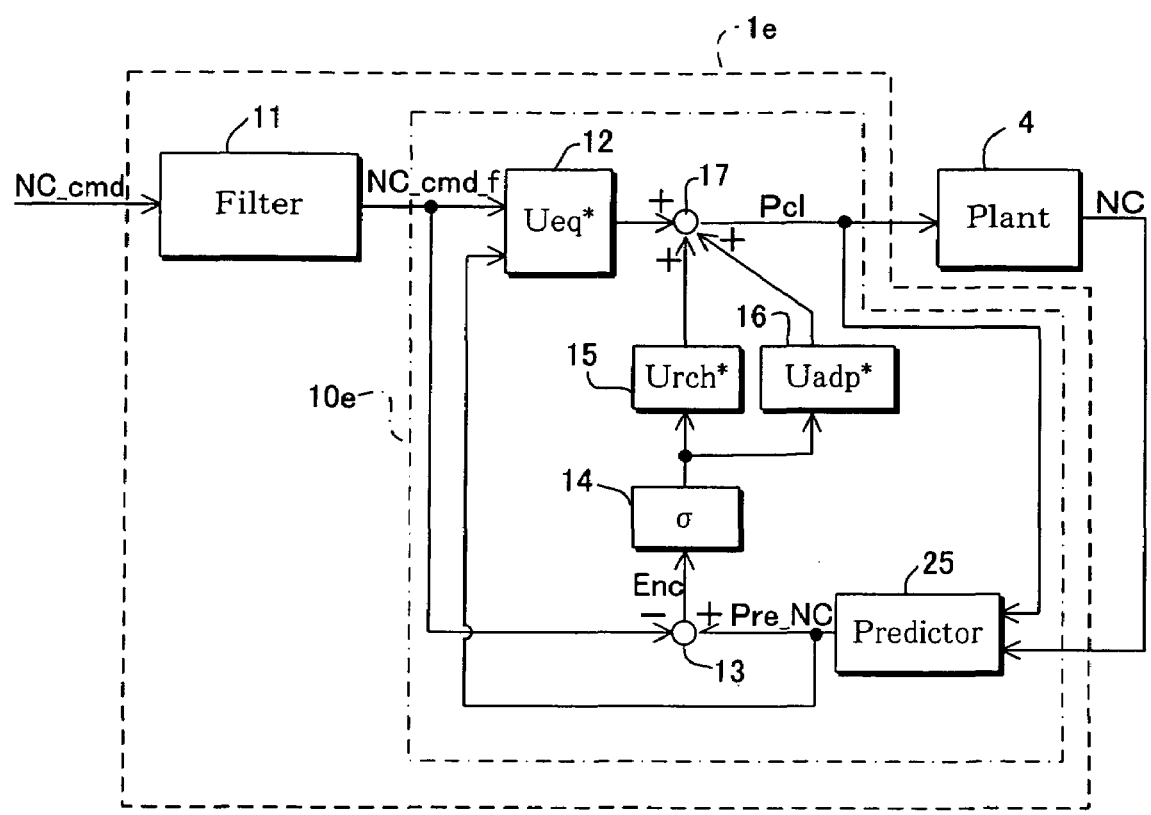
FIG. 9 is a control block diagram of a fifth construction example of the controller shown in FIGS. 1A and 1B.
Figure 10:
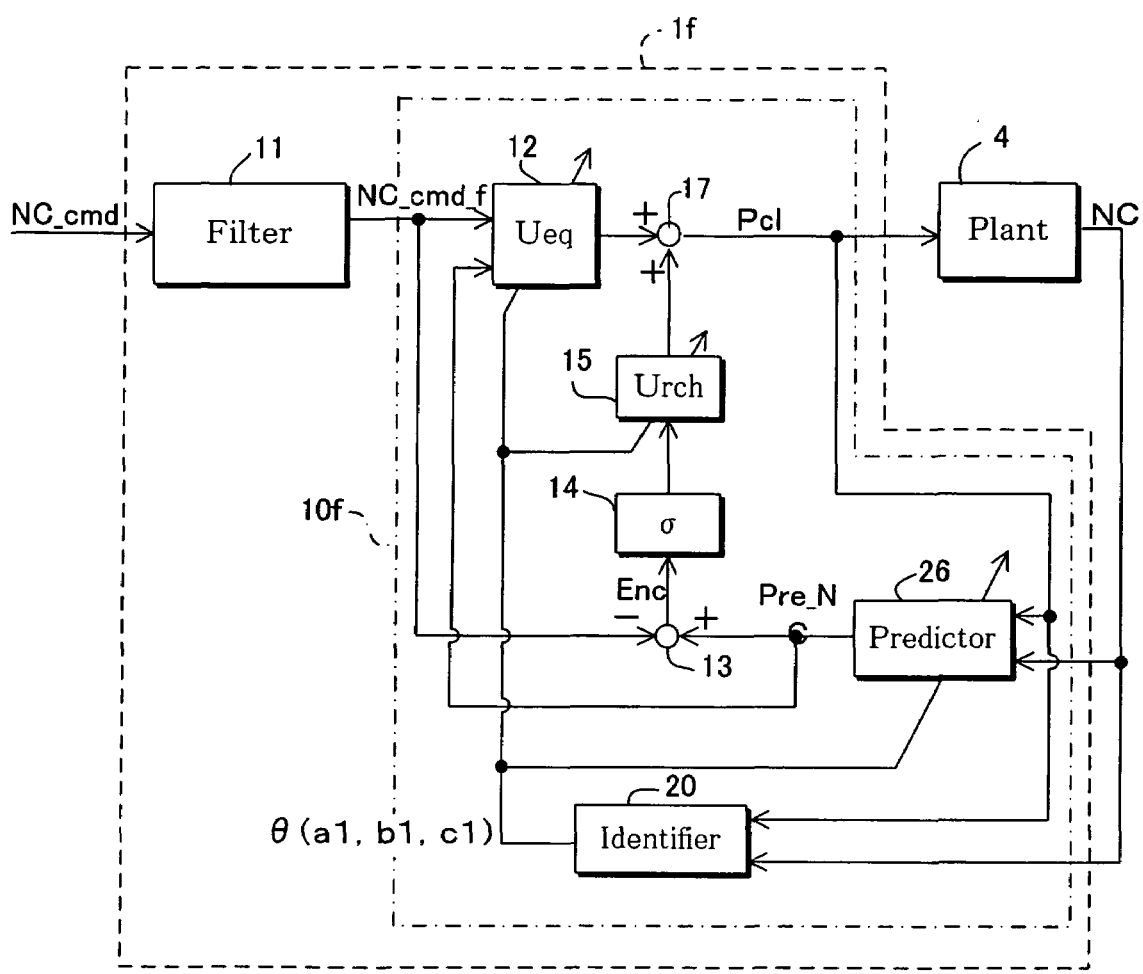
FIG. 10 is a control block diagram of a sixth construction example of the controller shown in FIGS. 1A and 1B.
Figure 11:
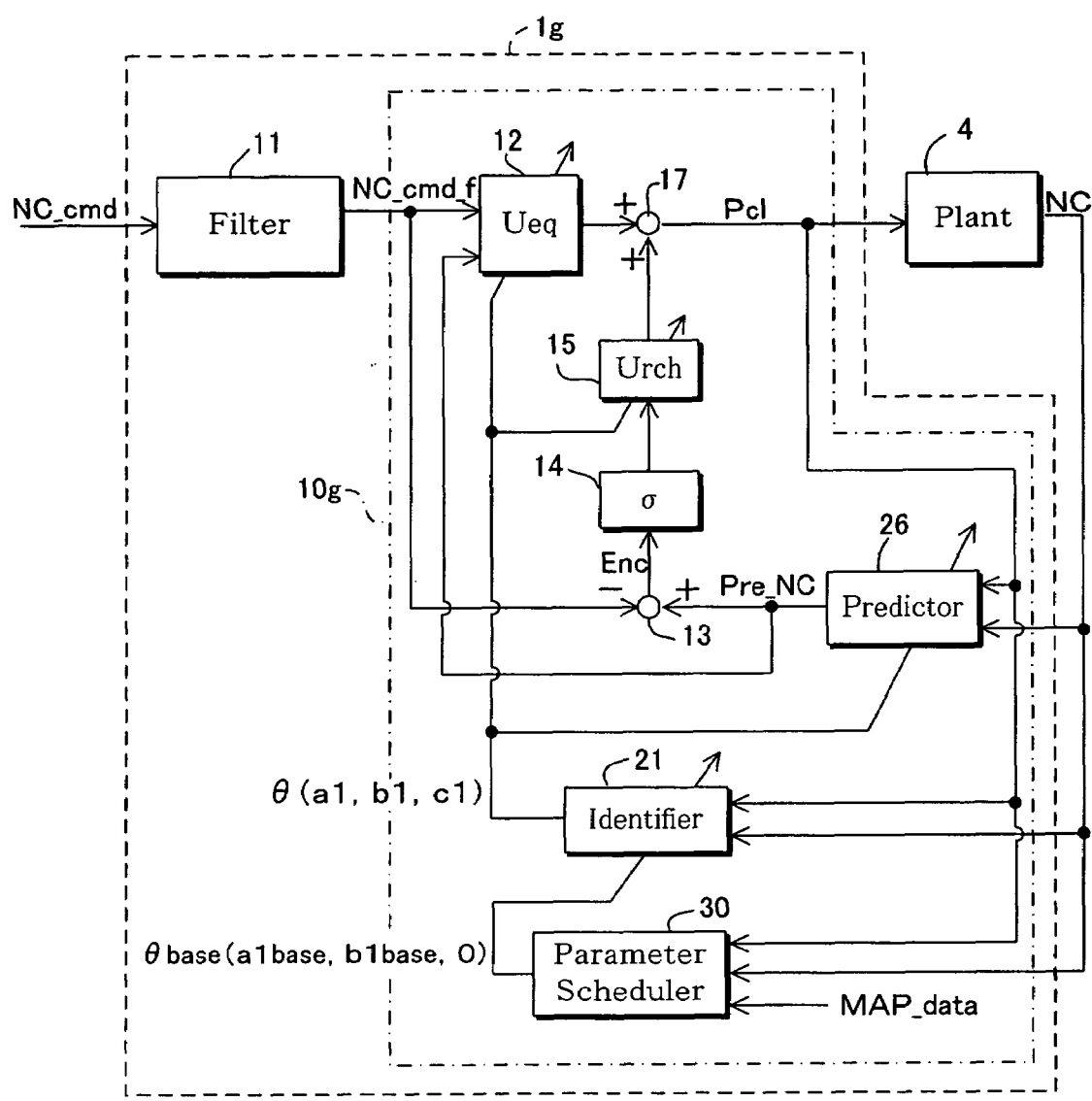
FIG. 11 is a control block diagram of a seventh configuration example of the controller shown in FIGS. 1A and 1B.
Figure 12:
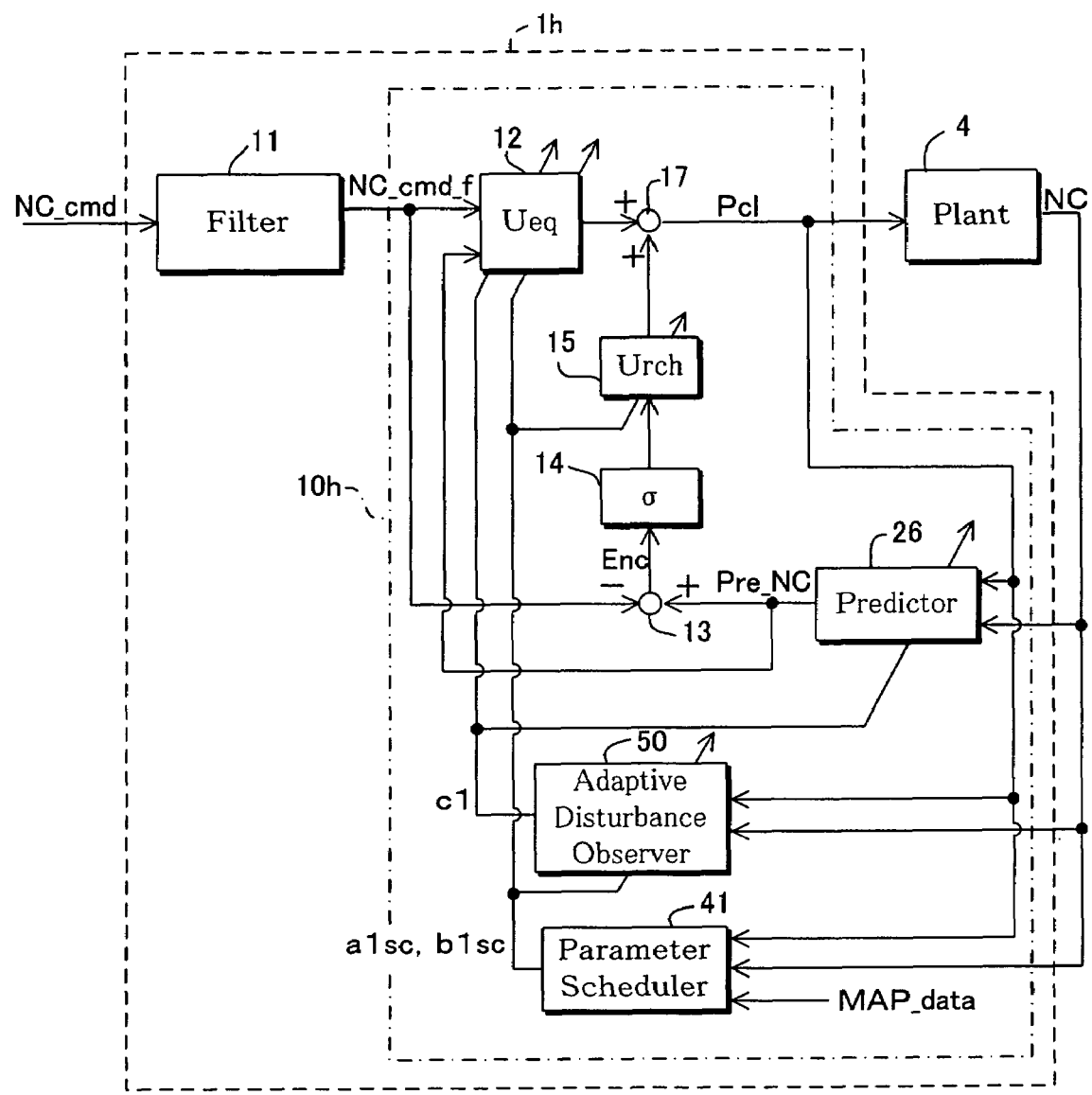
FIG. 12 is a control block diagram of an eighth configuration example of the controller shown in FIGS. 1A and 1B.

Referring to FIG. 1 to FIG. 18, a first embodiment of the present invention will be described. FIGS. 1A and 1B are block diagrams of a vehicle provided with a controller, which is a plant control system in accordance with the present invention. FIGS. 2A and 2B are explanatory diagrams of modeling of a transmission mechanism shown in FIGS. 1A and 1B. FIG. 3 is a control block diagram of a first construction example of the controller shown in FIG. 1, and FIG. 4 is a time series graph explaining an operation of the controller. FIG. 5 is a control block diagram of a second construction example of the controller shown in FIGS. 1A and 1B, and FIG. 6 is an explanatory diagram of a map prepared for determining reference parameters. FIGS. 7A and 7B are control block diagrams of a third construction example of the controller shown in FIGS. 1A and 1B. FIG. 8 is a control block diagram of a fourth construction example of the controller shown in FIGS. 1A and 1B. FIG. 9 is a control block diagram of a fifth construction example of the controller shown in FIGS. 1A and 1B, and FIG. 10 is a control block diagram of a sixth construction example of the controller shown in FIGS. 1A and 1B. FIG. 11 is a control block diagram of a seventh configuration example of the controller shown in FIGS. 1A and 1B, and FIG. 12 is a control block diagram of an eighth configuration example of the controller shown in FIGS. 1A and 1B. FIG. 13 through FIG. 17 show operation flowcharts of the controller. FIGS. 18A and 18B are explanatory diagrams showing a case where the present invention has been applied to rotational speed control of an engine.

Referring to FIG. 1A, a controller 1, which is a control apparatus of a plant in accordance with the present invention, is mounted on a vehicle 2 to control an operation of the vehicle 2. The controller 1 has a function for controlling the rotational speed of a driven shaft (the rotating shaft adjacent to a drive shaft 5) of a clutch assembly 4 that transmits a driving force of an engine 3 to drive wheels 6 through the intermediary of the drive shaft 5.

As shown in FIG. 1B, the controller 1 handles a mechanism for transmitting the driving force of the engine 3 in the vehicle 2 as a system in which an output (torque or rotational speed) of the engine 3 is transmitted to a vehicular equivalent inertia Iv through the intermediary of the clutch assembly 4, the transmitting mechanism corresponding to a plant in the present invention. In this case, an equation of motion of the vehicular equivalent inertial system is represented by the following expression (1).

$$Iv \cdot \dot{N}C = Tc - Td \quad (1)$$

where Iv: Vehicular equivalent inertia; NC: Rotational speed of clutch; Tc: Clutch transmitting torque; and Td: Drag torque.

Using a stroke Pcl (distance between clutch discs 7a and 7b) of the clutch assembly 4 and an engine torque Te allows the following equation (4) for a clutch transmission torque Tc to be derived from equations (2) and (3) given below. The controller 1 moves the clutch disc 7b by a clutch actuator (not shown), such as an electric motor, to change the clutch stroke Pcl.

$$Tc = Kcc'' \cdot Te \quad (2)$$

where Kcc'': Torque transmission capacity coefficient of the clutch; and Te: Engine torque $$Kcc'' = Kcc'(Pcl) \cdot Pcl \quad (3)$$

where Kcc'(Pcl): Nonlinear function for calculating torque transmission capacity; and Pcl: Clutch stroke $$Tc = Te \cdot Kcc'(Pcl) \cdot Pcl = Kcc \cdot Pcl \quad (4)$$

Substituting the above equation (4) in the above equation (1) allows the following equation (5) to be obtained:

$$Iv \cdot \dot{N}C = Kcc \cdot Pcl - Td \quad (5)$$

Drag torque Td is basically a running drag Fd (refer to FIG. 1A). As indicated by the following equation (6), the running drag Fd may be divided into a component Fd1 that varies according to a vehicle speed VP and a component Fd2 that changes according to rolling resistance or gradient.

$$Fd = Fd1 + Fd2 \quad (6)$$

where Fd: Running resistance; Fd1: Component based on vehicle speed VP; and Fd2: Component based on rolling resistance and gradient.

Furthermore, the vehicle speed VP and the clutch rotational speed NC can be mutually converted on the basis of a gear ratio of a transmission (not shown) connected to the clutch assembly 4 and an outside diameter of a tire. Hence, the drag torque Td can be also separated into a component Td1 that changes according to the clutch rotational speed NC and a component Td2 that changes according to a rolling resistance and a gradient, as indicated by the following equation (7):

$$Td = Td1 + Td2 = Kd1 \cdot NC + Td2 \quad (7)$$

where Td: Drag torque; Td1: Component based on clutch rotational speed NC; Td2: Component based on rolling resistance and gradient; and Kd1: Nonlinear coefficient for calculating running drag.

Substituting the above equation (7) in the above equation (5) provides the following equation (8), and processing the following equation (8) in a discrete time fashion provides an equation (9) given below:

$$Iv \cdot \dot{N}C = Kcc \cdot Pcl - Kd1 \cdot NC - Td2 \quad (8)$$

$$Iv \cdot \frac{NC(k+1) - NC(k)}{dt} = Kcc \cdot Pcl(k) - Kd1 \cdot NC(k) - Td(k) \quad (9)$$

where dt: Control cycle of the controller 1; and k: k-th control cycle.

The following equation (10) is derived by processing the above equation (9) on the basis of the clutch rotational speed NC.

$$NC(k+1) = \left(1 - \frac{Kd1 \cdot dt}{Iv}\right) \cdot NC(k) + \frac{Kcc \cdot dt}{Iv} Pcl(k) - \frac{dt}{Iv} Td2(k) \quad (10)$$

$$\equiv a1' \cdot NC(k) + b1' \cdot Pcl(k) + c1'$$

$$\begin{cases} a1' = 1 - \frac{Kd1 \cdot dt}{Iv} \\ b1' = \frac{Kcc \cdot dt}{Iv} \\ c1' = -\frac{dt}{Iv} Td2(k) \end{cases}$$

where a1', b1', c1': Model parameters

The above equation (10) provides a model equation of the driving force transmitting system shown in FIG. 1A. Strictly speaking, the model parameters a1', b1' and c1' in the above equation (10) change according to the clutch rotational speed NC or the clutch stroke Pcl and also according to time-dependent changes of mechanical elements. There are cases, therefore, where the model parameters a1', b1' and c1' are required to be corrected for each control cycle. In this case, correction processing is carried out by an identifier, which will be discussed hereinafter.

As illustrated in FIG. 1A, to transmit an output of the engine 3 to the drive wheels 6 through the intermediary of the clutch assembly 4, control is conducted to set a so-called half-clutch state in which a slippery state is maintained between the clutch discs 7a and 7b of the clutch assembly 4 in re-tightening the clutch assembly 4 when starting the vehicle 2 or performing a speed changing operation in a transmission (not shown).

The half-clutch state is set to smoothly increase or decrease a driving force transmitted from the engine 3 to the drive wheels 6 through the intermediary of the clutch assembly 4. The driving force is increased or decreased by changing the slip rate of the clutch assembly 4. FIGS. 2A and 2B show graphs indicating changes in clutch slip rate SR when a target slip rate SR_cmd of the clutch assembly 4 is changed and when an actual clutch slip rate SR changes due to disturbance. In the graph shown in FIG. 2A, the axis of ordinates indicates rotational speed and the axis of abscissa indicates time. In the graph shown in FIG. 2B, the axis of ordinates indicates the clutch slip rate and the axis of abscissa indicates time.

Referring to FIG. 2B, the target slip rate SR_cmd is changed from SR1 to SR2 at time $t_1$. When the target slip rate SR_cmd is thus changed, if the clutch slip rate SR is abruptly changed from SR1 to SR2, then burden on the clutch assembly 4 increases, and drivability deteriorates due to occurrence of vibration. For this reason, it is necessary to carry out control to smoothly and gradually shift the clutch slip rate SR from SR1 to SR2 ($t_1$ to $t_2$), as illustrated in the graph.

On the other hand, if the clutch slip rate SR slightly decreases momentarily due to disturbance or the like, producing a deviation from a target slip rate SR_cmd at $t_3$, then the deviation must be promptly converged to zero.

The controller 1 converts the clutch slip rate SR into the clutch rotational speed NC to carry out control. Hence, as shown in FIG. 2A, the clutch rotational speed target value NC_cmd is changed on the basis of the target slip rate SR_cmd at $t_1$, and if disturbance occurs, then the clutch stroke Pcl is adjusted to change the clutch rotational speed NC so as to remove a difference between the clutch slip rate SR and the target slip rate SR_cmd.

As described above, the controller 1 is required to combine two characteristics, namely, (1) smooth follow-up or asymptotic characteristic of an actual clutch slip rate SR in response to a change in the target slip rate SR_cmd and (2) quick convergence of a difference between the target slip rate SR_cmd and the actual clutch slip rate SR caused by disturbance. For this reason, the controller 1 is provided with one of the constructions illustrated in FIG. 3, FIG. 5, FIG. 6, and FIG. 8 so as to implement the characteristics described in (1) and (2) above.

First, a description will be given of a fist construction of the controller 1 shown in FIG. 3. Referring to FIG. 3, a controller 1a determines the clutch stroke Pcl (corresponding to a control input value for a plant in the present invention) of the clutch assembly 4 such that the clutch rotational speed NC of the clutch assembly 4, which is the plant to be controlled, coincides with the clutch rotational speed target value NC_cmd. The slip rate SR between the clutch discs 7a and 7b in the clutch assembly 4 changes according to the clutch stroke Pcl, and the driving force transmitted from the engine 3 to the driven shaft of the clutch assembly 4 increases or decreases accordingly, so that the clutch rotational speed NC can be controlled by changing the clutch stroke Pcl.

The controller 1a includes a target value filter 11 (corresponding to a filtering device in the present invention) that performs filtering computation on the clutch rotational speed target value NC_cmd to calculate a filtering target value NC_cmd_f, and a response specifying control unit 10a (corresponding to a control input determiner in the present invention) that determines a clutch stroke Pcl, which is a control input value, for the clutch assembly 4 by using the response specifying control based on the model equation of the above equation (10).

The response specifying control unit 10a includes an equivalent control input section 12 for calculating an equivalent control input Ueq*, a subtracter 13 for calculating a difference Enc between the filtering target value NC_cmd_f and the clutch rotational speed NC, a switching function value calculator 14 for calculating a value of a switching function σ, a reaching law input calculator 15 for calculating a reaching law input Urch*, an adaptation law input calculator 16 for calculating the adaptation law input Uadp*, and an adder 17 for calculating the clutch stroke Pcl by adding an equivalent control input Ueq*, the reaching law input Urch*, and the adaptation law input Uadp*.

A target filter 11 carries out filtering computation according to the following equation (11) on the clutch rotational speed target value NC_cmd (corresponding to a target output value of a plant in the present invention) so as to calculate the filtering target value NC_cmd_f.

$$NC\_cmd\_f(k) = -POLE\_F \cdot NC\_cmd\_f(k-1) + (1+POLE\_F) \cdot NC\_cmd(k) \qquad (11)$$

where k: k-th control cycle; NC_cmd_f(k): Filtering target value in a k-th control cycle; and POLE_F: Target value filter coefficient.

The above equation (11) applies to a first-order lag filer. The filtering target value NC_cmd_f takes a value that converges, with a response delay, to the clutch rotational speed target value NC_cmd after a change when the change takes place in the clutch rotational speed target value NC_cmd. The degree of the response delay of the filtering target value NC_cmd_f with respect to the clutch rotational speed target value NC_cmd changes with a set value of the target value filter coefficient POLE_F. If the clutch rotational speed target value NC_cmd remains constant, then the filtering target value NC_cmd_f will be equal to the clutch rotational speed target value NC_cmd.

The switching function value calculator 14 calculates the switching function value σ according to the following equation (13) from a difference Enc calculated by the subtracter 13 according to the following equation (12).

$$Enc(k) = NC(k) - NC\_cmd\_f(k) \qquad (12)$$

$$\sigma(k) = Enc(k) + POLE \cdot Enc(k-1) \qquad (13)$$

where σ(k): Switching function value in k-th control cycle; and POLE: Switching function setting parameter (−1<POLE<0)

The reaching law input calculator 15 calculates the reaching law input Urch* according to the following equation (14). The reaching law input Urch* is an input for placing a difference state amount (Enc(k), Enc(k−1)) on a switching straight line having the switching function σ set as 0 (σ=0).

$$Urch*(k) = -\frac{Krch}{b1'} \cdot \sigma(k) \qquad (14)$$

where Urch*(k): Reaching law input in k-th control cycle; and Krch: Feedback gain The adaptation law input calculator 16 calculates an adaptation law input Uadp* according to the following equation (15). The adaptation law input Uadp* is used to absorb a modeling error or disturbance so as to place the difference state amount (Enc(k), Enc(k−1)) on the switching straight line (σ=0).

$$Uadp*(k) = -\frac{Kadp}{b1'}\sum_{i=0}^{K}\sigma(i) \quad (15)$$

where Uadp*(k): Adaptation law input in k-th control cycle; and Kadp: Feedback gain The equivalent control input calculator 12 calculates the equivalent control input Ueq* according to the following equation (16). The equation (16) calculates the clutch stroke Pcl in terms of the equivalent control input Ueq* by applying σ(k+1)=σ(k) and the above equation (13) and the above equation (10) in which c1' (disturbance term) is set to zero are applied. The equivalent control input Ueq* is an input used for restraining the difference state amount (Enc(k), Enc(k−1)) on the switching straight line (σ(k)=0).

$$Ueq*(k) = \frac{1}{b1'}\{(1-a1'-POLE)\cdot NC(k) + \quad (16)$$
$$POLE\cdot NC(k-1) + NC\_cmd\_f(k+1) +$$
$$(POLE-1)\cdot NC\_cmd\_f(k) - POLE\cdot NC\_cmd\_f(k-1)\}$$

where POLE: Switching function setting parameter (−1<POLE<0); and a1', b1': Model parameters.

The adder 17 calculates the clutch stroke Pcl, which is a control input supplied to the clutch assembly 4, according to the following equation (17).

$$Pcl(k)=Ueq*(k)+Urch*(k)+Uadp*(k) \quad (17)$$

The response specifying control unit 10a sets the disturbance term c1' in the above equation (10) to zero, and absorbs influences of the disturbance by the adaptation law input Uadp*.

FIG. 4 is a time series graph showing the operation of the controller 1a, the axis of ordinates indicating the clutch rotational speed (NC, NC_cmd) and the axis of abscissa indicating time (Time). As shown in the graph, the filtering target value NC_cmd_f calculated by the target value filter 11 involves a response delay with respect to the clutch rotational speed target value NC_cmd.

The degree of the response delay changes according to a set value of the target value filter coefficient POLE_F in the above equation (11). Hence, the convergent speed of the actual clutch rotational speed NC with respect to the clutch rotational speed target value NC_cmd can be set by changing the target value filter coefficient POLE_F.

The response specifying control unit 10 determines the clutch stroke Pcl such that the filtering target value NC_cmd_f coincides with the actual clutch rotational speed NC. The convergent behavior for the difference Enc between the filtering target value NC_cmd_f and the actual clutch rotational speed NC depends on the switching function setting parameter POLE in the above equation (13).

Thus, as shown in FIG. 4, changing the setting of the switching function setting parameter POLE changes the convergent behavior for the clutch rotational speed (NC_1, NC_2, NC_3) with respect to the filtering target value NC_cmd_f. For this reason, the convergent speed of the difference between the filtering target value NC_cmd_f and the actual clutch rotational speed NC is set to be higher than the convergent speed of the filtering target value NC_cmd_f specified by the filtering computation with respect to the clutch rotational speed target value NC_cmd.

More specifically, as shown in the following equation (18), an absolute value of the switching function setting parameter POLE (an arithmetic coefficient that determines the convergent speed of a difference between the filtering target value NC_cmd_f and the actual clutch rotational speed NC) is set to be smaller than an absolute value of the target filter coefficient POLE_F (an arithmetic coefficient that determines the speed at which the filtering target value NC_cmd_f converges to the clutch rotational speed target value NC_cmd in the filtering computation).

$$-1<POLE\_F<POLE<0 \quad (18)$$

Thus, a follow-up speed of the clutch rotational speed NC when the clutch rotational speed target value NC_cmd changes can be specified with relatively controlled influences of the switching function setting parameter POLE. This makes it possible to further accurately specify a follow-up speed of the clutch rotational speed NC in response to a change in the clutch rotational speed target value NC_cmd by setting the target filter coefficient POLE_F.

If the clutch rotational speed target value NC_cmd remains constant, then the filtering target value NC_cmd_f and the clutch rotational speed target value NC_cmd will be equal. Under the condition, if disturbance causes the clutch rotational speed NC to change, as indicated at $t_{11}$ in FIG. 4, then the convergent behavior for a difference (NC−NC_cmd) between the clutch rotational speed NC and the clutch rotational speed target value NC_cmd can be set by the switching function setting parameter POLE in the above equation (13).

Therefore, according to the controller 1a shown in FIG. 3, the follow-up speed of the actual clutch rotational speed NC with respect to the clutch rotational speed target value NC_cmd when the clutch rotational speed target value NC_cmd changes can be independently specified by setting the target filter coefficient POLE_F in the above equation (11). Moreover, the convergent speed for a difference between the clutch rotational speed target value NC_cmd and the actual clutch rotational speed NC can be independently set by setting the switching function setting parameter POLE in the above equation (13).

Referring now to FIG. 5, a second construction of the controller 1 will be described. Like reference numerals will be assigned to like components as those in the controller 1a shown in FIG. 3, and the descriptions thereof will be omitted. A controller 1b shown in FIG. 5 differs from the controller 1a shown in FIG. 3 in that the response specifying control unit 10b is not equipped with an adaptation law calculator, while it is equipped with an identifier 20, which corresponds to the identifying means in the present invention.

Model parameters (a1', b1' and c1') in the above equation (10) modeling the clutch assembly 4 to be controlled by the controller 1b change according to the clutch rotational speed NC or the clutch stroke Pcl and also a time-dependent change or the like of the clutch assembly 4. Hence, the identifier 20 provided on the response specifying control unit 10b carries out processing to correct model parameters a1', b1' and c1' for each control cycle of the controller 1b so as to restrain influences of a modeling error.

In the response specifying control unit 10b, to achieve quicker restraint of disturbance, a disturbance component c1' is directly identified by the identifier 20, and an equivalent control input is calculated using the identified c1' so as to suppress influences of the disturbance rather than restraining disturbance by the adaptation law input Uadp* in the response specifying control unit 10a having the first construction.

The identifier 20 calculates identification values (a1, b1, and c1) of the model parameters (a1', b1', and c1') in the above equation (10) according to the following equations (19) to (25).

First, the above equation (10) can be represented in terms of the following equation (21) using a vector $\zeta$ defined by the following equation (19) and a vector $\theta$ defined by the equation (20).

$$\zeta^T(k) = [NC(k-1) Pcl(k-1) 1] \tag{19}$$

$$\theta^T(k) = [a1(k) b1(k) c1(k)] \tag{20}$$

$$NC\_hat(k) = \theta^T(k-1) \cdot \zeta(k) \tag{21}$$

where NC_hat(k): Estimated value of clutch rotational speed in k-th control cycle The identifier 20 first calculates, according to the following equation (22), a difference e_id between a clutch rotational speed estimated value NC_hat obtained by the above equation (21) and the actual clutch rotational speed NC as the value representing a modeling error in the above equation (10). Hereinafter, the difference e_id will be referred to as an identification error e_id.

$$e\_id(k) = NC(k) - NC\_hat(k) \tag{22}$$

where e_id(k): Difference between clutch rotational speed estimated value NC_hat(k) and actual clutch rotational speed NC(k) in k-th control cycle Then, the identifier 20 calculates model parameters a1(k), b1(k) and c1(k) in a new control cycle according to the following equation (23) so as to minimize the identification error e_id. More specifically, the identifier 20 changes model parameters a1(k−1), b1(k−1) and c1(k−1) calculated in a previous control cycle only by an amount proportional to the identification error e_id to calculate new model parameters a1(k), b1(k) and c1(k) in the present control cycle.

$$\theta(k) = \theta(k-1) + KP(k) \cdot e\_id(k) \tag{23}$$

"KP" in the above equation (23) denotes a tertiary vector calculated by the following equation (24). The tertiary vector is a gain coefficient vector defining a level of change based on the identification error e_id.

$$KP(k) = \frac{P(k) \cdot \zeta(k)}{1 + \zeta^T(k) \cdot P(k) \cdot \xi(k)} \tag{24}$$

"P" in the above equation (24) denotes a tertiary square matrix calculated by the recurrence formula of the following equation (25).

$$P(k+1) = \frac{1}{\lambda_1} \left( I - \frac{\lambda_2 \cdot P(k) \cdot \xi(k) \cdot \xi^T(k)}{\lambda_1 + \lambda_2 \cdot \xi^T(k) \cdot P(k) \cdot \xi(k)} \right) \tag{25}$$

where I: Unit matrix; and $\lambda_1$, $\lambda_2$: Identification weighting parameters Various algorithms, including a fixed gain method, a decreasing gain method, a method of weighted least squares, a method of least squares, and a fixed tracing method, are available by setting $\lambda_1$ and $\lambda_2$ in the above equation (25) in different manners.

Based on the model parameters a1, b1, and c1 identified by the identifier 20, the reaching law input calculator 15 calculates the reaching law input Urch according to the following equation (26). The equivalent control input calculator 12 calculates the equivalent control input Ueq according to the following equation (27).

$$Urch*(k) = -\frac{Krch}{b1(k)} \sigma(k) \tag{26}$$

where Krch: Feedback gain $$Ueq(k) = \tag{27}$$
$$\frac{1}{b1(k)} \{(1 - a1(k) - POLE) \cdot NC(k) + POLE \cdot NC(k-1) - c1(k) +$$
$$NC\_cmd\_f(k+1) + (POLE - 1) \cdot NC\_cmd\_f(k) -$$
$$POLE \cdot NC\_cmd\_f(k-1)\}$$

The reaching law input Urch calculated by the reaching law input calculator 15 and the equivalent control input Ueq calculated by the equivalent control input calculator 12 are added up by the adder 17 to calculate the clutch stroke Pcl for the clutch assembly 4, as shown by the following equation (28).

$$Pcl(k) = Ueq(k) + Urch(k) \tag{28}$$

Thus, influences of a modeling error can be restrained in specifying a follow-up behavior for the clutch rotational speed NC in response to a change in the clutch rotational speed target value NC_cmd by calculating the clutch stroke Pcl, which is a control input supplied to the clutch assembly 4, on the basis of new model parameters a1, b1 and c1 identified by the identifier 20. Moreover, calculating the equivalent control input Ueq according to the above equation (27) using a disturbance factor c1 makes it possible to shorten the convergent time for a difference between the clutch rotational speed target value NC_cmd and the actual clutch rotational speed NC, as compared with the case where the controller 1a having the first construction described above is used.

The response specifying control unit 10b having the second construction may also be provided with the adaptation law calculator, as in the case of the response specifying control unit 10a having the first construction, to calculate an adaptation law input based on an identified model parameter b1, and then have the adder 17 add the adaptation law input to calculate the clutch stroke Pcl.

Referring now to FIG. 6, a third construction of the controller 1 will be explained. Like reference numerals will be assigned to like components as those of the controller 1b shown in FIG. 5, and the descriptions thereof will be omitted. A controller 1c shown in FIG. 6 differs from the controller 1b shown in FIG. 5 in that a response specifying control unit 10c has a parameter scheduler 30. In addition, the arithmetic processing in an identifier 21 differs from that in the identifier 20 shown in FIG. 5.

The parameter scheduler 30 determines a reference parameter θbase (a1base, b1base, 0), which corresponds to a reference value of a model parameter in the present invention, by using maps shown in FIG. 7. FIG. 7A shows an NC/a1base map for determining the reference parameter a1base from the clutch rotational speed NC. The NC/a1base map provides three types (Na1, Na2, and Na3) of correlation data to select from according to the magnitude of a gear selection target value NGEAR_cmd of the transmission.

FIG. 7B shows a Pcl/b1base map for determining a reference parameter b1base from the clutch stroke Pcl. The Pcl/b1base map provides three types (Pb1, Pb2, and Pb3) of correlation data to select from according to the magnitude of a gear selection target value NGEAR_cmd of the transmission.

Data MAP_dat of the NC/a1base map and the Pcl/b1base map is prepared on the basis of experiments or simulations and stored beforehand in a memory (not shown), which corresponds to the storing means in the present invention. Alternatively, the maps may be replaced by a relational expression representing a correlation between the clutch rotational speed NC and the reference parameter a1base and a relational expression representing a correlation between the clutch stroke Pcl and the reference parameter b1base to determine the reference parameters a1base and b1base.

The identifier 21 uses the reference parameters a1base and b1base determined by the parameter scheduler 30 to calculate a parameter correction value dθ according to the following equation (30), using a vector θbase defined by the following equation (29), KP calculated according to the above equation (24), and e_id calculated according to the above equation (22).

$$\theta base^T(k) = [a1base(k) b1base(k) 0] \quad (29)$$

$$d\theta(k) = d\theta(k-1) + KP(k) \cdot e\_id(k) \quad (30)$$

The identifier 21 calculates a new model parameter $\theta^T(k) = $ (a1, b1, c1) according to the following equation (31).

$$\theta(k) = \theta base(k) + d\theta(k) \quad (31)$$

Thus, based on the reference parameter θbase (a1base, b1base, 0) determined by the parameter scheduler 30 on the basis of dynamic characteristics, such as the clutch rotational speed NC and the clutch stroke Pcl, of the clutch assembly 4, the identifier 21 carries out identification processing of the model parameters (a1, b1, and c1). This allows the controller 1c to adapt itself to an abrupt change stably and swiftly if a dynamic characteristic of the clutch assembly 4 abruptly changes.

This arrangement makes it possible to improve the accuracy of implementing a specified follow-up behavior of the actual clutch rotational speed NC in response to a change in the clutch rotational speed target value NC_cmd and a specified convergent behavior for a difference between the clutch rotational speed target value NC_cmd and the clutch rotational speed NC that is attributable to disturbance.

The response specifying control unit 10c having the third construction may also be provided with the adaptation law calculator, as in the case of the response specifying control unit 10a having the first construction, to calculate an adaptation law input based on an identified model parameter b1, and then have the adder 17 add the adaptation law input to calculate the clutch stroke Pcl.

Referring now to FIG. 8, a fourth construction of the controller 1 will be explained. Like reference numerals will be assigned to like components as those of the controller 1c shown in FIG. 6, and the descriptions thereof will be omitted. A controller 1d shown in FIG. 8 differs from the controller 1c shown in FIG. 6 in that a response specifying control unit 10d has an adaptive disturbance observer 50, while it has no identifier. Furthermore, processing in a parameter scheduler 41 is different from that in the parameter scheduler 30 shown in FIG. 6.

The parameter scheduler 41 determines model parameters (a1sc, b1sc) by searching a map that shows a correlation between operational parameters, such as the clutch rotational speed NC and the clutch stroke Pcl, and the model parameters (a1sc, b1sc) by applying the operational parameters. Data MAP_data of the map is stored beforehand in a memory (not shown).

The adaptive disturbance observer 50 uses schedule values (a1sc, b1sc) of the model parameters determined by the parameter scheduler 41 to calculate a clutch rotational speed estimated value NC_hat according to the following equation (33) from a vector θ defined by the following equation (32) and ζ obtained by the above equation (19).

$$\theta^T(k) = [a1sc(k) b1sc(k) c1(k)] \quad (32)$$

where a1sc, b1sc: Schedule values of model parameters $$NC\_hat(k) = \theta^T(k-1) \cdot \zeta(k) \quad (33)$$

The adaptive disturbance observer 50 then calculates a difference e_dov between the clutch rotational speed estimated value NC_hat and the actual clutch rotational speed NC according to the following equation (34), and the difference e_dov is substituted in a recurrence formula of the following equation (35) to calculate an identification value c1(k) of a disturbance component c1.

$$e\_dov(k) = NC(k) - NC\_hat(k) \quad (34)$$

$$c1(k) = c1(k-1) + \frac{Pdov}{1 + Pdov} e\_dov(k) \quad (35)$$

where Pdov: Coefficient of identification gain

The reaching law input calculator 15 calculates the reaching law input Urch according to the following equation (36) in which the model parameter b1(k) in the above equation (26) has been replaced by a schedule value b1sc(k) of a model parameter determined by the parameter scheduler 41.

$$Urch(k) = -\frac{Krch}{b1sc(k)} \sigma(k) \quad (36)$$

The equivalent control input calculator 12 calculates the equivalent control input Ueq by substituting the disturbance component c1(k) calculated by the above equation (35) in the following equation (37) in which the model parameters a1(k) and b1(k) of the above equation (27) have been replaced by schedule values a1sc(k) and b1sc(k) of the model parameters determined by the parameter scheduler 41.

$$Ueq(k) = \quad (37)$$
$$\frac{1}{b1sc(k)} \{(1 - a1sc(k) - POLE) \cdot NC(k) + POLE \cdot NC(k-1) - c1(k) +$$
$$NC\_cmd\_f(k+1) + (POLE - 1) \cdot NC\_cmd\_f(k) -$$
$$POLE \cdot NC\_cmd\_f(k-1)\}$$

The adder 17 adds the reaching law input Urch and the equivalent control input Ueq to calculate the clutch stroke Pcl to be supplied to the clutch assembly 4.

The response specifying control unit 10d of the controller 1d explained above allows computation load in each control cycle can be reduced by identifying only the disturbance component c1 among the model parameters a1, b1 and c1 by the adaptive disturbance observer 50.

With this arrangement, the control cycle of the controller 1d can be shortened, permitting improved controllability over a nonlinear characteristic, such as hysteresis, backlash, or friction, of the clutch assembly 4. Rather than using the parameter scheduler 41, fixed model parameters a1 and b1 may be used.

The response specifying control unit 10d having the fourth construction may alternatively be provided with an adaptation law calculator, as in the case of the response specifying control unit 10a having the first construction described above, to calculate an adaptation law input based on a scheduled model parameter b1sc, and the adder 17 may calculate the clutch stroke Pcl by adding the adaptation law input.

Referring now to FIG. 9 through FIG. 12, descriptions will be given of a fifth through an eighth constructions of the controller 1 in which the response specifying control units 10a through 10d of the aforesaid controller 1, which have the first through the fourth constructions, include a state predictor (corresponding to the output predicting means in the present invention) that calculates a clutch rotational speed predicted value Pre_NC predicting the clutch rotational speed after a dead time d of a clutch actuator elapses on the basis of the clutch rotational speed NC and the clutch stroke Pcl.

As illustrated in FIG. 1B, if the mechanism for transmitting a driving force of the engine 3 in the vehicle 2 (the mechanism corresponding to a plant in the present invention) is handled as a system in which an output (torque or rotational speed) of the engine 3 is transmitted to the vehicle equivalent inertia Iv through the intermediary of the clutch assembly 4, then a dynamic equation of a vehicular equivalent inertial system including time factor t is represented by the following equation (38).

$$Iv \cdot \dot{NC}(t) = Tc(t) - Td(t) \tag{38}$$

where Iv: Vehicular equivalent inertia; NC: Clutch rotational speed; Tc: Clutch transmission torque; and Td: Drag torque.

Using the stroke Pcl (the distance between the clutch discs 7a and 7b) of the clutch assembly 4 and the engine torque Te makes it possible to obtain the following equation (41) regarding the clutch transmission torque Tc from the following equations (39) and (40). The clutch actuator has a dead time characteristic, so that the factor of a continuous system dead time dc of the clutch actuator is added to the clutch transmission torque Tc.

$$Tc(t) = Kcc'' \cdot Te(t) \tag{39}$$

where Kcc'': Torque transmission capacity coefficient of clutch; and Te: Engine torque $$Kcc'' = Kcc'(Pcl) \cdot Pcl(t) \tag{40}$$

where Kcc'(Pcl): Nonlinear function for calculating torque transmission capacity; and Pcl: Clutch stroke $$Tc(t) = Te(t) \cdot Kcc'(Pcl) \cdot Pcl(t-dc) \equiv Kcc \cdot Pcl(t-dc) \tag{41}$$

where dc: Continuous system dead time

The following equation (42) can be derived by substituting the equation (41) in the equation (38).

$$Iv \cdot \dot{NC}(t) = Kcc \cdot Pcl(t-dc) - Td(t) \tag{42}$$

The drag torque Td is basically the running drag Fd (refer to FIG. 1A). As indicated by the following equation (43), the running drag Fd may be divided into a component Fd1 that changes according to the vehicle speed VP and a component Fd2 that changes according to rolling resistance or gradient.

$$Fd(t) = Fd1(t) + Fd2(t) \tag{43}$$

where Fd: Running drag; Fd1: Component dependent on vehicle speed VP; and Fd2: Component dependent on rolling resistance or gradient The vehicle speed VP and the clutch rotational speed NC are mutually convertible in terms of a gear ratio of a transmission (not shown) connected to the clutch assembly 4 and an outside diameter of tires. Hence, as indicated by the following equation (44), the drag torque Td may be also divided into a component Td1 that changes according to the clutch rotational speed NC and a component Td2 that changes according to rolling resistance or gradient.

$$Td(t) = Td1(t) + Td2(t) = Kd1 \cdot NC(t) + Td2(t) \tag{44}$$

where Td: Drag torque; Td1: Component dependent on clutch rotational speed NC; Td2: Component dependent on rolling resistance or gradient; and Kd1: Nonlinear coefficient for calculating running drag.

The following equation (45) is derived by substituting the equation (44) in the equation (42). Substituting the following equation (46) in the equation (45) and then processing the result in a discrete time fashion provide an equation (47) given below:

$$Iv \cdot \dot{NC}(t) = Kcc \cdot Pcl(t-dc) - Kd1 \cdot NC(t) - Td2(t) \tag{45}$$

$$dc = d1 \cdot dt \tag{46}$$

where dt: Control cycle of the controller 1

$$Iv \cdot \frac{NC(k+1) - NC(k)}{dt} = Kcc \cdot Pcl(k) - Kd1 \cdot NC(k) - Td(k) \tag{47}$$

where k: k-th control cycle; and d: Discrete system dead time.

The following equation (48) is derived by processing the above equation (47) on the basis of the clutch rotational speed NC.

$$NC(k+1) = \left(1 - \frac{Kd1 \cdot dt}{Iv}\right) \cdot NC(k) + \frac{Kcc \cdot dt}{Iv} Pcl(k) - \frac{dt}{Iv} Td2(k) \tag{48}$$

$$\equiv a1' \cdot NC(k) + b1' \cdot Pcl(k) + c1'$$

$$\begin{cases} a1' = 1 - \dfrac{Kd1 \cdot dt}{Iv} \\ b1' = \dfrac{Kcc \cdot dt}{Iv} \\ c1' = -\dfrac{dt}{Iv} Td2(k) \end{cases}$$

where a1', b1', c1': Model parameters

The above equation (48) provides a model equation of the driving force transmitting system shown in FIG. 1A. Strictly speaking, the model parameters a1', b1' and c1' in the above equation (48) change according to the clutch rotational speed NC or the clutch stroke Pcl and also according to time-dependent changes of mechanical elements. There are cases, therefore, where the model parameters a1', b1' and c1' are required to be corrected for each control cycle. In this case, correction processing is carried out by an identifier, which will be discussed hereinafter.

The controller 1 is equipped with one of the constructions illustrated in FIG. 9 through FIG. 12 to secure stability and quick response to cope with dead time of the clutch actuator, thereby restraining influences of the dead time of the clutch actuator.

Referring first to FIG. 9, the fifth construction of the controller 1 will be described. A controller 1e shown in FIG. 9 has a state predictor 25 added to the controller 1a having the first constructed shown in FIG. 3. Like reference numerals will be assigned to like components as those of the controller 1a having the first construction, and the descriptions thereof will be omitted.

A response specifying control unit 10a installed in the controller 1e has a state predictor 25 (corresponding to the output predicting means in the present invention) that calculates a clutch rotational speed predicted value Pre_NC predicting a clutch rotational speed after the elapse of the dead time d of the clutch actuator on the basis of the clutch rotational speed NC and the clutch stroke Pcl.

The state predictor 25 calculates the clutch rotational speed predicted value Pre_NC according to the following equations (49) through (52).

$$Pre\_NC(k) = \alpha nc1 \cdot NC(k) + \beta nc1 \cdot Pcl(k-1) + \beta n2 \cdot Pcl(k-2) + \quad (49)$$

$$\ldots + \beta ncd \cdot Pcl(k-d) + \gamma nc \cdot c1(k) \approx NC(k+d)$$

where Pre_NC: Predicted value of clutch rotational speed in k-th control cycle; and $\alpha NC1$, $\beta ncj$ (j=1, 2, . . . , d) and $\gamma nc$: Calculation factors in the following equations (50) through (52).

$$\alpha nc1 = a1'^d \quad (50)$$

where a1': Model parameter in the above equation (48); and d: Dead time of clutch actuator represented in terms of the number of control cycles.

$$\beta ncj = a1'^{j-1} \cdot b1' \quad (51)$$

where a1', b1': Model parameters in the equation (48), j=1, 2, . . . , d $$\gamma nc = 1 + a1' + a1'^2 + \ldots + a1'^{d-1} \quad (52)$$

where a1': Model parameter in the equation (48)

The switching function value calculator 14 calculates a switching function value ay according to the following equation (54) from a difference Enc calculated by a subtracter 13 according to the following equation (53).

$$Enc(k) = Pre\_NC - NC\_cmd\_f \quad (53)$$

$$\sigma(k) = Enc(k) + POLE \cdot Enc(k-1) \quad (54)$$

where $\sigma(k)$: Switching function value in k-th control cycle; and POLE: Switching function setting parameter (−1<POLE<0).

A reaching law input calculator 15 calculates a reaching law input Urch' according to the following equation (55).

$$Urch*(k) = -\frac{Krch}{b1'} \cdot \sigma(k) \quad (55)$$

where Urch*(k): Reaching law input in k-th control cycle; and Krch: Feedback gain An adaptation law input calculator 16 calculates an adaptation law input Uadp* according to the following equation (56).

$$Uadp*(k) = -\frac{Kadp}{b1'} \cdot \sum_{i=0}^{K} \sigma(i) \quad (56)$$

where Uadp*(k): Adaptation law input in k-th control cycle; and Kadp: Feedback gain.

An equivalent control input calculator 12 calculates an equivalent control input Ueq* according to the following equation (57). The equation (57) is used to calculate, as the equivalent control input Ueq*, a clutch stroke Pcl obtained by substituting the above equation (54) and (48) in which c1' (disturbance term) is set to zero when $\sigma(k+1) = \sigma(k)$.

$$Ueq*(k) = \quad (57)$$

$$\frac{1}{b1'(k)}\{(1 - a1'(k) - POLE) \cdot Pre\_NC(k) + POLE \cdot Pre\_NC(k-1) +$$

$$NC\_cmd\_f(k+1) + (POLE - 1) \cdot NC\_cmd\_f(k) -$$

$$POLE \cdot NC\_cmd\_f(k-1)\}$$

The adder 17 calculates the clutch stroke Pcl, which is a control input supplied to the clutch assembly 4, according to the following equation (58).

$$Pcl(k) = Ueq*(k) + Urch*(k) + Uadp*(k) \quad (58)$$

The response specifying control unit 10a sets the disturbance term c1' in the above equation (48) to zero and absorbs influences of disturbance by means of the adaptation law input Uadp*.

The response specifying control unit 10a determines the clutch stroke Pcl so that a filtering target value NC_cmd_f coincides with the actual clutch rotational speed NC. To do this, the response specifying control unit 10a determines the clutch stroke Pcl by using an output predicted value Pre_NC calculated by the state predictor 25 according to the above equation (49) rather than directly using the clutch rotational speed NC. This arrangement restrains the influences of the dead time of the clutch assembly 4, allowing the actual clutch rotational speed NC to stably follow the filtering target value NC_cmd_f.

The convergent behavior for the difference Enc between the filtering target value NC_cmd_f and the output predicted value Pre_NC depends on the switching function setting parameter POLE in the above equation (54).

For this reason, as shown in FIG. 4, the convergent behavior for a clutch rotational speed (NC_1, NC_2, NC_3) with respect to the filtering target value NC_cmd_f changes when the setting of the switching function setting parameter POLE is changed. Hence, the convergent speed of the difference between the filtering target value NC_cmd_f and the actual clutch rotational speed NC is set to be higher than the convergent speed of the filtering target value NC_cmd_f specified in filtering computation with respect to the clutch rotational speed target value NC_cmd.

To be more specific, as indicated by equation (59) given below, an absolute value of the switching function setting parameter POLE (an arithmetic coefficient that determines the convergent speed of a difference between the filtering target value NC_cmd_f and the actual clutch rotational speed NC) is set to be smaller than an absolute value of the target filter coefficient POLE_F (an arithmetic coefficient that determines the speed at which the filtering target value NC_cmd_f converges to the clutch rotational speed target value NC_cmd in the filtering computation).

$$-1 < POLE\_F < POLE < 0 \qquad (59)$$

Thus, a follow-up speed of the clutch rotational speed NC when the clutch rotational speed target value NC_cmd changes can be specified with relatively restrained influences of the switching function setting parameter POLE. This makes it possible to further accurately specify a follow-up speed of the clutch rotational speed NC in response to a change in the clutch rotational speed target value NC_cmd by setting the target filter coefficient POLE_F.

If the clutch rotational speed target value NC_cmd remains constant, then the filtering target value NC_cmd_f and the clutch rotational speed target value NC_cmd will be equal. Under the condition, if disturbance causes the clutch rotational speed NC to change, as indicated at $t_{11}$ in FIG. 4, then the convergent behavior for a difference between the clutch rotational speed target value NC_cmd and the clutch rotational speed predicted value Pre_NC (Pre_NC−NC_cmd) can be set by the switching function setting parameter POLE in the above equation (54).

Therefore, according to the controller 1e having the fifth construction shown in FIG. 9, the follow-up speed of the actual clutch rotational speed NC with respect to the clutch rotational speed target value NC_cmd when the clutch rotational speed target value NC_cmd changes can be independently specified by setting the target filter coefficient POLE_F in the above equation (11). Moreover, the convergent speed for a difference between the clutch rotational speed target value NC_cmd and the actual clutch rotational speed NC can be independently set by setting the switching function setting parameter POLE in the above equation (54).

Referring now to FIG. 10, a sixth construction of the controller 1 will be described. A controller 1f shown in FIG. 10 has a state predictor 26 added to the controller 1b having the second construction shown in FIG. 5. Like reference numerals will be assigned to like components as those in the controller 1b having the second construction, and the descriptions thereof will be omitted.

The controller 1f shown in FIG. 10 differs from the controller 1e shown in FIG. 9 in that a response specifying control unit 10f is not equipped with an adaptation law calculator, while it is equipped with an identifier 20, which corresponds to the identifying means in the present invention.

Model parameters (a1', b1' and c1') in the above equation (48) modeling the clutch assembly 4 to be controlled by the controller 1f change according to the clutch rotational speed NC or the clutch stroke Pcl and also a time-dependent change or the like of the clutch assembly 4. Hence, the identifier 20 provided in the response specifying control unit 10f carries out processing to correct model parameters a1', b1' and c1' for each control cycle of the controller 1f so as to restrain influences of a modeling error.

To achieve quicker restraint of disturbance, in the response specifying control unit 10f, a disturbance component c1' is directly identified by the identifier 20, and an equivalent control input is calculated using the identified c1' so as to suppress influences of the disturbance rather than restraining disturbance by the adaptation law input Uadp* in the response specifying control unit 10e of the controller 1e having the fifth construction.

The identifier 20 calculates identification values a1, b1, and c1 of the model parameters a1', b1', and c1' of the above equation (48) according to the following equations (60) to (66).

First, the above equation (48) can be represented in the form of the following equation (62) from the vector $\zeta$ defined by the following equation (60) and the vector $\theta$ defined by equation (61).

$$\zeta^T(k) = [NC(k-1) \, Pcl(k-d1) \, 1] \qquad (60)$$

$$\theta^T(k) = [a1(k) \, b1(k) \, c1(k)] \qquad (61)$$

$$NC\_hat(k) = \theta^T(k-1) \cdot \zeta(k) \qquad (62)$$

where NC_hat(k): Clutch rotational speed estimated value in k-th control cycle

The identifier 20 first calculates, according to the following equation (63), a difference e_id between a clutch rotational speed estimated value NC_hat obtained by the above equation (62) and the actual clutch rotational speed NC as the value representing a modeling error in the above equation (48). Hereinafter, the difference e_id will be referred to as an identification error e_id.

$$e\_id(k) = NC(k) - NC\_hat(k) \qquad (63)$$

where e_id(k): Difference between clutch rotational speed estimated value NC_hat(k) and actual clutch rotational speed NC(k) in k-th control cycle Then, the identifier 20 calculates model parameters a1(k), b1(k) and c1(k) in a new control cycle according to the following equation (64) so as to minimize the identification error e_id. More specifically, the identifier 20 changes model parameters a1(k−1), b1(k−1) and c1(k−1) calculated in a previous control cycle only by an amount proportional to the identification error e_id to calculate new model parameters a1(k), b1(k) and c1(k) in the present control cycle.

$$\theta(k) = \theta(k-1) + KP(k) \cdot e\_id(k) \qquad (64)$$

"KP" in the above equation (64) denotes a tertiary vector calculated by the following equation (65). The tertiary vector is a gain coefficient vector defining a level of change based on the identification error e_id.

$$KP(k) = \frac{P(k) \cdot \zeta(k)}{1 + \zeta^T(k) \cdot P(k) \cdot \zeta(k)} \qquad (65)$$

"P" in the above equation (65) is a tertiary square matrix calculated by the recurrence formula of the following equation (66).

$$P(k+1) = \frac{1}{\lambda_1}\left(I - \frac{\lambda_2 \cdot P(k) \cdot \zeta(k) \cdot \zeta^T(k)}{\lambda_1 + \lambda_2 \cdot \zeta^T(k) \cdot P(k) \cdot \zeta(k)}\right) \cdot P(k) \qquad (66)$$

where I: Unit matrix; and $\lambda_1, \lambda_2$: Identification weighting parameters Various algorithms, including a fixed gain method, a decreasing gain method, a method of weighted least squares, a method of least squares, and a fixed tracing method, are available by setting $\lambda_1$ and $\lambda_2$ in the above equation (66) in different manners.

Based on the model parameters a1, b1, and c1 identified by the identifier 20, the reaching law input calculator 15 calculates the reaching law input Urch according to the following equation (67). The equivalent control input calculator 12 calculates the equivalent control input Ueq according to the following equation (68).

$$Urch(k) = -\frac{Krch}{b1(k)} \cdot \sigma(k) \quad (67)$$

where Krch: Feedback gain $$Ueq(k) = \quad (68)$$
$$\frac{1}{b1(k)}\{(1 - a1(k) - POLE) \cdot \text{Pre\_NC}(k) + POLE \cdot \text{Pre\_NC}(k-1) -$$
$$c1(k) + \text{NC\_cmd\_f}(k+1) + (POLE-1) \cdot \text{NC\_cmd\_f}(k) -$$
$$POLE \cdot \text{NC\_cmd\_f}(k-1)\}$$

The reaching law input Urch calculated by the reaching law input calculator 15 and the equivalent control input Ueq calculated by the equivalent control input calculator 12 are added up by the adder 17 to calculate the clutch stroke Pcl for the clutch assembly 4, as shown by the following equation (69).

$$Pcl(k) = Ueq(k) + Urch(k) \quad (69)$$

Thus, influences of a modeling error can be restrained in specifying a follow-up behavior for the clutch rotational speed NC in response to a change in the clutch rotational speed target value NC_cmd by calculating the clutch stroke Pcl, which is a control input supplied to the clutch assembly 4, on the basis of new model parameters a1, b1 and c1 identified by the identifier 20. Moreover, calculating the equivalent control input Ueq according to the above equation (68) using a disturbance factor c1 makes it possible to shorten the convergent time for a difference between the clutch rotational speed target value NC_cmd and the actual clutch rotational speed NC, as compared with the case where the controller 1e having the fifth construction described above is used.

The response specifying control unit 10f having the sixth construction may also be provided with the adaptation law calculator, as in the case of the response specifying control unit 10e having the fifth construction, to calculate an adaptation law input based on an identified model parameter b1, and then have the adder 17 add the adaptation law input to calculate the clutch stroke Pcl.

Referring now to FIG. 11, a seventh construction of the controller 1 will be explained. A controller 1g shown in FIG. 11 has a state predictor 26 added to the controller 1c having the third constructed shown in FIG. 6. Like reference numerals will be assigned to like components as those of the controller 1c having the third construction, and the descriptions thereof will be omitted.

The controller 1g shown in FIG. 11 differs from the controller 1f having the sixth construction shown in FIG. 10 in that a response specifying control unit 10g has a parameter scheduler 30. In addition, the arithmetic processing in an identifier 21 differs from that in the identifier 20 shown in FIG. 10.

The parameter scheduler 30 determines a reference parameter θbase (a1base, b1base, 0), which corresponds to a reference value of a model parameter in the present invention, by using maps shown in FIG. 7. Alternatively, the maps may be replaced by a relational expression representing a correlation between the clutch rotational speed NC and the reference parameter a1base and a relational expression representing a correlation between the clutch stroke Pcl and the reference parameter b1base to determine the reference parameters a1base and b1base.

The identifier 21 uses the reference parameters a1base and b1base determined by the parameter scheduler 30 to calculate a parameter correction value dθ according to the following equation (71), using a vector θbase defined by the following equation (70), KP calculated according to the above equation (65), and e_id calculated according to the above equation (63).

$$\theta\text{base}^T(k) = [a1\text{base}(k) b1\text{base}(k) 0] \quad (70)$$

$$d\theta(k) = d\theta(k-1) + KP(k) \cdot e\_id(k) \quad (71)$$

The identifier 21 calculates a new model parameter $\theta^T(k) = $ (a1(k), b1(k), c1(k)) according to the following equation (72).

$$\theta(k) = \theta\text{base}(k) + d\theta(k) \quad (72)$$

Thus, based on a reference parameter (a1base, b1base, or 0) determined by the parameter scheduler 30 on the basis of dynamic characteristics, such as the clutch rotational speed NC and the clutch stroke Pcl, of the clutch assembly 4, the identifier 21 carries out identification processing of the model parameters (a1, b1, and c1). This allows the controller 1c to adapt itself to an abrupt change stably and swiftly if a dynamic characteristic of the clutch assembly 4 abruptly changes.

This arrangement makes it possible to improve the accuracy of implementing a specified follow-up behavior of the actual clutch rotational speed NC in response to a change in the clutch rotational speed target value NC_cmd and a specified convergent behavior for a difference between the clutch rotational speed target value NC_cmd and the clutch rotational speed NC that is attributable to disturbance.

The response specifying control unit 10g having the seventh construction may also be provided with the adaptation law calculator, as in the case of the response specifying control unit 10e having the aforesaid fifth construction, to calculate an adaptation law input based on an identified model parameter b1, and then have the adder 17 add the adaptation law input to calculate the clutch stroke Pcl.

Referring now to FIG. 12, an eighth construction of the controller 1 will be explained. A controller 1h shown in FIG. 12 has a state predictor 26 added to the controller 1d having the fourth construction shown in FIG. 8. Like reference numerals will be assigned to like components as those of the controller 1d having the fourth construction, and the descriptions thereof will be omitted.

The controller 1h shown in FIG. 12 differs from the controller 1g shown in FIG. 11 in that a response specifying control unit 10h has an adaptive disturbance observer 50, while it has no identifier. Furthermore, processing in a parameter scheduler 41 is different from that in the parameter scheduler 40 shown in FIG. 11.

The parameter scheduler 41 determines model parameters (a1sc, b1sc) by searching a map that shows a correlation between operational parameters, such as the clutch rotational speed NC and the clutch stroke Pcl, and the model parameters (a1sc, b1sc) by applying the operational parameters. Data MAP_data of the map is stored beforehand in a memory (not shown).

An adaptive disturbance observer 50 uses schedule values (a1sc, b1sc) of the model parameters determined by the parameter scheduler 41 to calculate a clutch rotational speed estimated value NC_hat according to the following equation

(74) from a vector θ defined by the following equation (73) and ζ obtained by the above equation (60).

$$\theta^T(k) = [a1sc(k)\, b1sc(k)\, c1(k)]\quad(73)$$

where a1sc, b1sc: Schedule values of model parameters $$NC\_\text{hat}(k) = \theta^T(k-1)\cdot\zeta(k)\quad(74)$$

The adaptive disturbance observer 50 then calculates a difference e_dov between the clutch rotational speed estimated value NC_hat and the actual clutch rotational speed NC according to the following equation (75), and the difference e_dov is substituted in a recurrence formula of the following equation (76) to calculate an identification value c1(k) of a disturbance component c1.

$$e\_dov(k) = NC(k) - NC\_\text{hat}(k)\quad(75)$$

$$c1(k) = c1(k-1) + \frac{Pdov}{1+Pdov} e\_dov(k)\quad(76)$$

where Pdov: Coefficient of identification gain

The reaching law input calculator 15 calculates the reaching law input Urch according to the following equation (77) in which the model parameter b1(k) in the above equation (67) has been replaced by a schedule value b1sc(k) of a model parameter determined by the parameter scheduler 41.

$$Urch(k) = -\frac{Krch}{b1sc(k)} \cdot \sigma(k)\quad(77)$$

The equivalent control input calculator 12 calculates the equivalent control input Ueq by substituting the disturbance component c1(k) calculated by the above equation (76) in the following equation (78) in which the model parameters a1(k) and b1(k) of the above equation (68) have been replaced by schedule values a1sc(k) and b1sc(k) of the model parameters determined by the parameter scheduler 41.

$$Ueq(k) = \frac{1}{b1sc(k)}\{(1 - a1sc(k) - POLE)\cdot \text{Pre\_NC}(k) + \quad(78)$$
$$POLE\cdot \text{Pre\_NC}(k-1) - c1(k) + NC\_cmd\_f(k+1) +$$
$$(POLE - 1)\cdot NC\_cmd\_f(k) - POLE\cdot NC\_cmd\_f(k-1)\}$$

The adder 17 adds the reaching law input Urch and the equivalent control input Ueq according to the above equation (69) to calculate the clutch stroke Pcl to be supplied to the clutch assembly 4.

The response specifying control unit 10h of the controller 1h explained above allows computation load required for calculating the clutch stroke Pcl in each control cycle can be reduced by identifying only the disturbance component c1 among the model parameters a1, b1 and c1 by the adaptive disturbance observer 50.

With this arrangement, the control cycle of the controller 1h can be shortened, permitting improved controllability over a nonlinear characteristic, such as hysteresis, backlash, or friction, of the clutch assembly 4. Rather than using the parameter scheduler 41, fixed model parameters a1 and b1 may be used.

The response specifying control unit 10h having the eighth construction may also be provided with the adaption law calculator, as in the case of the response specifying control unit 10e having the fifth construction, to calculate an adaptation law input based on a scheduled model parameter b1sc, and then have the adder 17 add the adaptation law input to calculate the clutch stroke Pcl.

Referring now to the flowcharts shown in FIG. 13 through FIG. 17, a description will be given of a specific example of procedure for controlling the operation of the clutch assembly 4 by the controller 1c having the third construction among the controllers 1 (1a to 1h) described above. The same controlling procedure applies when the controller 1g having the seventh construction is used.

Figure 13:
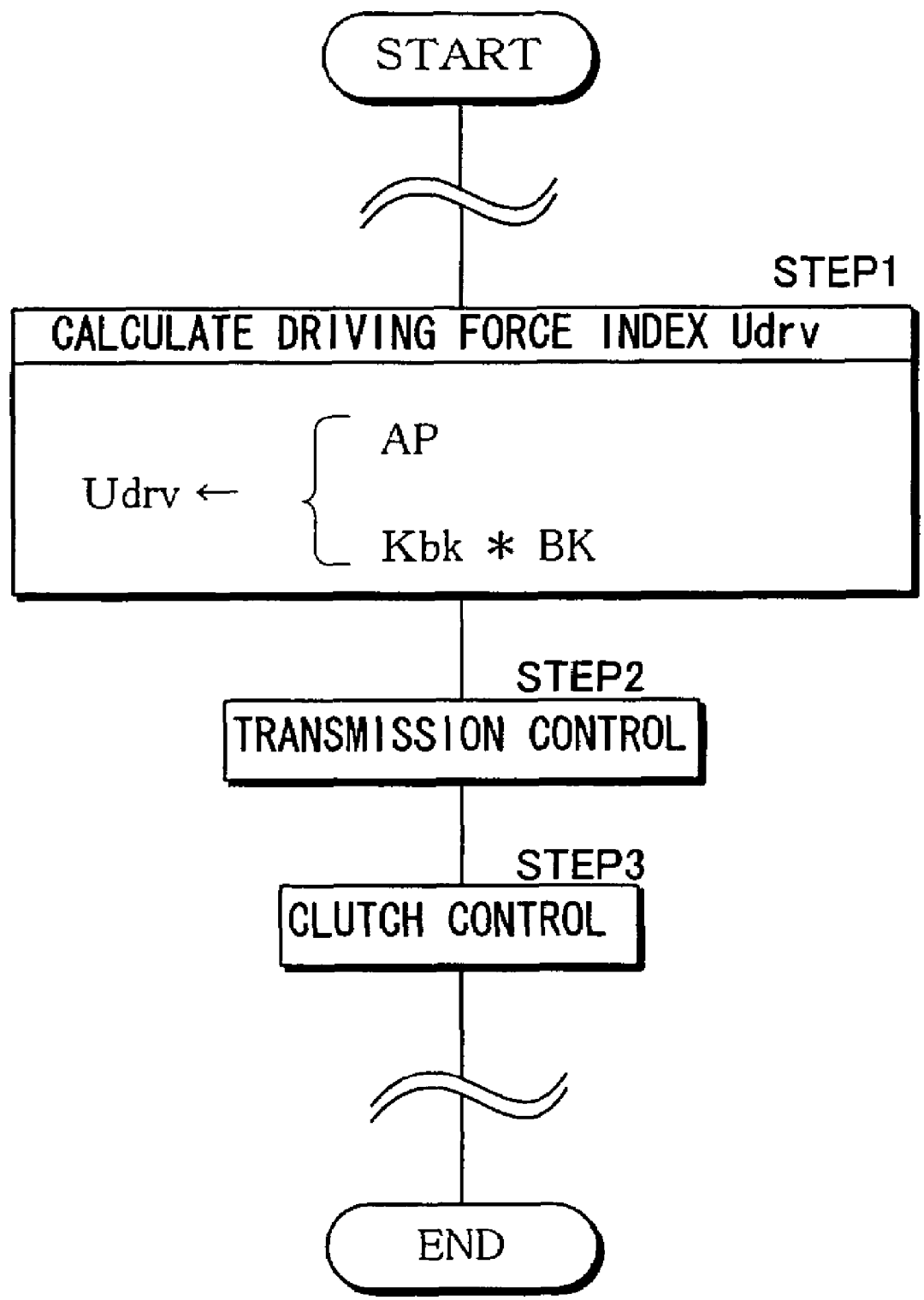
FIG. 13 is an operation flowchart of the controller.

FIG. 13 shows a flowchart of the main operation of the controller 1c. In STEP1, when a driver of a vehicle operates an accelerator pedal (not shown) or a brake pedal (not shown), the controller 1c determines a driving force index Udrv for setting a driving force to be applied to the drive wheels 6 of the vehicle 2, shown in FIG. 1A, using the following equation (79) according to the driver's operation.

$$Udv \leftarrow \begin{cases} AP & \text{(When the accelerator pedal is depressed)} \\ Kbk \times BK & \text{(When the brake pedal is depressed)} \end{cases}\quad(79)$$

where Udrv: Driving force index; AP: Degree of opening of the accelerator pedal; BK: Brake depressing force; and Kbk: Coefficient for converting brake depressing force (0 to maximum) into degrees of opening of accelerator pedal (0 to −90 degrees).

Based on the determined driving force index Udrv, the controller 1c determines in STEP2 whether a speed changing operation should be performed on a transmission (not shown) connected to the clutch assembly 4 shown in FIG. 1A. If the controller 1c decides to perform the speed changing operation, then it carries out transmission control whereby to set the gear at a target speed so as to accomplish the speed changing operation of the transmission. In the following STEP3, the controller 1c carries out clutch control for controlling the slip rate of the clutch assembly 4.

Referring now to the flowcharts shown in FIG. 14 and FIG. 15, the procedure for executing the transmission control by the controller 1c will be explained. The controller 1c first checks in STEP10 of FIG. 14 whether the driver of the vehicle has issued a request for reverse. If the request for reverse has been issued, then the controller 1c proceeds to STEP20 wherein it sets the gear selection target value NGEAR_cmd to −1, which denotes reverse.

Figure 14:
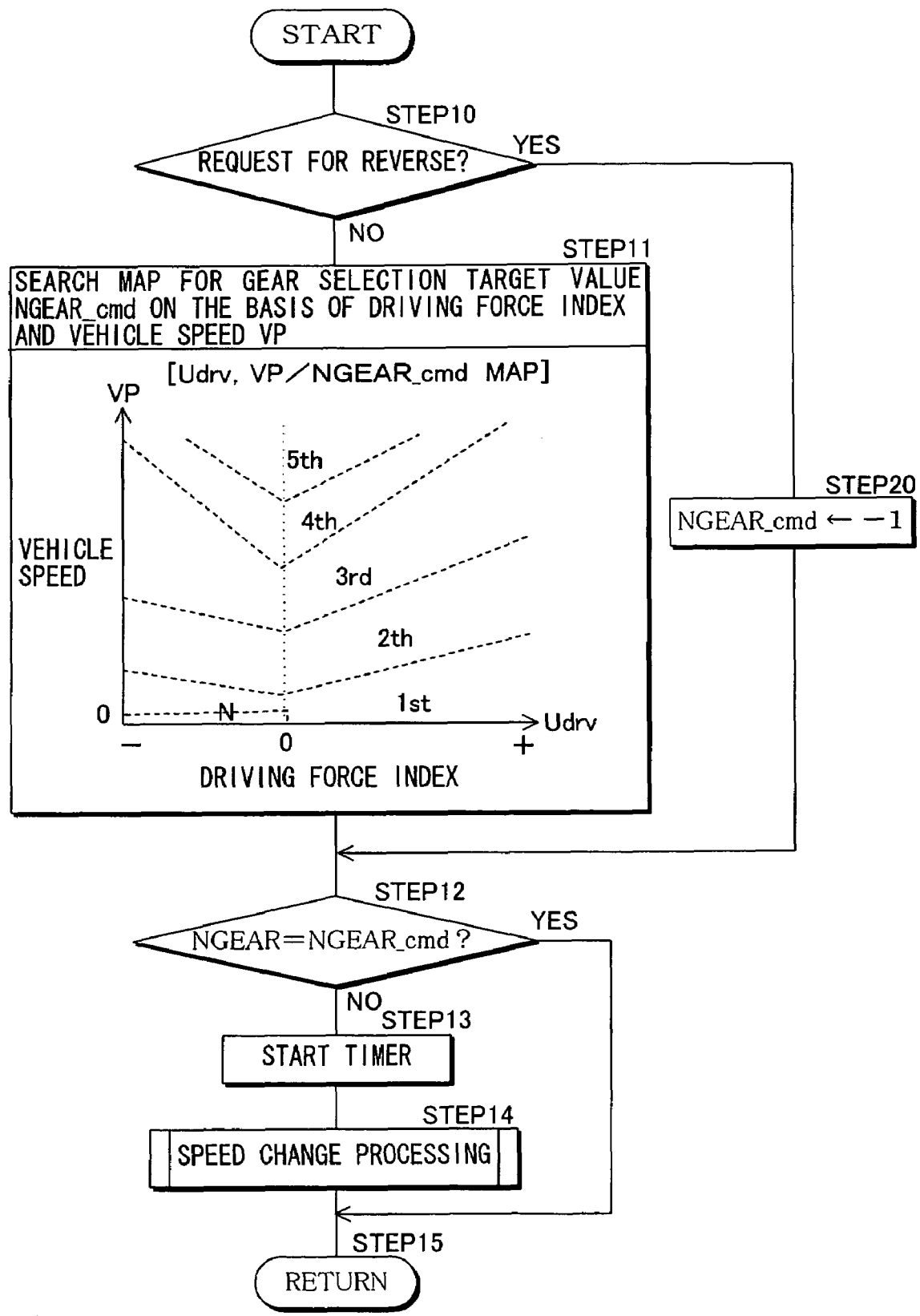
FIG. 14 is an operation flowchart of the controller.

If it is determined in STEP10 that no request for reverse has been issued, then the controller 1c proceeds to STEP11 wherein it applies the driving force index Udrv and the vehicle speed VP of the vehicle 2 to a Udrv,VP/NGEAR_cmd map shown in FIG. 14 so as to determine the gear selection target value NGEAR_cmd. Table 1 below shows the relationship between the gear selection target value NGEAR_cmd and selected gear positions.

TABLE 1

Correspondence between gear selection target value NGEAR_cmd and selected gear position

| | NGEAR_cmd | | | | | | | |
|---|---|---|---|---|---|---|---|---|
| | −1 | 1 | 2 | 3 | 4 | 5 | 6 | 0 |
| Gear position | Reverse | 1st gear | 2nd gear | 3rd gear | 4th gear | 5th gear | 6th gear | Neutral |

In the subsequent STEP12, the controller 1c determines whether a selected gear position NGEAR of the transmission coincides with a gear selection target value NGEAR_cmd. If it is determined that the selected gear position NGEAR of the transmission coincides with a gear selection target value NGEAR_cmd, then the controller 1c proceeds to STEP15 without carrying out the speed changing operation on the transmission.

If it is determined in STEP12 that the selected gear position NGEAR of the transmission does not coincide with a gear selection target value NGEAR_cmd, then the controller 1c proceeds to STEP13 wherein the controller 1c starts a timer and implements a subroutine for speed changing operation processing of the transmission in the next STEP14.

The speed changing operation of the transmission is performed by three steps, namely, a clutch OFF step in which the clutch assembly 4 is set to a clutch OFF state to set a shift/select device of the transmission movable, a gear position changing step in which the gear selection position of the transmission is changed to a position corresponding to the gear selection target value NGEAR_cmd by the shift/select device in the clutch OFF state, and a clutch ON step in which the clutch assembly 4 is set back to the clutch ON state after the gear position changing step is finished.

To set the timings from the moment the timer was started in STEP13 to the moment each step is completed, clutch OFF completion time TM_CLOFF, gear position change completion time TM_SCHG, and clutch ON completion time TM_CLON are preset on the basis of assumed completion time of each step (TM_CLOFF<TM_SCHG<TM_CLON).

Figure 15:
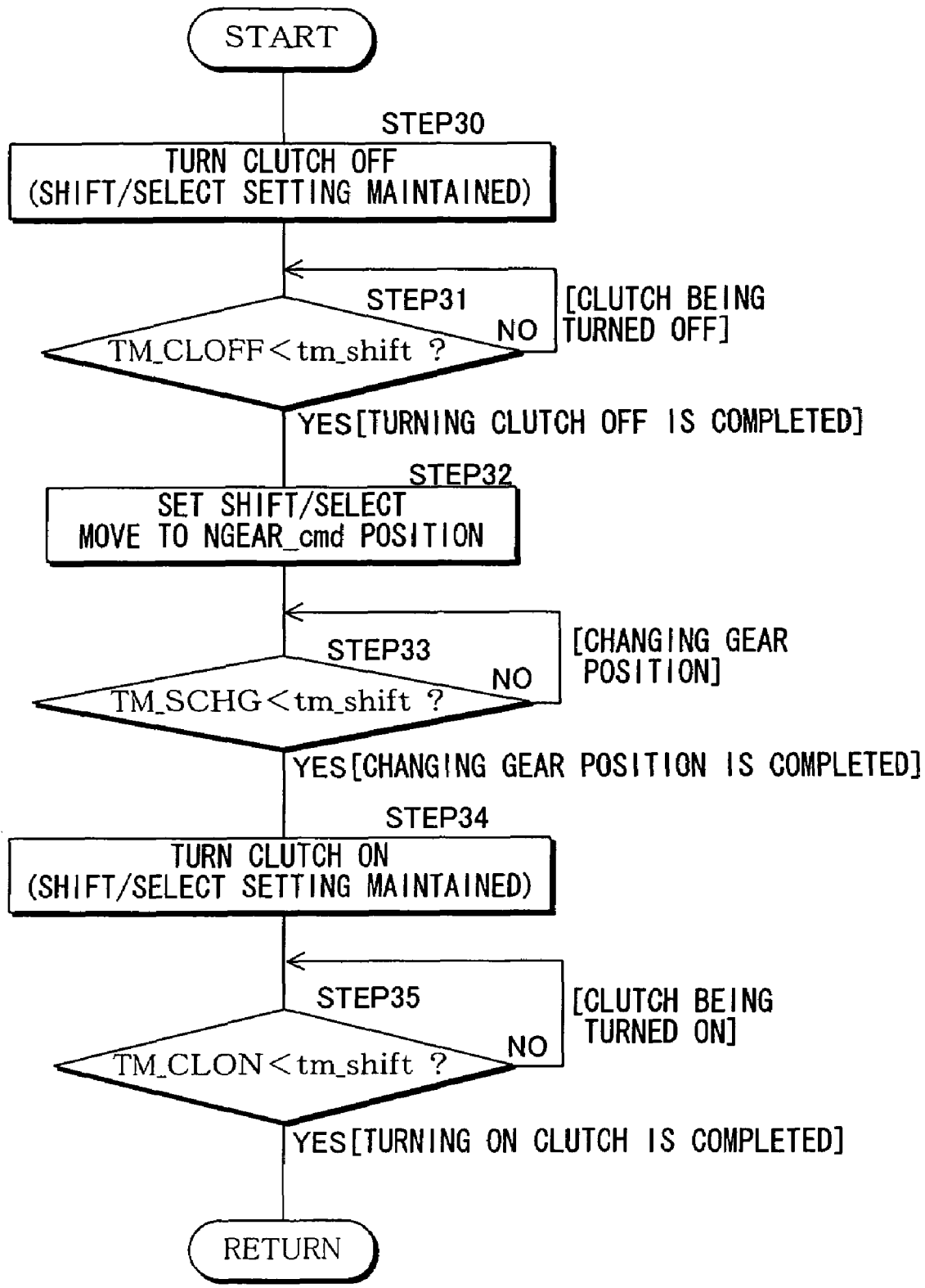
FIG. 15 is an operation flowchart of the controller.

FIG. 15 shows a flowchart of the subroutine for the speed changing operation processing implemented in STEP14 shown in FIG. 14. The controller 1c first turns the clutch assembly 4 off in STEP30. Then, when clocking time tm_shift on the timer exceeds the clutch OFF completion time TM_CLOFF in STEP31, that is, when the clutch OFF step is finished, then the controller 1c proceeds to STEP32 wherein the controller 1c begins an operation for changing the gear selection position of the transmission to a position based on the gear selection target value NGEAR_cmd by the shift/select device.

In the STEP33, when the clocking time tm_shift on the timer exceeds a gear position change completion time TM_SCHG in STEP33, the controller 1c determines that the gear position changing step is completed and proceeds to STEP34 to turn the clutch assembly 4 on.

In the subsequent STEP35, when the clocking time tm_shift on the timer exceeds the clutch ON completion time TM_CLON, the controller 1c determines that the clutch ON step is finished and terminates the speed changing operation processing.

Referring now to the flowcharts shown in FIG. 16 and FIG. 17, the procedure for executing the clutch control will be explained. The controller 1c first determines in STEP80 whether the actual gear selection position NGEAR of the transmission coincides with the gear selection target value NGEAR_cmd.

Figure 16:
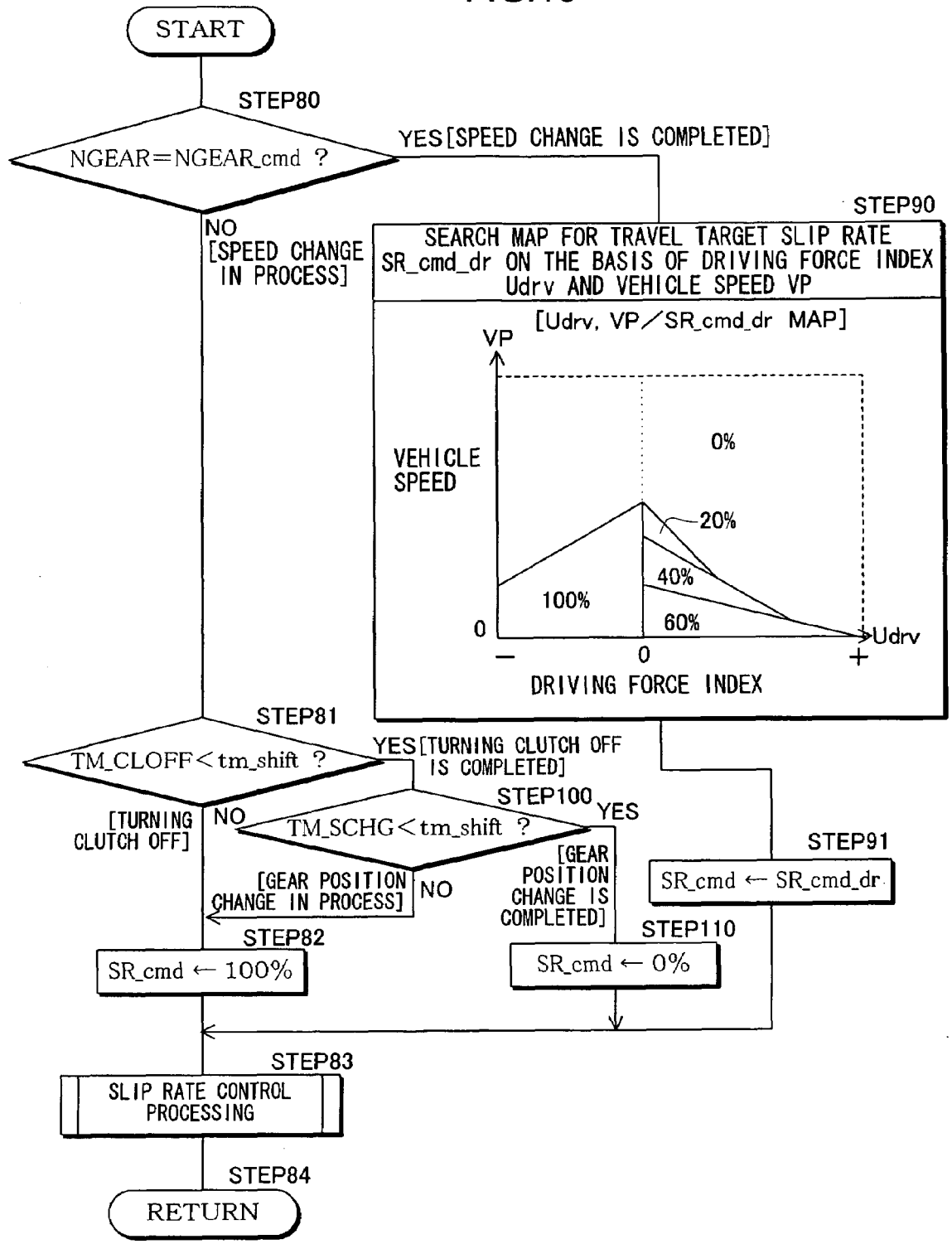
FIG. 16 is an operation flowchart of the controller.

If it is determined in STEP80 that the gear selection position NGEAR of the transmission coincides with the gear selection target value NGEAR_cmd, i.e., the speed changing operation is finished, then the controller 1c proceeds to STEP90 wherein the controller 1c applies a driving force index Udrv and the actual vehicle speed VP to the Udrv, VP/SR_cmd_dr map shown in FIG. 16 to determine a travel target slip rate SR_cmd_dr.

Data of the Udrv,VP/SR_cmd_dr map is stored in a memory (not shown) in advance, the travel target slip rate SR_cmd_dr of the clutch assembly 4 being set within a range of 0% (clutch ON, no slip) to 100% (clutch OFF).

If, on the other hand, it is determined in STEP80 that the actual gear selection position NGEAR of the transmission does not agree with the gear selection target value NGEAR_cmd, that is, if the speed changing operation processing is being implemented, then the controller 1c proceeds to STEP81 wherein it determines whether clocking time tm_shift on the timer exceeds the clutch OFF completion time TM_CLOFF.

If it is determined that the clocking time tm_shift on the timer exceeds the clutch OFF time TM_CLOFF, i.e., the speed changing operation processing is being implemented, then the controller 1c proceeds to STEP82 wherein it sets the target slip rate SR_cmd to 100% (clutch OFF), and then proceeds to the following STEP83. The controller 1c calculates a clutch stroke target value Pcl_cmd based on the target slip rate SR_cmd in STEP83.

If on the other hand, it is determined in STEP81 that the clocking time tm_shift on the timer exceeds the clutch OFF completion time TM_CLOFF, i.e., if the clutch OFF step has been completed then the controller 1c proceeds to STEP100 wherein it determines whether the clocking time tm_shift on the timer exceeds a gear position change completion time TM_SCHG.

If the clocking time tm_shift on the timer exceeds the gear position change completion time TM_SCHG, that is, if the gear position changing step has been completed, then the controller 1c proceeds to STEP110 wherein the controller 1c sets the target slip rate SR_cmd to 0% (clutch ON, no slip).

If, on the other hand, it is determined in STEP100 that the clocking time tm_shift on the timer has not exceeded the gear position change completion time TM_SCHG, that is, if the gear position changing step is being implemented, then the controller 1c proceeds to STEP82 wherein it sets the target slip rate SR_cmd to 100% (clutch OFF).

Then, in STEP83, the controller 1c carries out a subroutine for slip rate control processing for controlling the clutch stroke Pcl so as to reach a target slip rate SR_cmd (0 to 100%).

Figure 17:
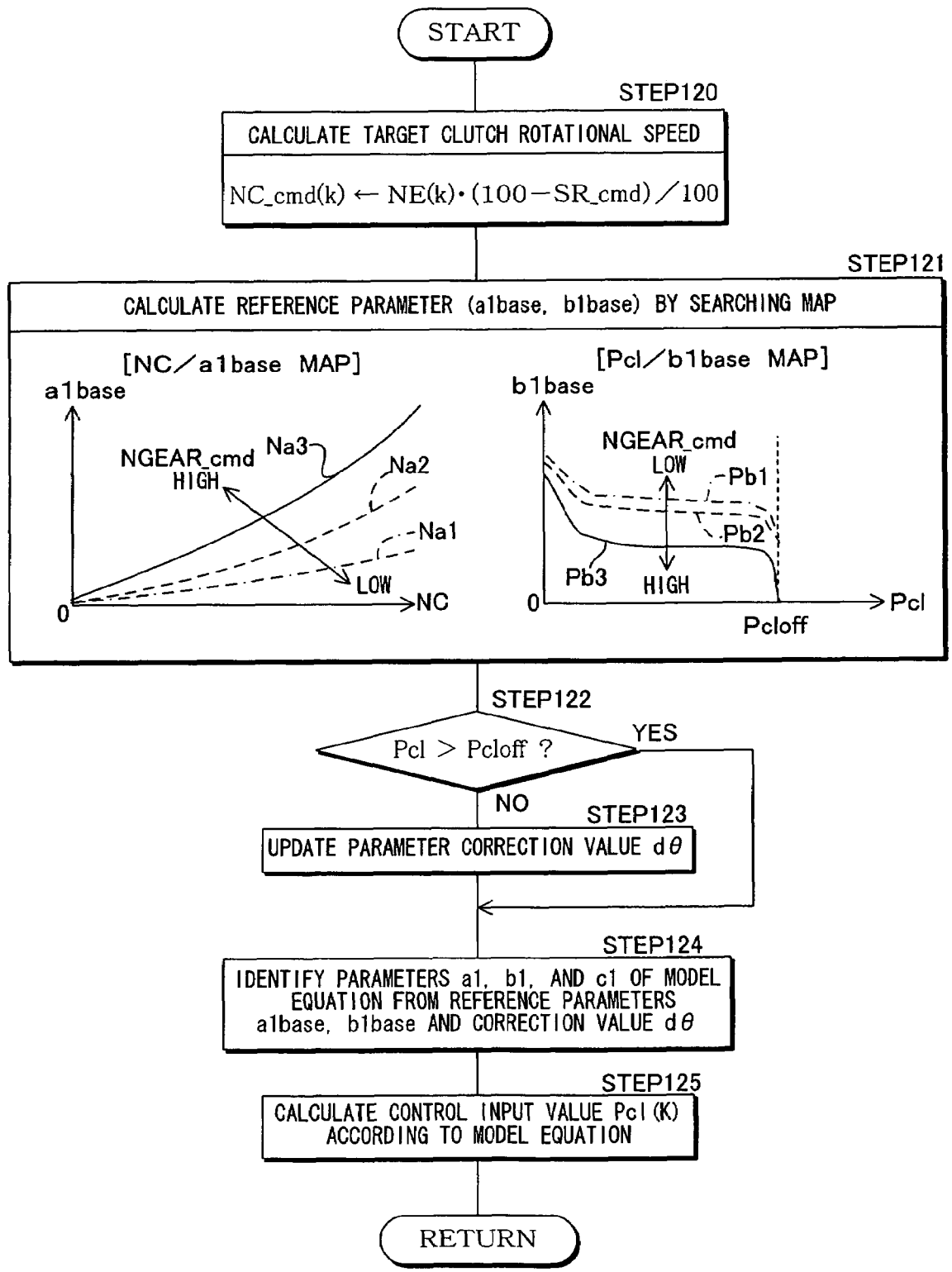
FIG. 17 is an operation flowchart of the controller.
Figure 18A:
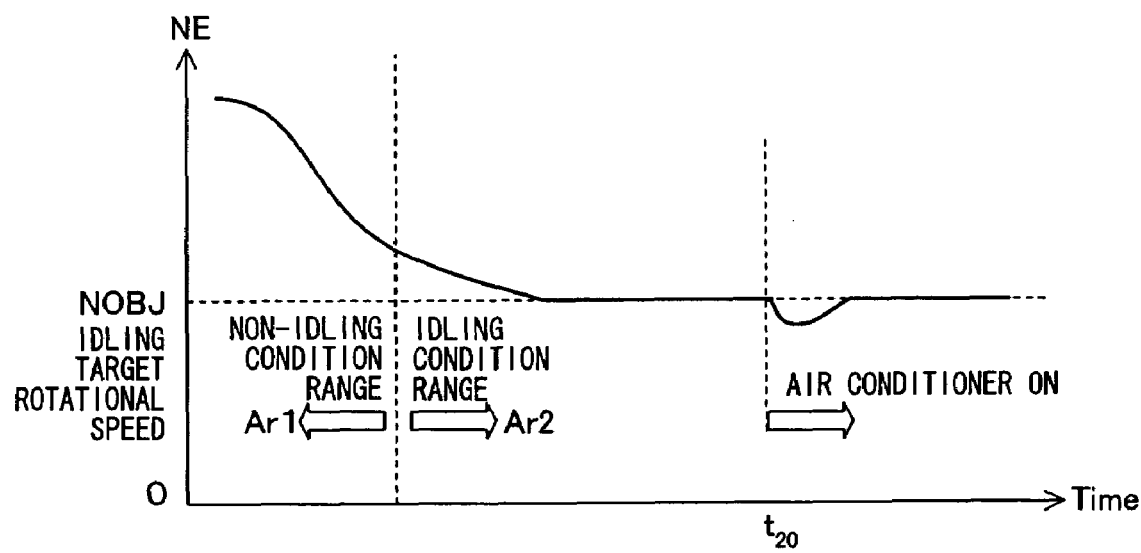
FIGS. 18A and 18B are explanatory diagrams showing a case where the present invention has been applied to rotational speed control of an engine.
Figure 18B:
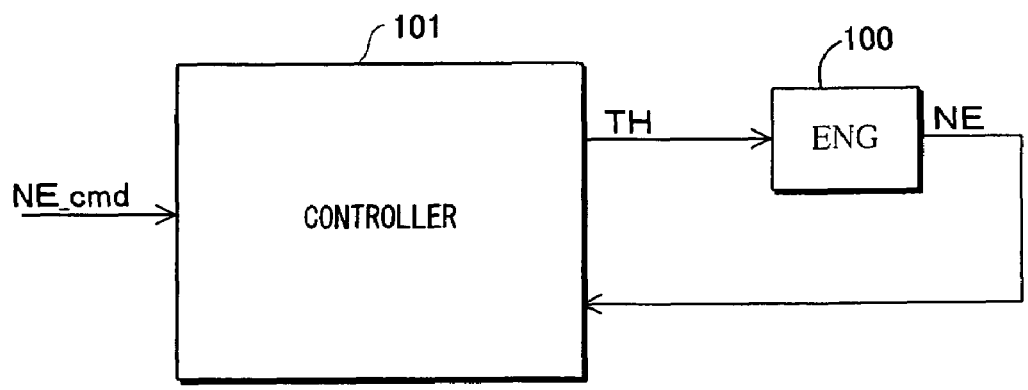

FIG. 17 shows a flowchart of a subroutine for the slip rate control processing implemented in STEP83 of FIG. 16. The controller 1c first calculates the clutch rotational speed target value NC_cmd according to the following equation (80) in STEP120.

$$NC\_cmd-NE(k)=NE(k)\cdot(100-SR\_cmd)/100 \qquad (80)$$

where NC_cmd(k): Clutch rotational speed target value in k-th control cycle; NE(k): Clutch rotational speed in k-th control cycle; and SR_cmd: Target slip rate.

Subsequent STEP121 through STEP125 indicate the processing implemented by a response specifying control unit 10c shown in FIG. 6 provided in the controller 1c. In STEP121, a parameter scheduler 30 installed in the response specifying control unit 10c applies a clutch rotational speed NC to an NC/a1base map shown in FIG. 17 to determine a reference parameter a1base(k), and also applies the clutch stroke Pcl to a Pcl/b1base map shown in FIG. 17 to determine a reference parameter b1base(k).

If it is determined in the next STEP122 that the clutch stroke Pcl has not exceeded a clutch OFF position Pcl_off, that is, if the state is not the clutch OFF state, then the response specifying control unit 10c proceeds to STEP123 wherein a correction value dθ of a model parameter is calculated by the identifier 21 shown in FIG. 6 according to the above equation (30).

If, on the other hand, it is determined in STEP122 that the clutch stroke Pcl has exceeded the clutch OFF position Pcl_off, that is, if the state is the clutch OFF state, then the response specifying control unit 10c proceeds to STEP124 without updating the correction value dθ of the model parameter by the identifier 21. This arrangement makes it possible to prevent the disturbance term c1(k) calculated according to the above equation (31) from being enlarged due to an increase in the correction value dθ of the model parameter if the clutch rotational speed NC does not reach zero (the target clutch rotational speed NC_cmd based on the target slip rate 100%) in the clutch OFF state while the speed changing operating is being performed.

In STEP124, the identifier 21 calculates model parameter identification values a1(k), b1(k) and c1(k) according to the above equation (31). In the subsequent STEP125, the equivalent control input calculator 12, the subtracter 13, the switching function value calculator 14, the reaching law input calculator 15, and the adder 17 carry out computation according to the above equations (26) to (28) so as to determine the clutch stroke Pcl(k) supplied to the clutch assembly 4.

In the first embodiment, the clutch stroke Pcl was determined by the response specifying control unit 10 using the response specifying control. Alternatively, however, other types of response specifying control, such as sliding mode control or back-stepping control, may be used.

The first embodiment has illustrated an example in which the present invention has been applied to the clutch assembly 4. The present invention, however, can be applied also to other types of plants. FIG. 18 shows an example in which the present invention has been applied to control of the rotational speed Ne (corresponding to an output value of a plant in the present invention) of an engine 100 (corresponding to the plant in the present invention).

For instance, to set the engine 100 to an idling mode after the vehicle stops traveling, it is required to gradually shift the rotational speed NE of the engine 100 into an idling condition range (Ar2 in FIG. 18A) from a non-idling condition range (Ar1 in FIG. 18A) smoothly toward an idling target rotational speed NOBJ without causing an overshoot.

While the engine 100 is in the idling mode, if the engine rotational speed NE drops, as indicated by $t_{20}$ in FIG. 18A, for example, by an electric load, such as an air conditioner or a power steering pump, being turned ON/OFF, then the engine rotational speed NE must be promptly set back to the idling target rotational speed NOBJ.

In other words, controlling the engine rotational speed NE also requires two different types of responsiveness be independently specified, one for (1) smooth follow-up of the engine rotational speed NE in response to changes in a target rotational speed, and (2) quick convergence of the difference between a target rotational speed and the engine rotational speed NE when the engine rotational speed NE changes due to disturbance.

If the engine 100 has a dead time characteristic, then there will be an additional requirement for (3) restraining influences of dead time so as to maintain good stability and quick response in the rotational speed control of the engine 100.

As shown in FIG. 18B, the control that satisfies the aforesaid requirements (1) to (3) can be accomplished by using a construction in accordance with the present invention with a controller 101 that controls a degree of opening TH of a throttle (not shown) for adjusting the volume of air intake into the engine 100 such that the rotational speed NE of the engine 100 coincides with a target rotational speed NE_cmd.

Second Embodiment

Referring now to FIG. 19 through FIG. 41, a second embodiment of the present invention will be described.

Figure 19:
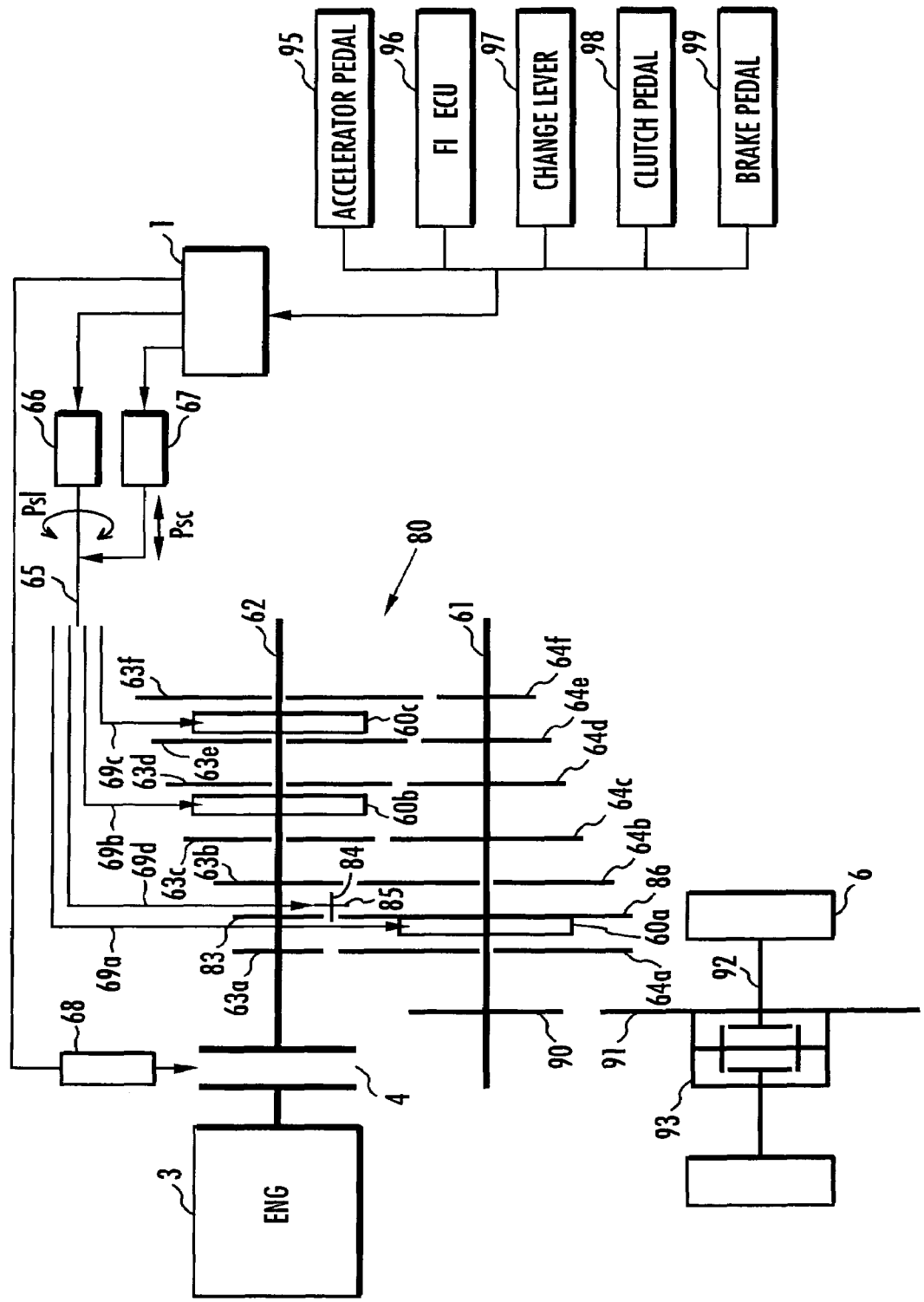
FIG. 19 is a construction diagram of a transmission.
Figure 20:
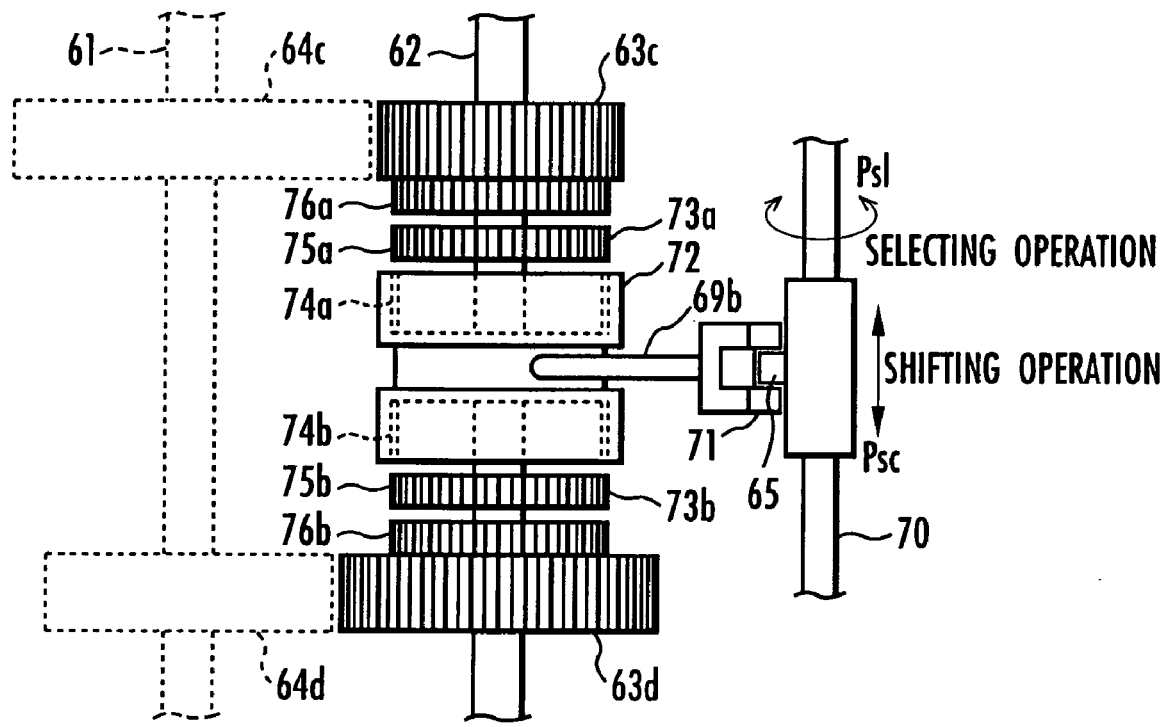
FIGS. 20A and 20B are detailed diagrams of a shifting/selecting mechanism of the transmission shown in FIG. 19.
Figure 20:
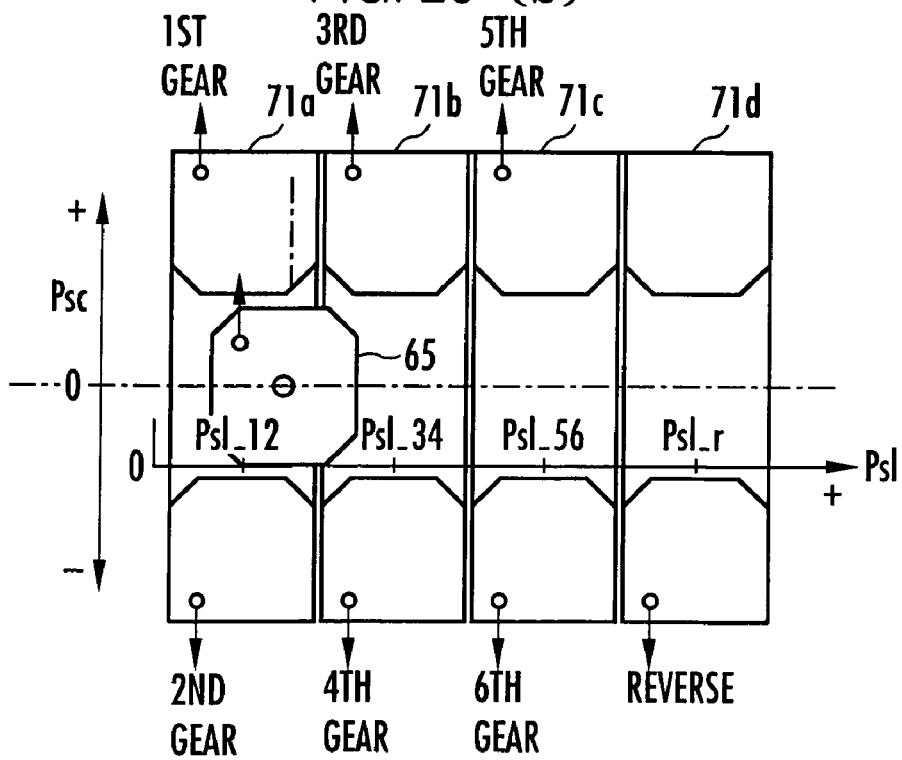
Figure 21:
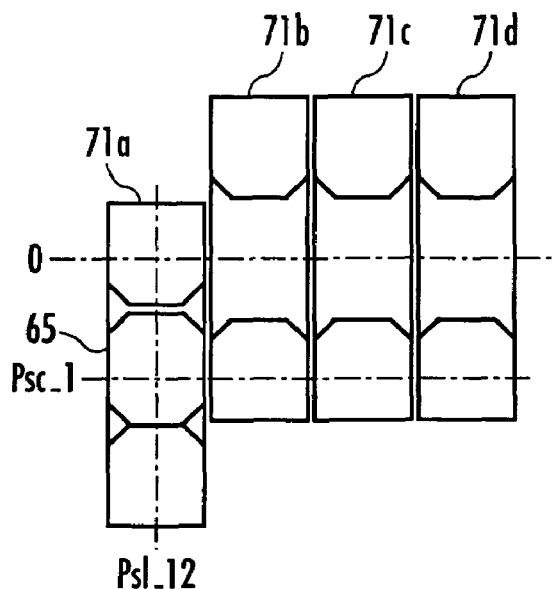
FIGS. 21A, 21B, 21C, and 21D are explanatory diagrams of an operation of the transmission.
Figure 21:
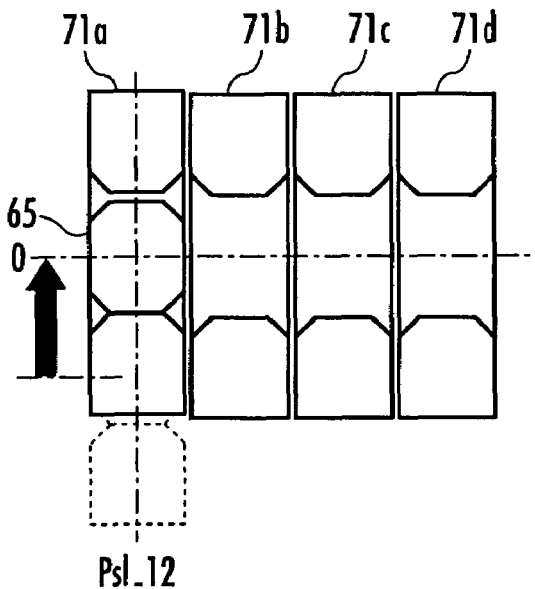
Figure 21:
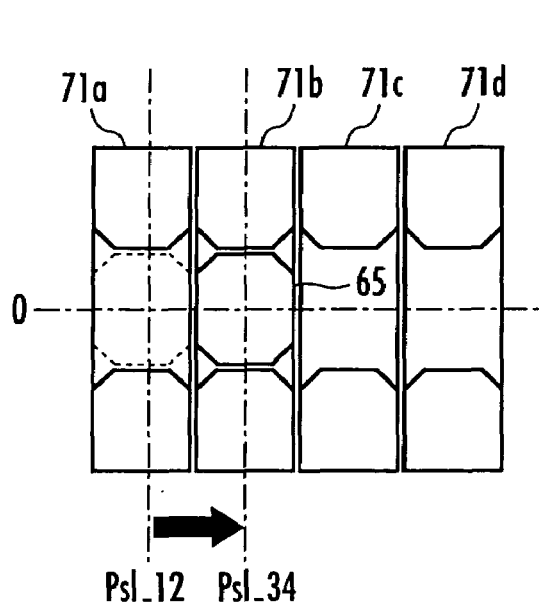
Figure 21:
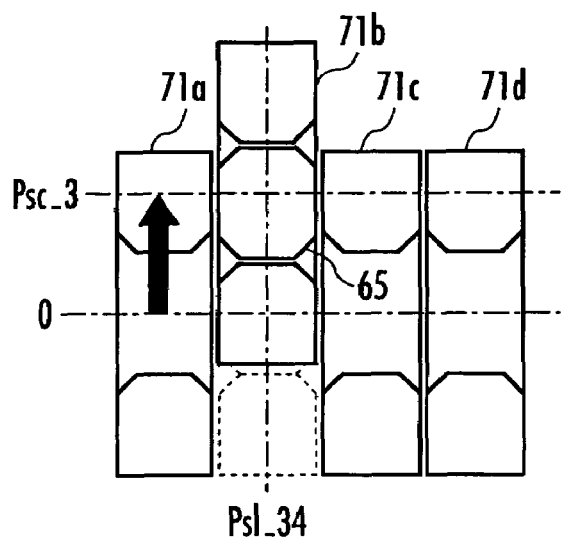
Figure 22:
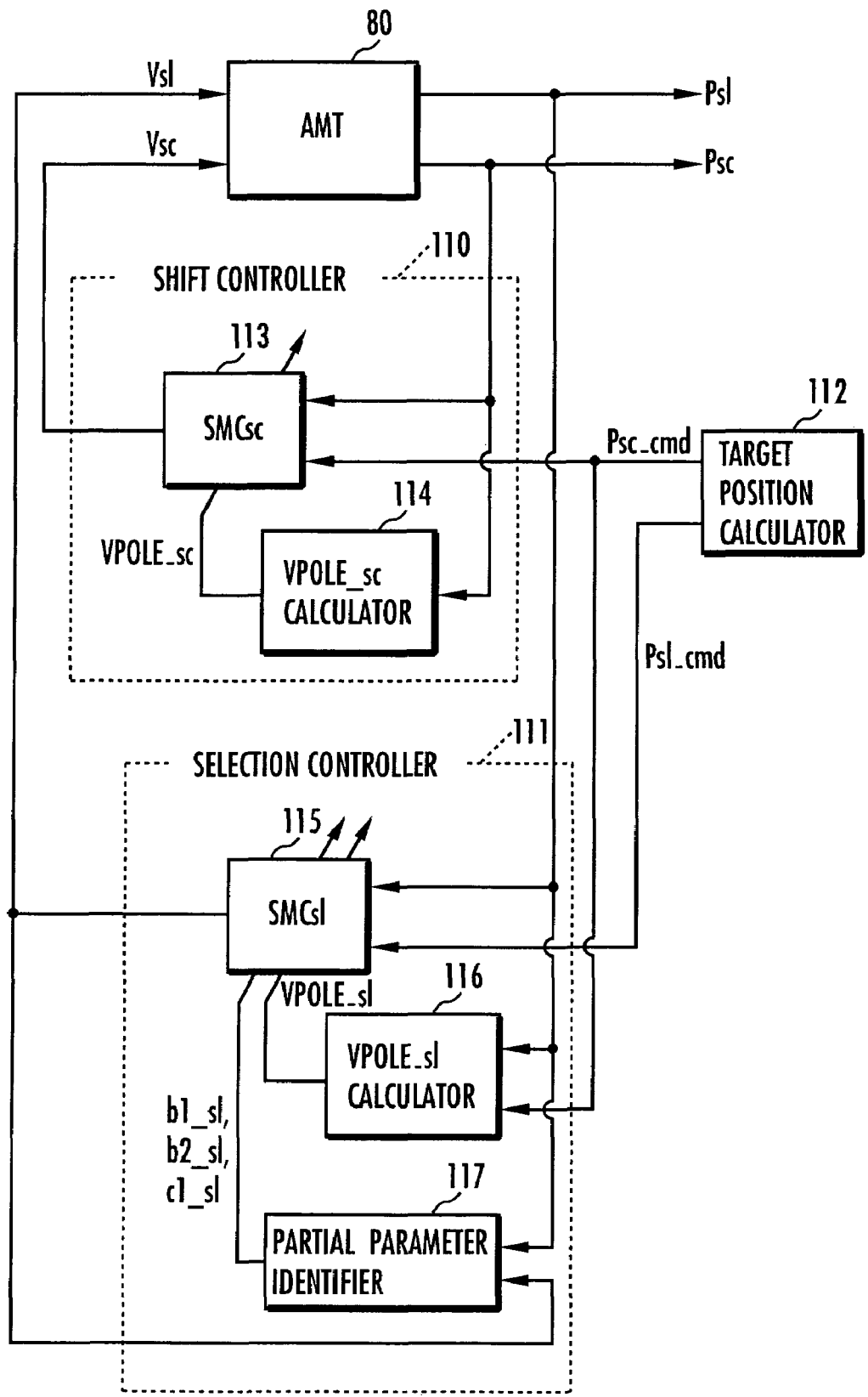
FIG. 22 is a construction diagram of a control unit for shifting and selecting operations that is installed in the controller shown in FIG. 19.
Figure 23:
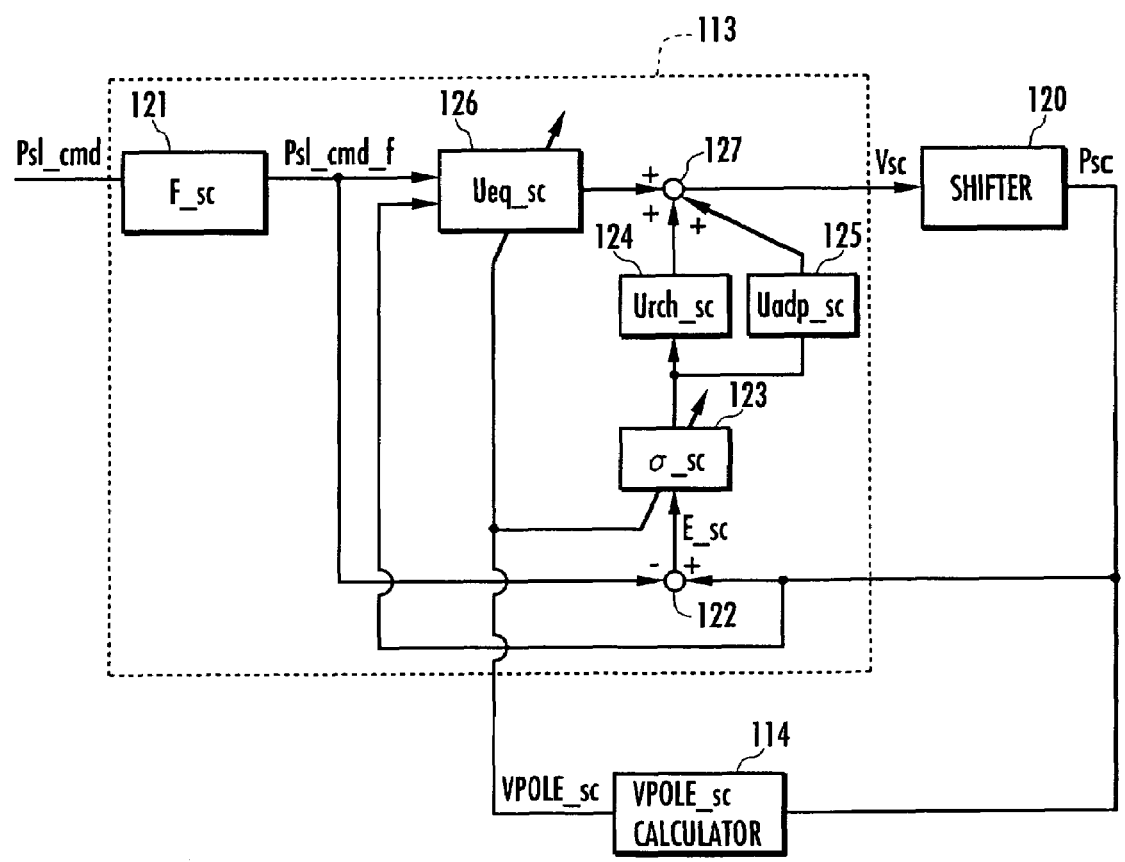
FIG. 23 is a block diagram of a selection controller.
Figure 24:
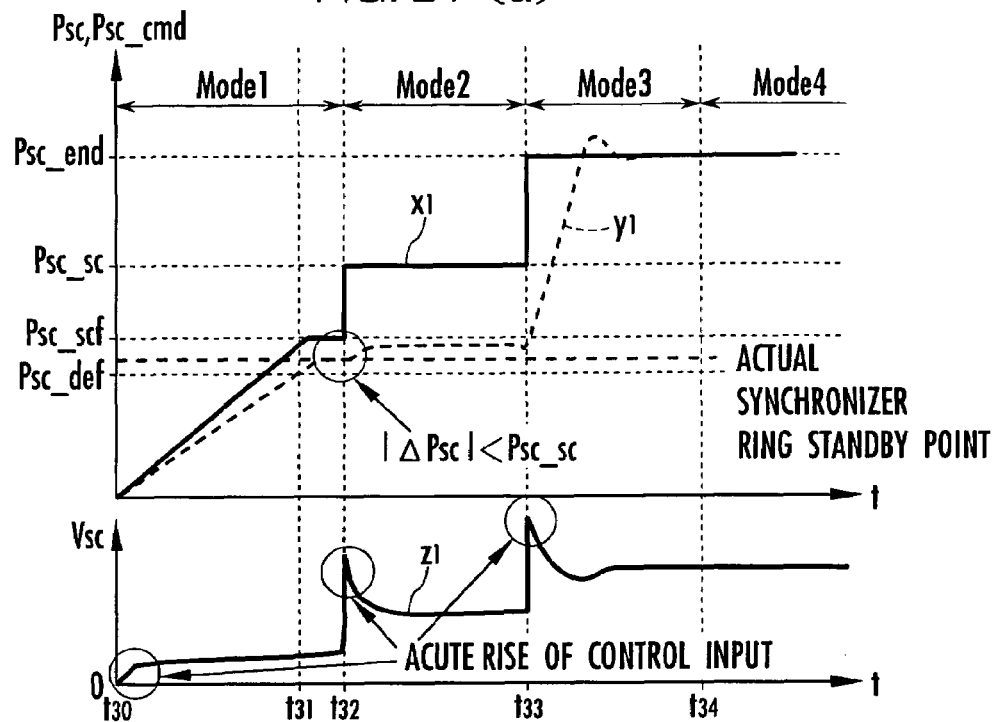
FIGS. 24A and 24B are graphs illustrating behaviors of convergence to a target position of a shift arm during a shifting operation when a sliding mode controller of 1 degree of freedom is used.
Figure 24:
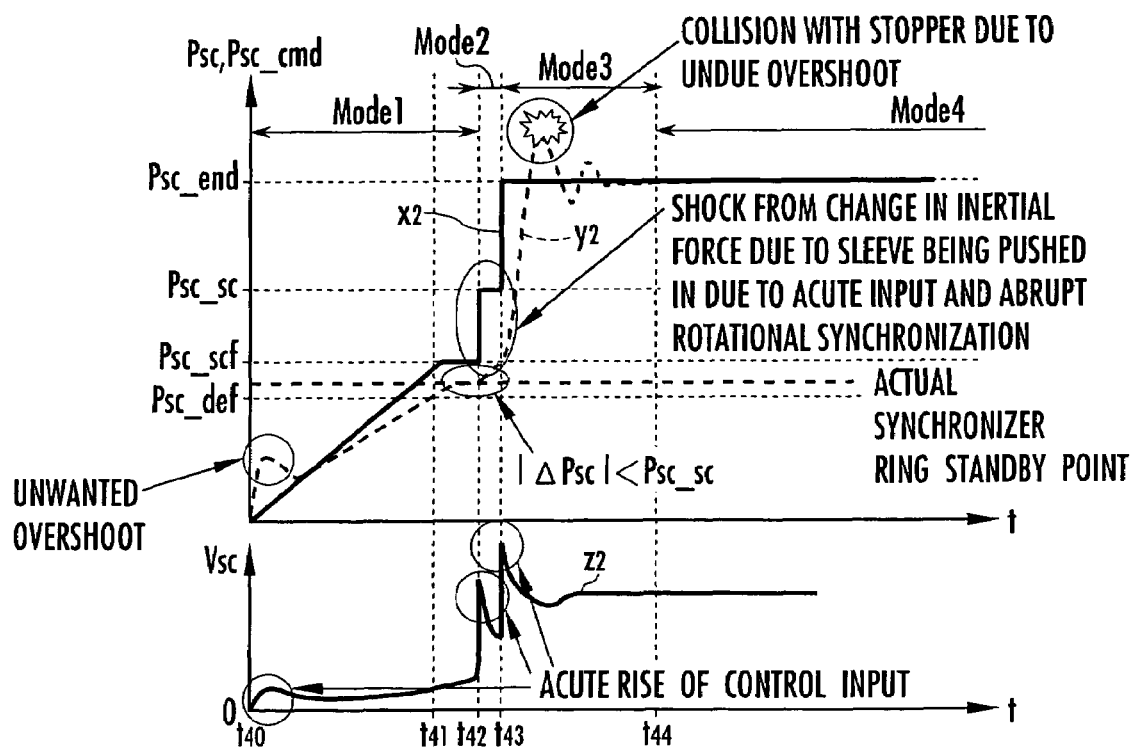
Figure 25:
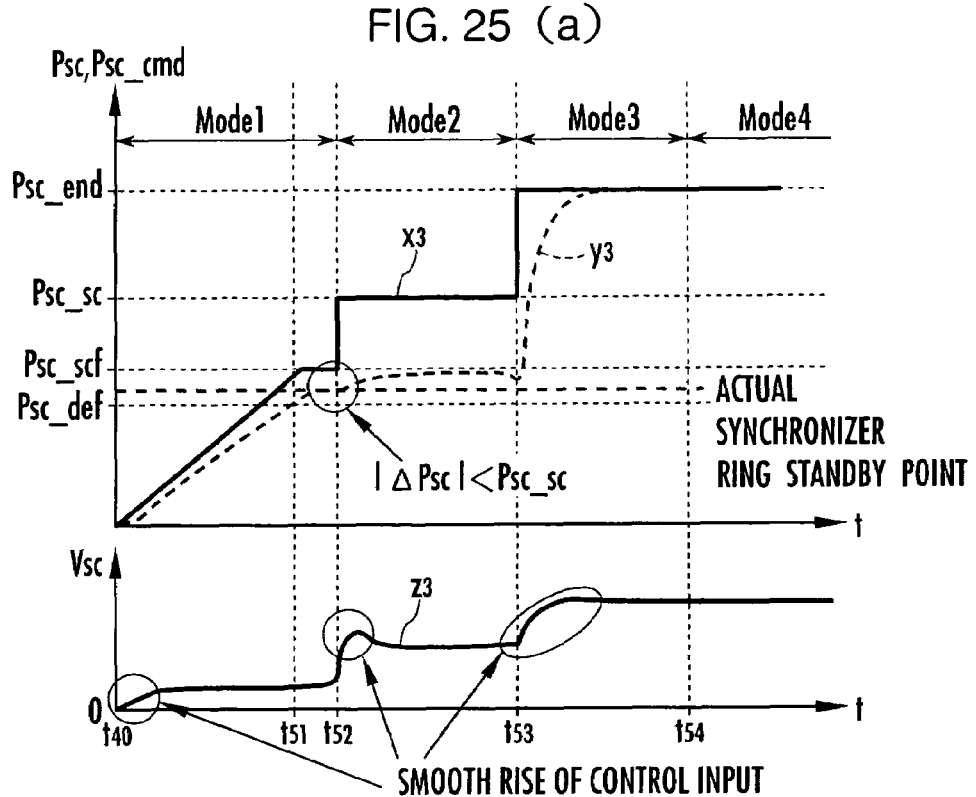
FIGS. 25A and 25B are graphs illustrating behaviors of convergence to a target position of a shift arm during a shifting operation when a sliding mode controller of 2 degrees of freedom is used.
Figure 25:
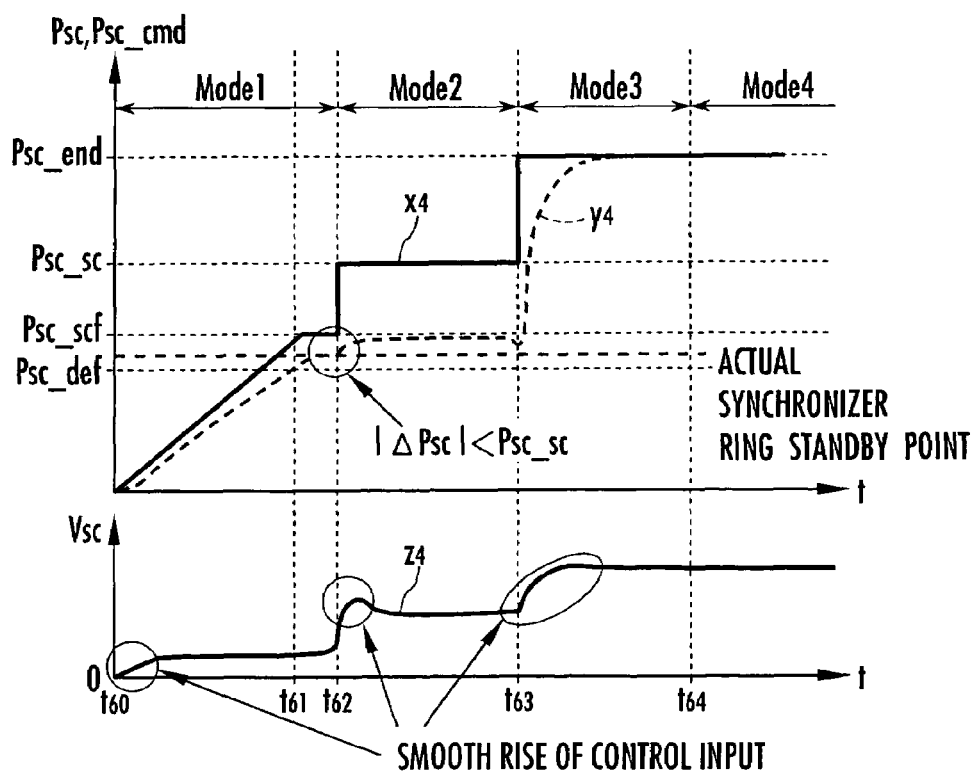

FIG. 19 is a construction diagram of a transmission mounted in the vehicle 2 shown in FIG. 1; FIGS. 20A and 20B are detailed diagrams of a shifting/selecting mechanism of the transmission; FIGS. 21A, 21B, 21C, and 21D are explanatory diagrams of the transmission; FIG. 22 is a construction diagram of a control unit for shifting and selecting operations that is installed in the controller 1 shown in FIG. 1; FIG. 23 is a block diagram of a selection controller shown in FIG. 22; FIGS. 24A and 24B are graphs illustrating behaviors of convergence to a target position of a shift arm during a shifting operation when a sliding mode controller of 1 degree of freedom is used; and FIGS. 25A and 25B are graphs illustrating behaviors of convergence to a target position of a shift arm during a shifting operation when a sliding mode controller of 2 degrees of freedom is used.

Figure 26:
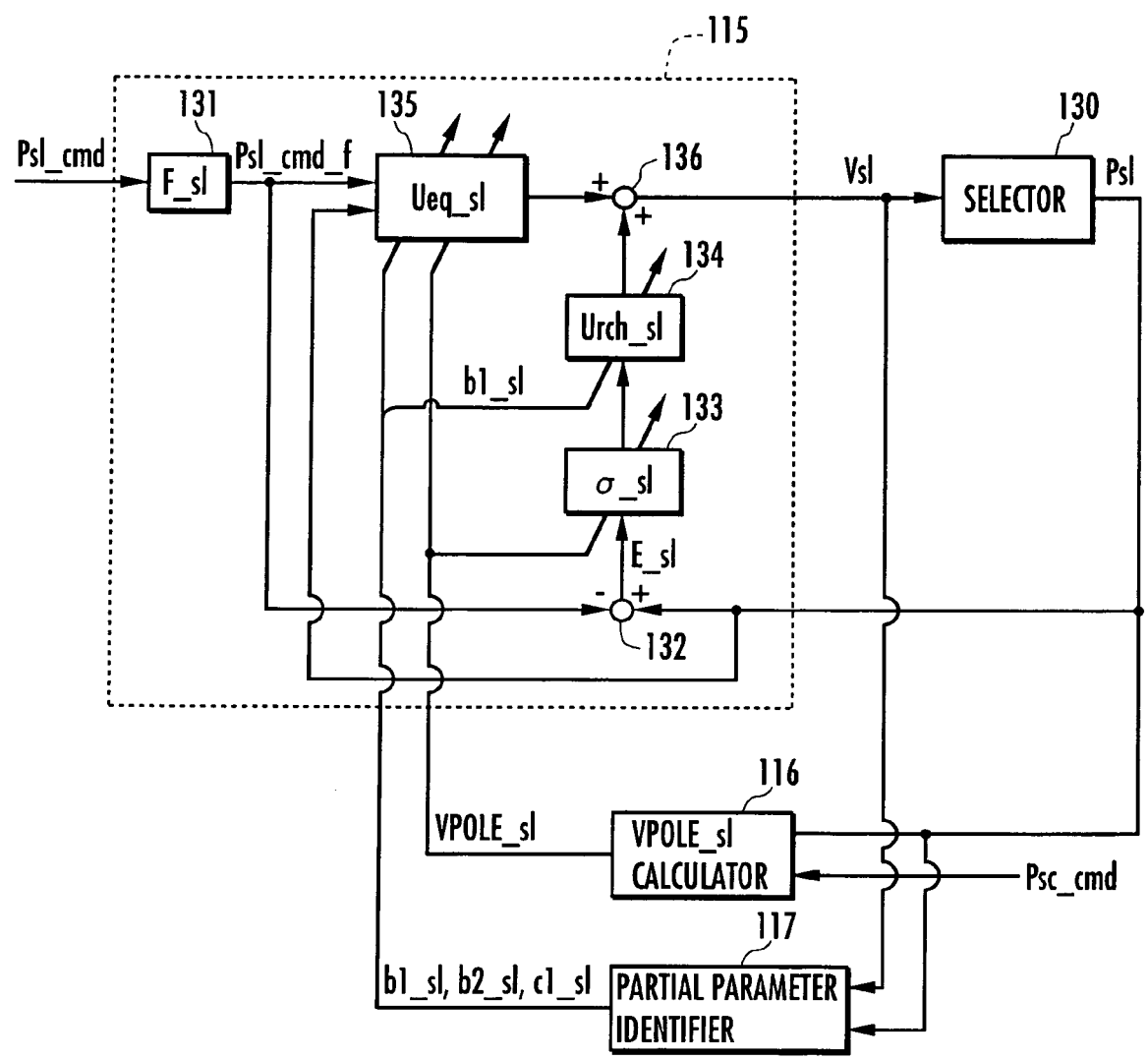
FIG. 26 is a block diagram of a selection controller.
Figure 27:
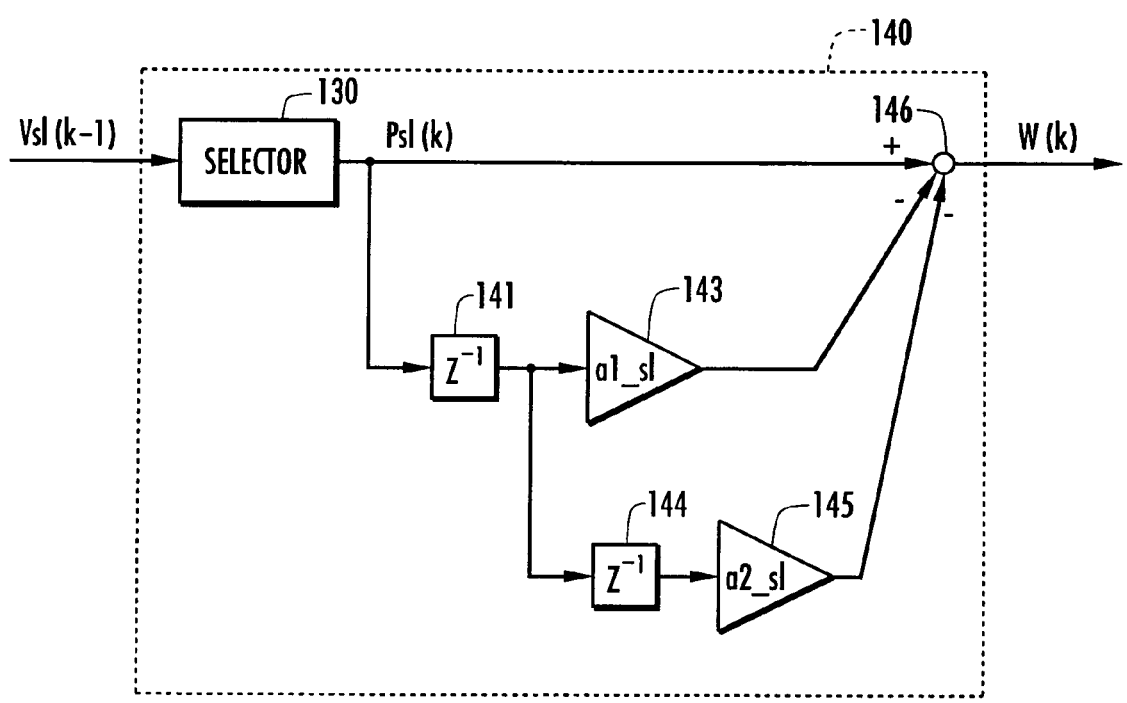
FIG. 27 is a block diagram of a virtual plant relating to an identifying method of a model parameter.
Figure 28:
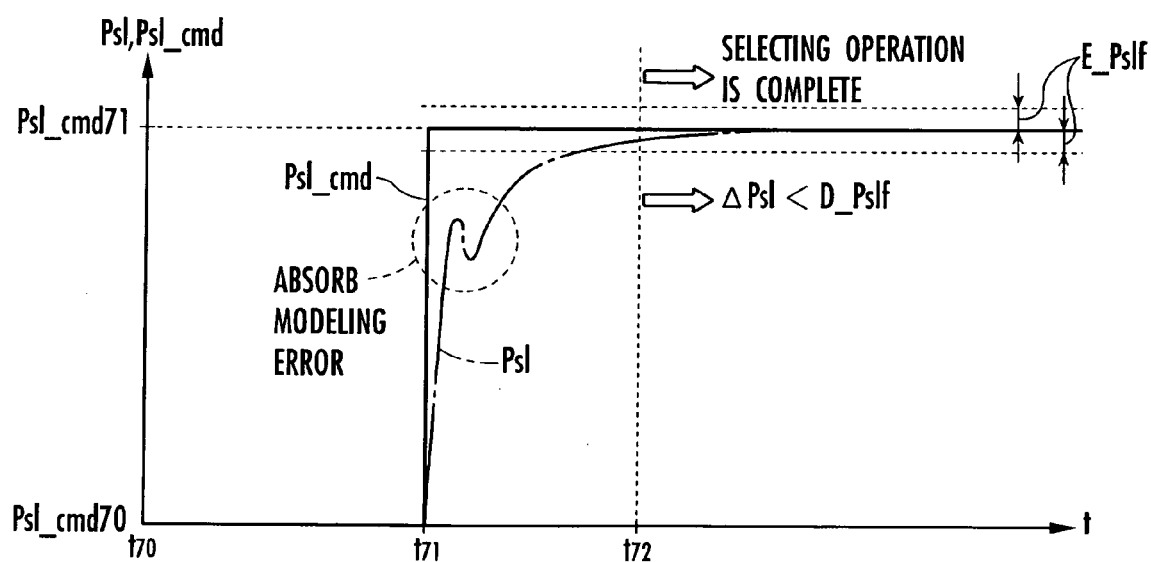
FIG. 28 is a graph showing a behavior of convergence to a target position of a shift arm during a selecting operation.
Figure 29:
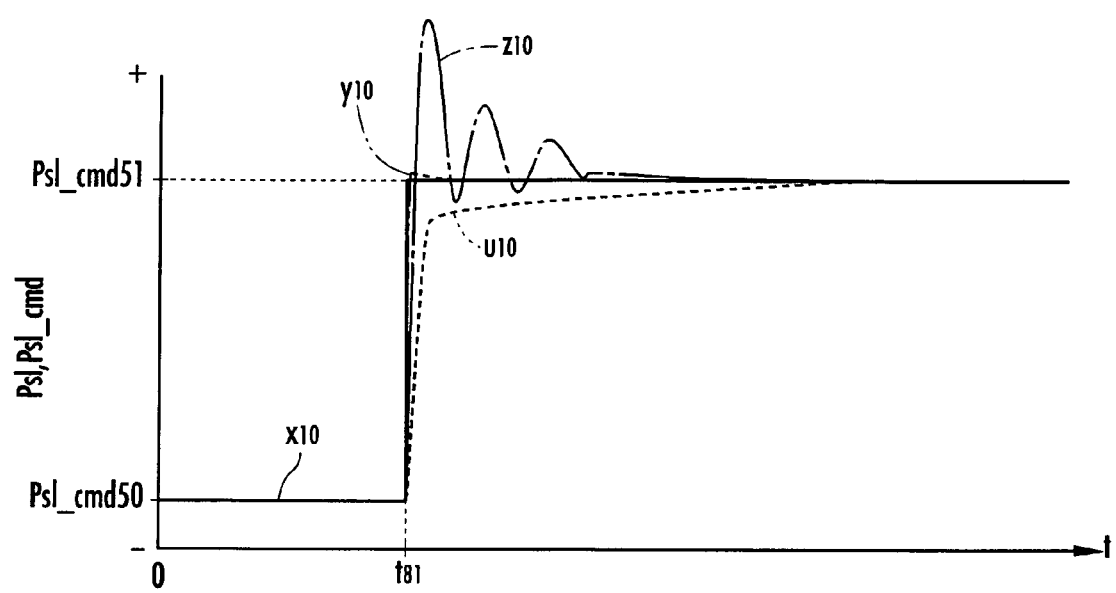
FIGS. 29A and 29B are graphs showing behaviors of convergence to a target position of the shift arm when the selecting operation is performed using the sliding mode controller of 1 degree of freedom and a sliding mode controller of 2 degrees of freedom.
Figure 29:
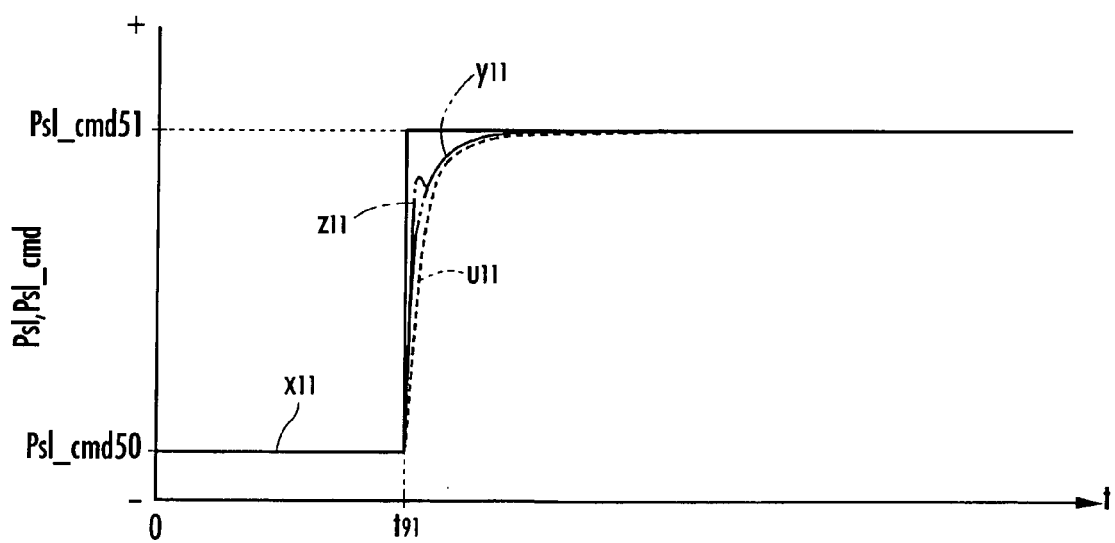
Figure 30:
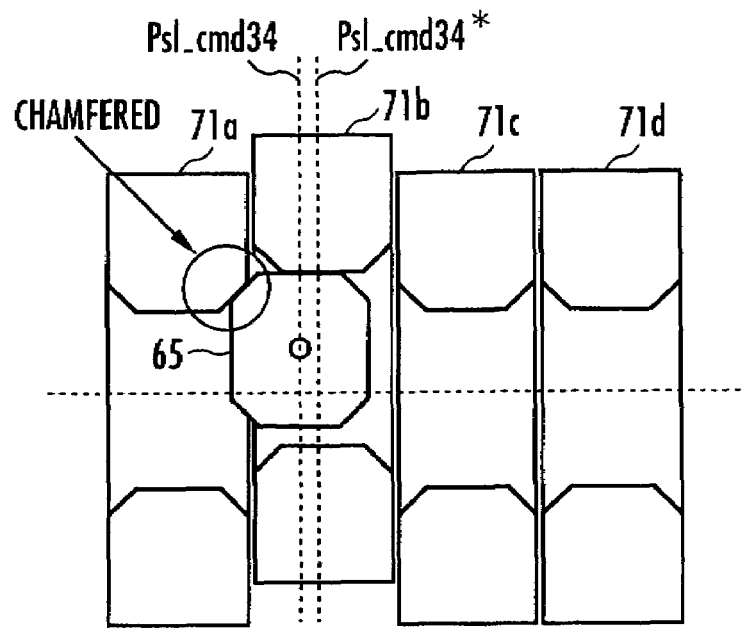
FIGS. 30A and 30B are explanatory diagrams of the shifting operation in a manual transmission.
Figure 30:
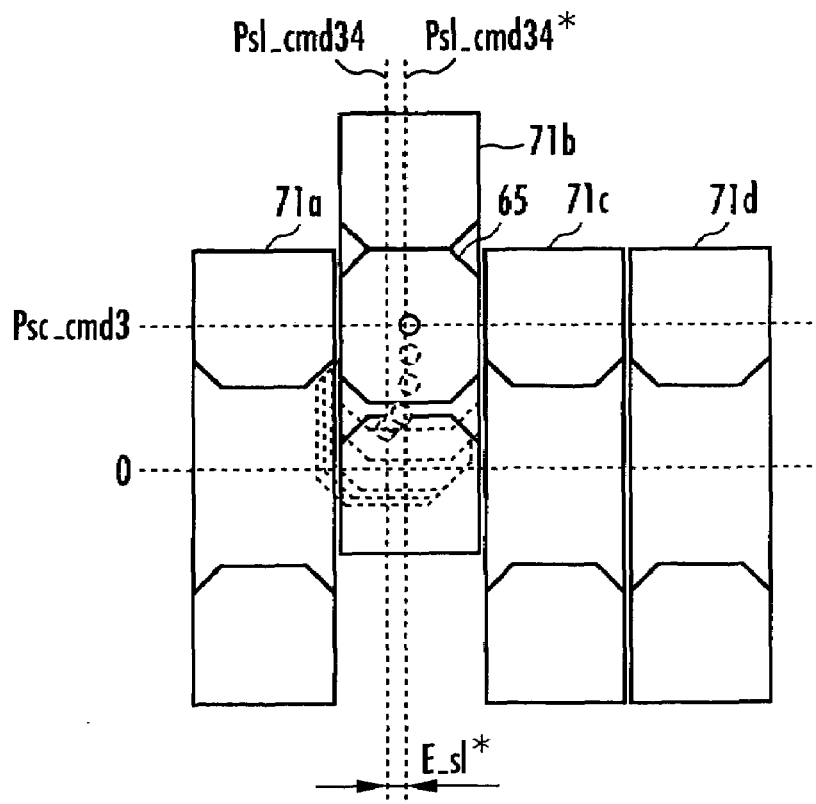
Figure 31:
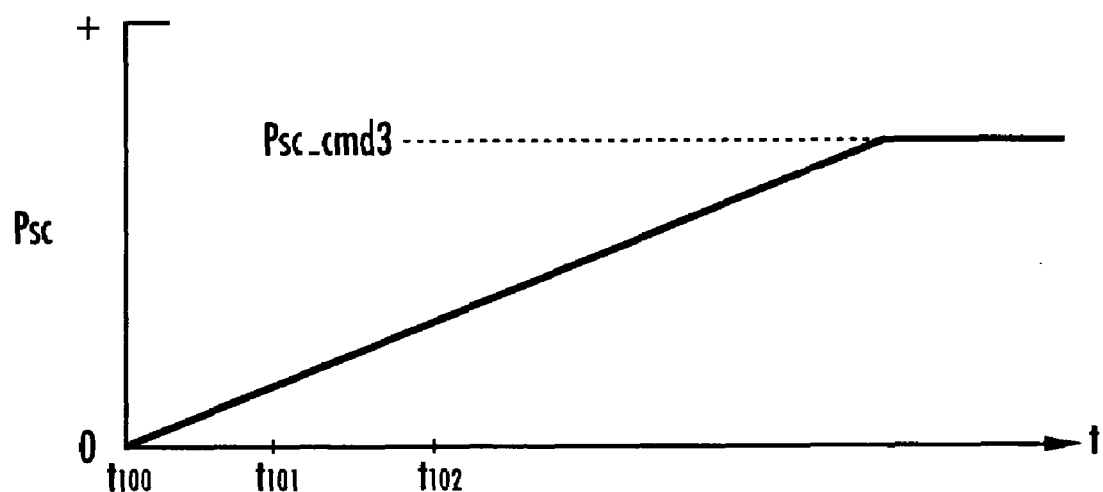
FIGS. 31A and 31B are graphs showing displacements of the shift arm during a shifting operation in the manual transmission.
Figure 31:
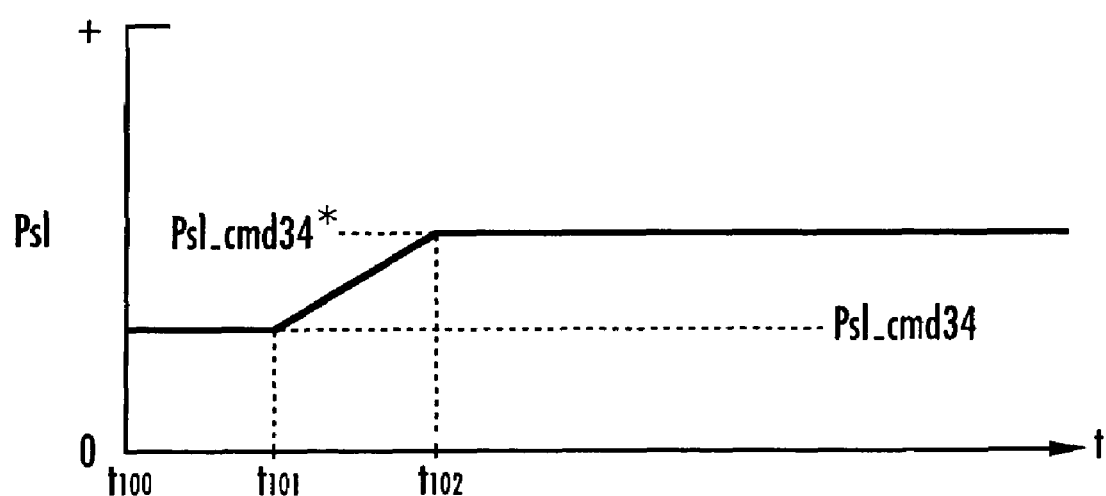
Figure 33:
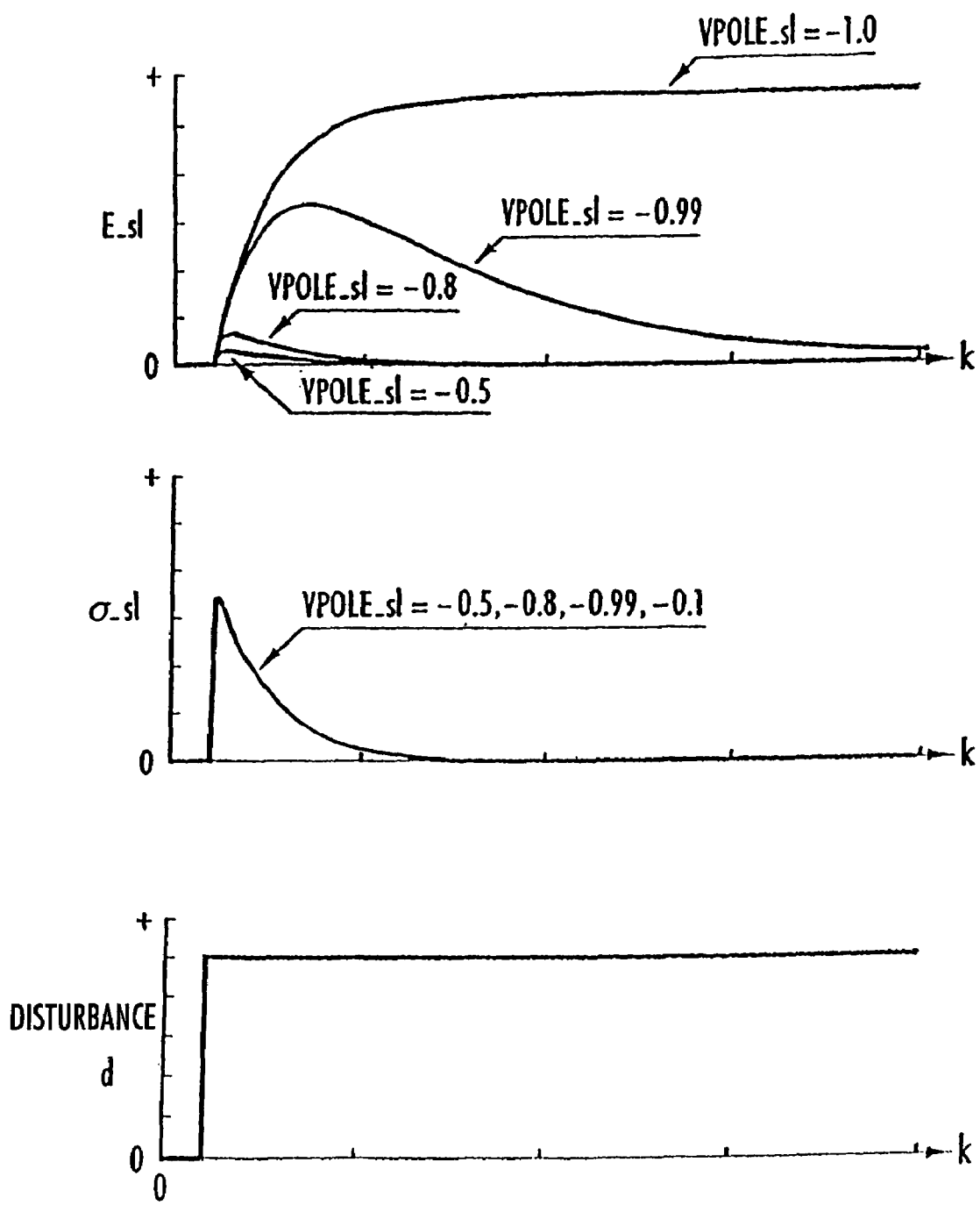
FIG. 33 shows graphs illustrating changes in disturbance restraining capability caused by changing response specifying parameters.
Figure 34:
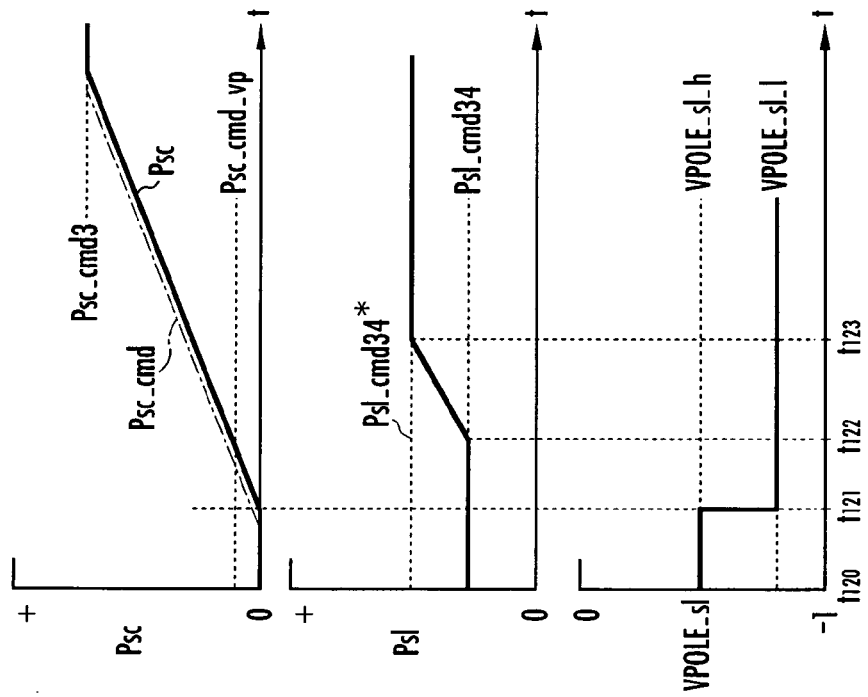
FIGS. 34A and 34B are explanatory diagrams of the shifting operation when a response specifying parameter is changed in the automated manual transmission.
Figure 34:
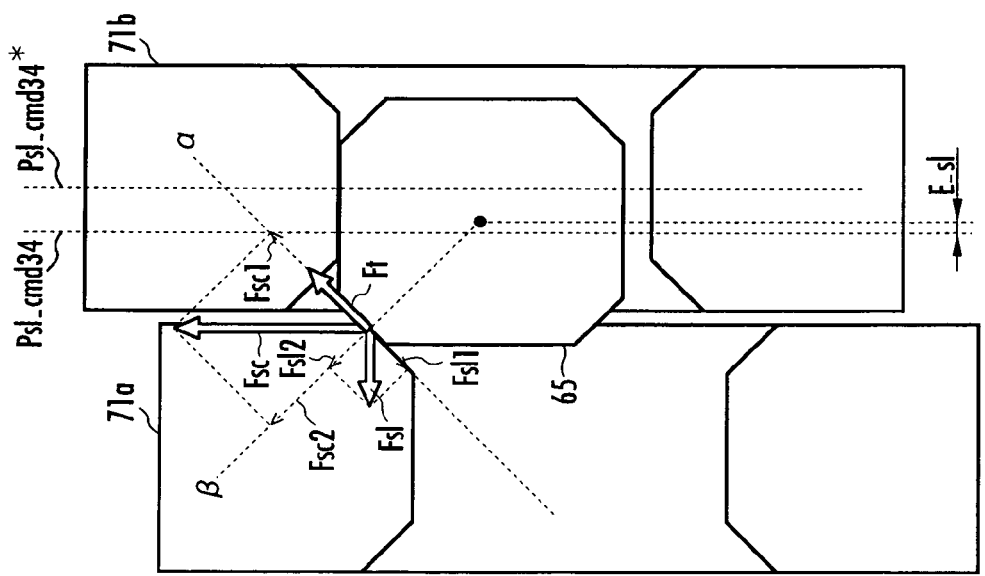
Figure 37:
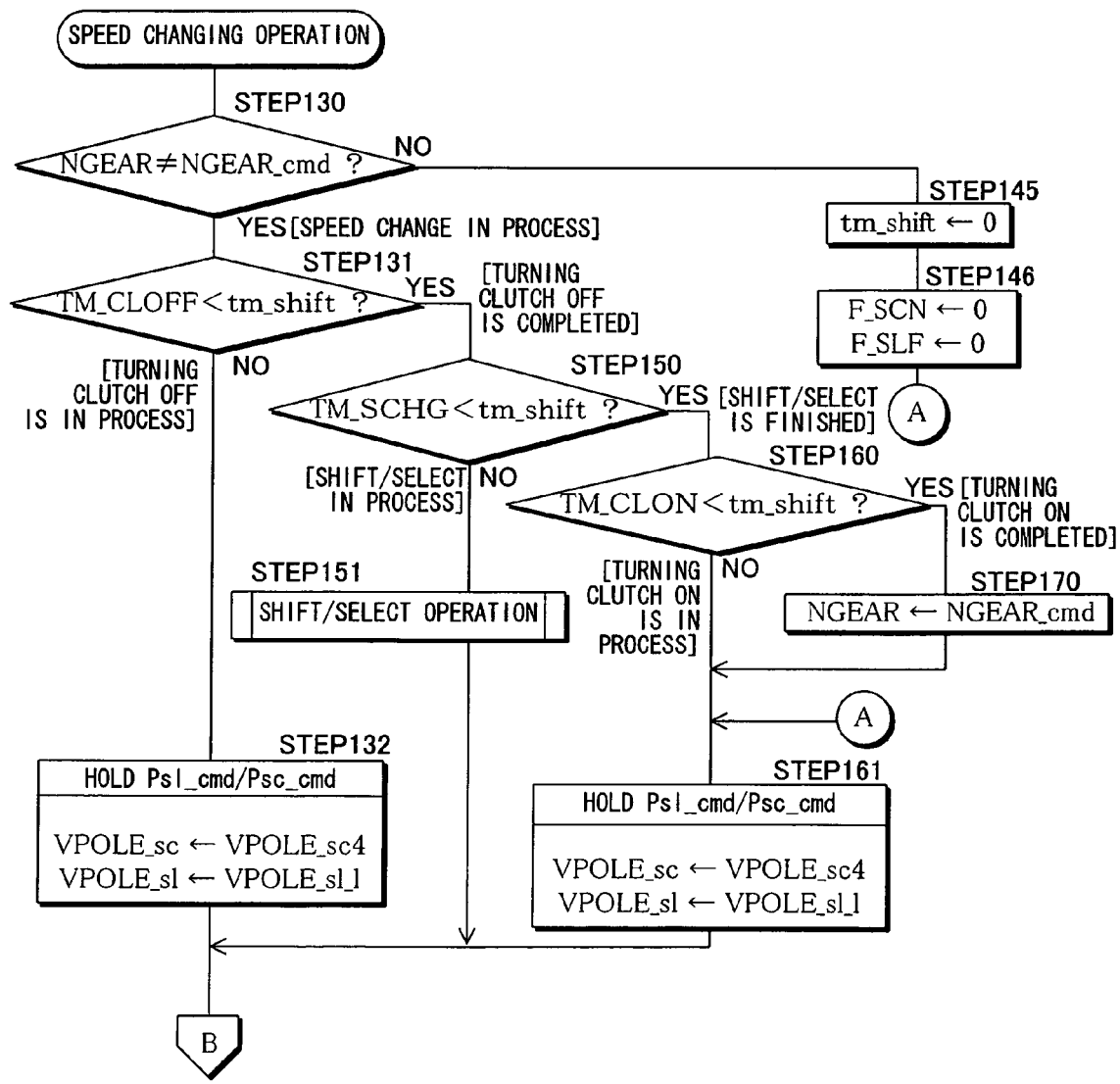
FIG. 37 is a flowchart of a speed changing operation.
Figure 38:
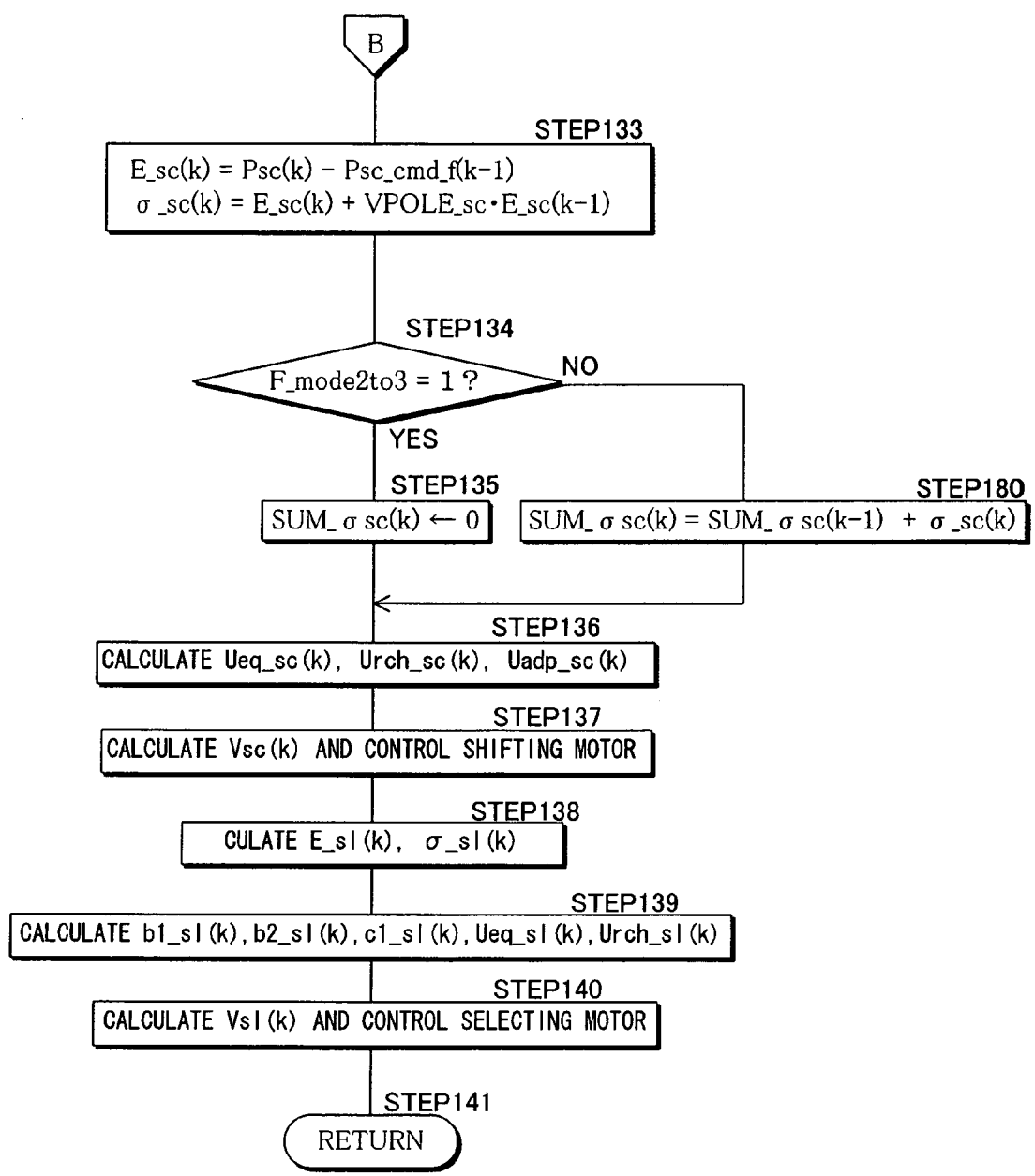
FIG. 38 is a flowchart of the speed changing operation.
Figure 39:
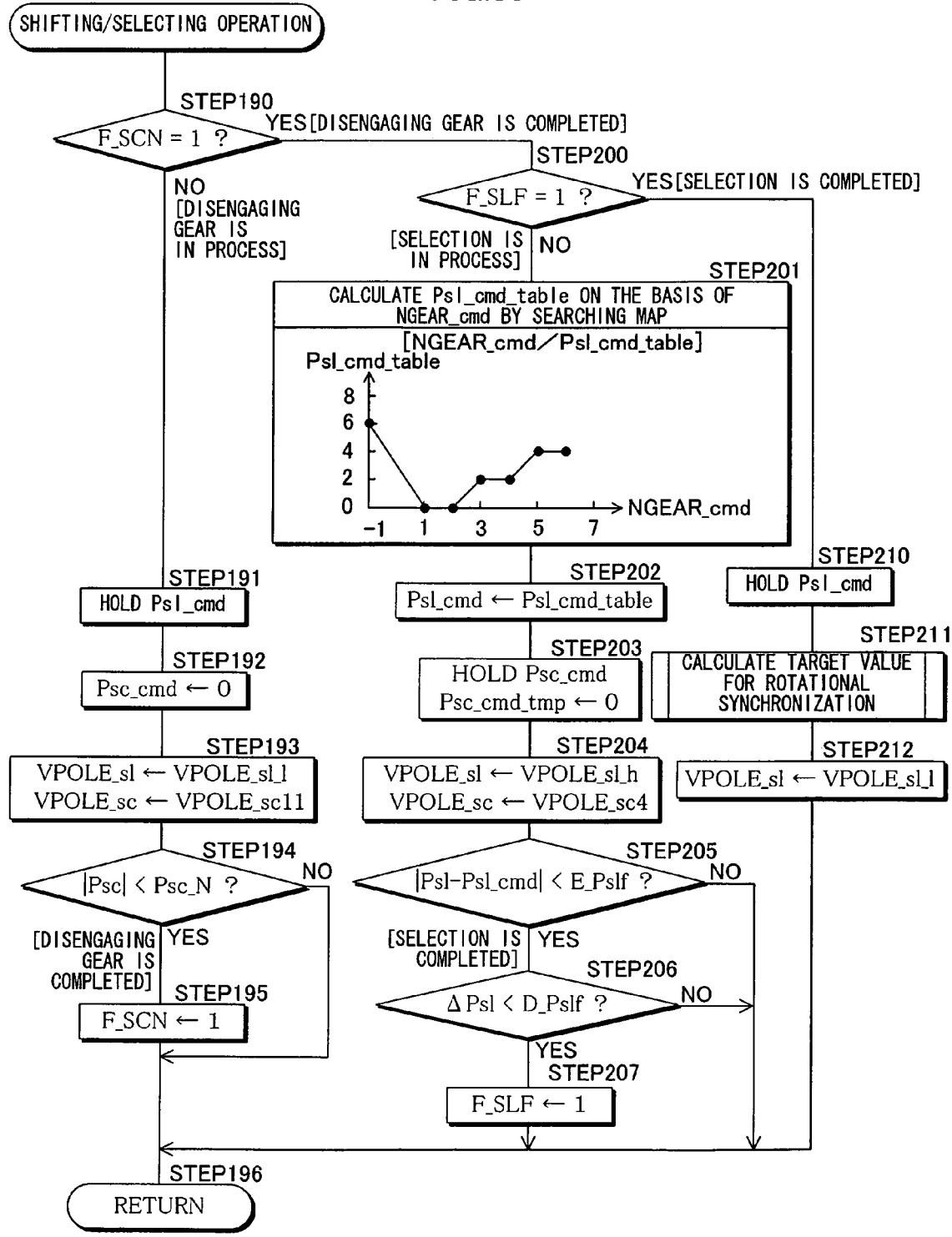
FIG. 39 is a flowchart of the shifting/selecting operation.
Figure 40:
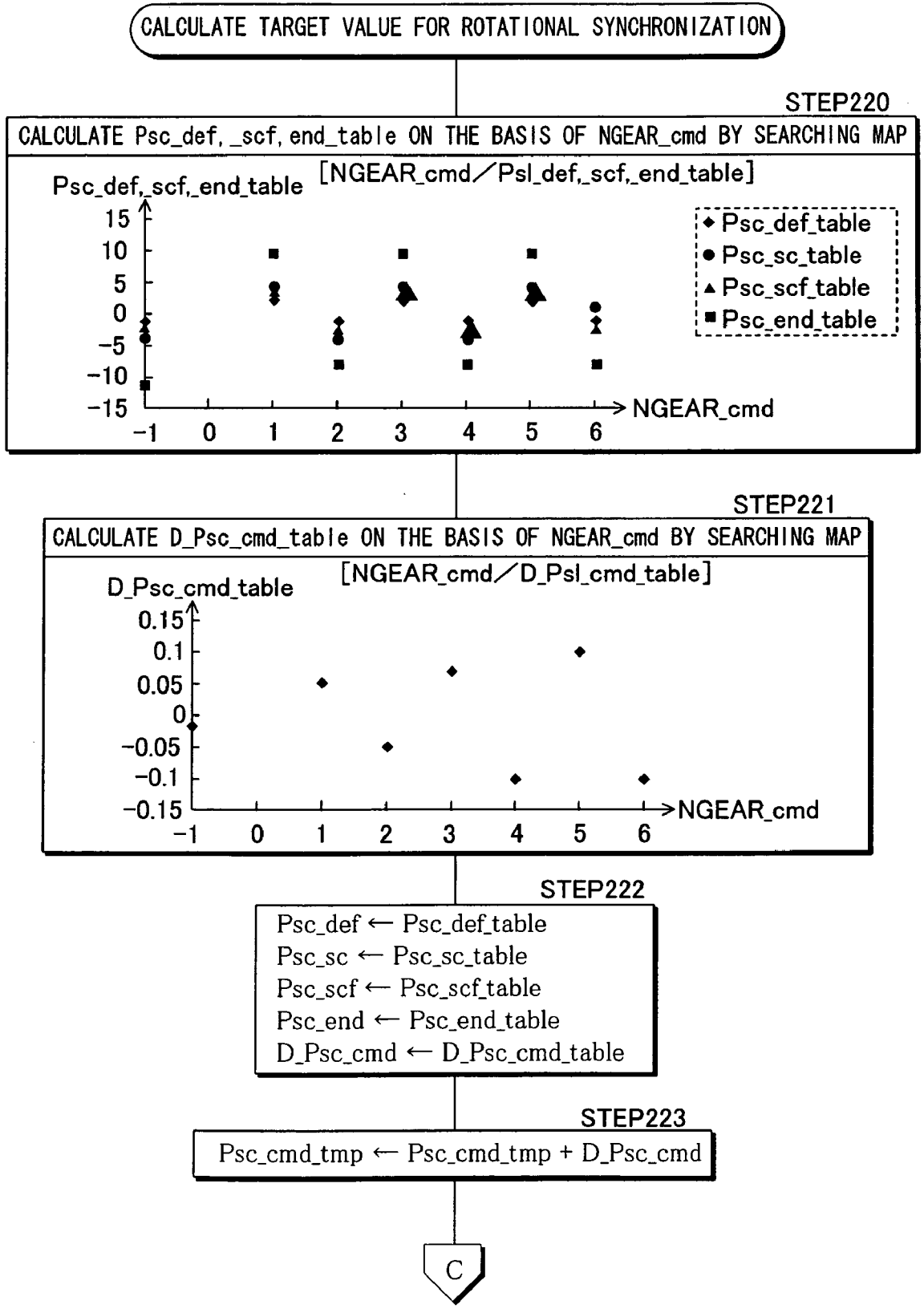
FIG. 40 is a flowchart of calculation of a target value in a rotational synchronizing operation.
Figure 41:
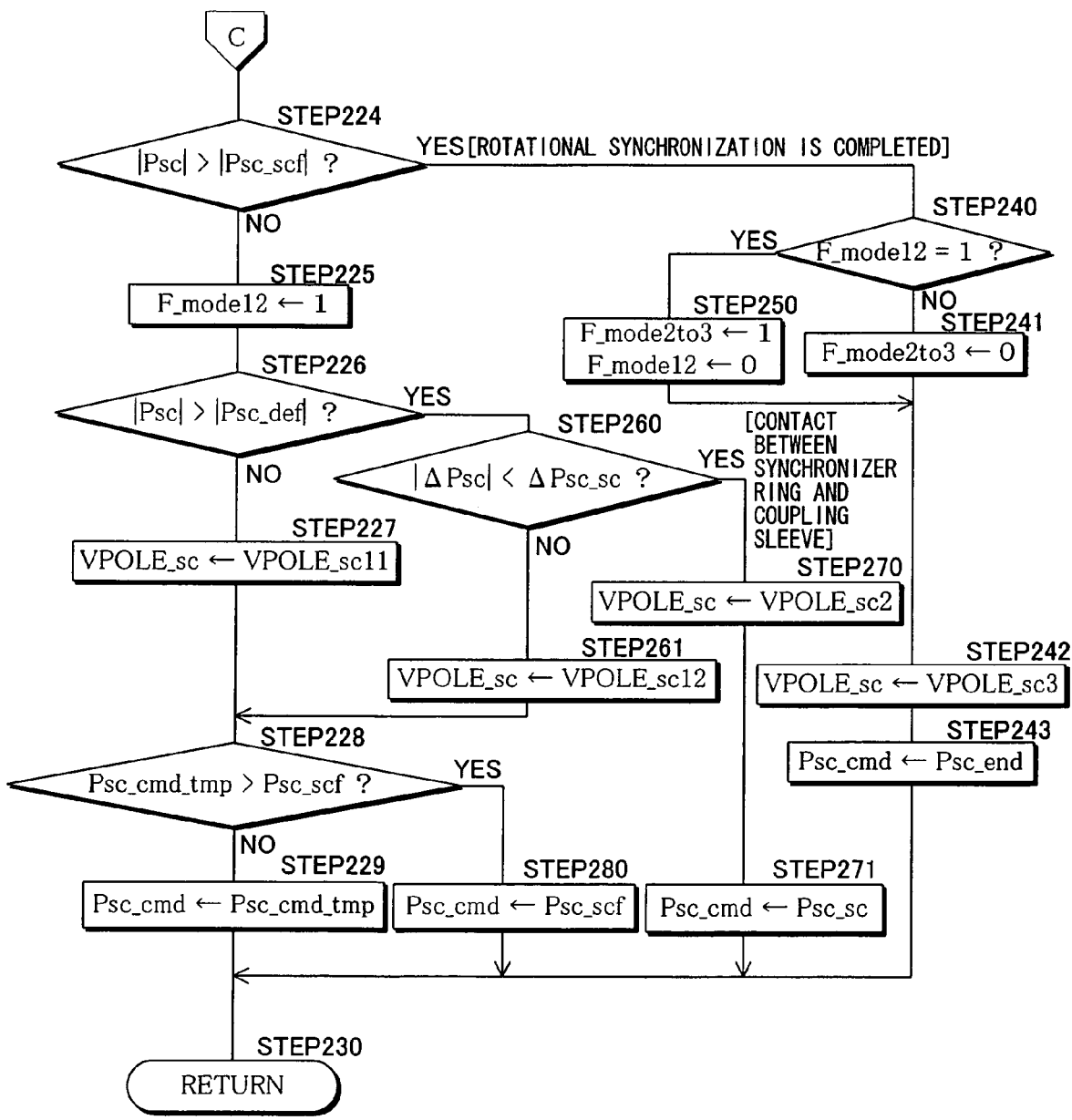
FIG. 41 is a flowchart of calculation of a target value in the rotational synchronizing operation.

FIG. 26 is a block diagram of a selection controller shown in FIG. 22; FIG. 27 is a block diagram of a virtual plant relating to an identifying method of a model parameter; FIG. 28 is a graph showing a behavior of convergence to a target position of a shift arm during a selecting operation; FIGS. 29A and 29B are graphs showing behaviors of convergence to a target position of the shift arm when the selecting operation is performed using the sliding mode controller of 1 degree of freedom and a sliding mode controller of 2 degrees of freedom; FIGS. 30A and 30B are explanatory diagrams of the shifting operation in a manual transmission; and FIGS. 31A and 31B are graphs showing displacements of the shift arm during a shifting operation in the manual transmission;

FIGS. 32A and 32B are explanatory diagrams of the shifting operation in an automated manual transmission; FIG. 33 shows graphs illustrating changes in disturbance restraining capability caused by changing response specifying parameters; FIGS. 34A and 34B are explanatory diagrams of the shifting operation when a response specifying parameter is changed in the automated manual transmission; FIGS. 35A and 35B are graphs showing displacements of the shift arm and set response specifying parameters in the shifting operation; FIGS. 36A and 36B are explanatory diagrams of the selecting operation in the automated manual transmission; FIG. 37 and FIG. 38 are flowcharts of a speed changing operation; FIG. 39 is a flowchart of the shifting/selecting operation; and FIG. 40 and FIG. 41 are flowcharts of calculation of a target value in a rotational synchronizing operation.

Referring to FIG. 19, the second embodiment is adapted to control the operation of a transmission 80, serving as a plant in the present invention, by a controller 1. The transmission 80 mounted in the vehicle 2 shown in FIG. 1A transmits outputs of an engine 3 through the intermediary of a clutch assembly 4 and a connecting gear 90. The connecting gear 90 meshes with a gear 91 of a differential 93, thereby causing outputs of the engine 3 to be transmitted to drive wheels 6 through the intermediary of a drive shaft 92.

The controller 1 drives a selection motor 66 (corresponding to a selecting actuator in the present invention), a shift motor 67, and a clutch actuator 68 according to the states of an accelerator pedal 95, a fuel supply control unit 96, a change lever 97, a clutch pedal 98, and a brake pedal 99 so as to control the speed changing operation of the transmission 80.

The transmission 80 has an input shaft 62, an output shaft 61, pairs of first through sixth forward gears 63a through 63f and 64a through 64f, and a reverse gear shaft 84 and reverse gear trains 83, 85 and 86. The input shaft 62, the output shaft 61, and the reverse gear shaft 84 are disposed to be parallel to each other.

The pairs of first to sixth forward gears 63a through 63f and 64a through 64f are set to different gear ratios from each other. The first forward gear 63a on an input side and the second forward gear 63b on the input side are provided to be integral with the input shaft 62. The corresponding first forward gear 64a on an output side and a second forward gear 64b on the output side are composed of idle gears that are rotative with respect to the output shaft 61. A first/second gear synchronizer 60a switches between two modes, namely, a mode in which the first forward gear 64a on the output side and the second forward gear 64b on the output side are selectively connected to the output shaft 61 (speed change established mode) and a mode in which both gears 64a and 64b are disengaged from the output shaft 61 (neutral mode).

A third forward gear 63c on the input side and a fourth forward gear 63d on the input side are composed of idle gears rotative with respect to the input shaft 62. The corresponding third forward gear 64c on an output side and a fourth forward gear 64d on the output side are formed to be integral with the output shaft 61. A third/fourth gear synchronizer 60b switches between two modes, namely, a mode in which the third forward gear 63c on the input side and the fourth forward gear 63d on the input side are selectively connected to the input shaft 62 (speed change established mode) and a mode in which both gears 63c and 63d are disengaged from the input shaft 62 (neutral mode).

Similarly, a fifth forward gear 63e on the input side and a sixth forward gear 63f on the input side are composed of idle gears rotative with respect to the input shaft 62. The corresponding fifth forward gear 64e on the output side and a sixth forward gear 64f on the output side are formed to be integral with the output shaft 61. A fifth/sixth gear synchronizer 60c switches between two modes, namely, a mode in which the fifth forward gear 63e on the input side and the sixth forward gear 63f on the input side are selectively connected to the input shaft 62 (speed change established mode) and a mode in which both gears 63e and 63f are disengaged from the input shaft 62 (neutral mode).

The reverse gear trains 83, 85 and 86 are formed of a first reverse gear 85 mounted on a reverse gear shaft 84, a second reverse gear 83 provided integrally with the input shaft 62, and a third reverse gear 86 formed integrally with the first/second gear synchronizer 60a of the output shaft 61. The first reverse gear 85 is attached to the reverse gear shaft 84 by spline fitting. This causes the first reverse gear 85 to rotate integrally with the reverse gear shaft 84 and also to be free to slide in the axial direction of the reverse gear shaft 84 between a position where it meshes with both the second reverse gear 83 and the third reverse gear 86 and a position where its engagement with those gears is cleared (neutral position).

Furthermore, shift forks 69a, 69b, 69c, and 69d are connected to the synchronizers 60a, 69b, and 69c and the first reverse gear 85, respectively, and a shift piece (see FIG. 20) provided on a distal end of each shift fork is selectively engaged with a shift arm 65. The shift arm 65 is rotated by the selection motor 66, and the shift forks are provided substantially linearly in parallel in an arcuate direction or selecting direction in which the shift arm 65 rotates. The shift arm 65 is selectively positioned at positions where it engages with the shift pieces.

The shift arm 65 is moved in an axial direction or shifting direction parallel to the input shaft 62 by the shift motor 67, the shift arm 65 being in engagement with any one of the shift pieces. The shifting arm 65 is positioned at the neutral position or a shifting position where each speed change stage is established.

FIG. 20A shows a construction of the synchronizer 60b shown in FIG. 19. The synchronizer 60c has the same construction as that of the synchronizer 60b. The synchronizer 60a is the same as the synchronizers 60b and 60c in basic construction and operations except that it is mounted on the output shaft 61.

The synchronizer 60b has a coupling sleeve 72 integrally rotates with the input shaft 62, a synchronizer ring 73a provided rotatively on the input shaft 62 between the coupling sleeve 72 and the third forward gear 63c on the input side and also movably in the axial direction of the input shaft 62, a synchronizer ring 73b provided rotatively on the input shaft 62 between the coupling sleeve 72 and the fourth forward gear 63d on the input side and also movably in the axial direction of the input shaft 62, and a shift fork 69b connected to the coupling sleeve 72.

A shift piece 71 fixed on a distal end of the shift fork 69b engages the shift arm 65 fixed to a shift/select shaft 70. The shift/select shaft 70 rotates as the selection motor 66 is actuated to perform the selecting operation, while it moves in the axial direction as the shift motor 67 is actuated to perform the shifting operation. Performing the shifting operation with the shift arm 65 engaged with the shift piece 71 by the selecting operation causes the coupling sleeve 72 to be displaced from the neutral position toward the third forward gear 63c on the input side when the third gear is selected or toward the fourth forward gear 63d on the input side when the fourth gear is selected.

Both ends of the coupling sleeve 72 are hollow, splines 74a and 74b being formed on the inner peripheral surfaces of the hollow portions. The outer peripheral surface of the synchronizer ring 73a has splines 75a engageable with the splines 74a of the coupling sleeve 72. The outer peripheral surface of the third forward gear 63c on the input side that opposes the synchronizer ring 73a also has splines 76a engageable with the splines 74a of the coupling sleeve 72.

Similarly, the outer peripheral surface of the synchronizer ring 73b has splines 75b engageable with the splines 74b of the coupling sleeve 72. The outer peripheral surface of the fourth forward gear 63d on the input side that opposes the synchronizer ring 73b also has splines 76b engageable with the splines 74b of the coupling sleeve 72.

When the coupling sleeve 72, which has rotated together with the input shaft 62, is moved toward the third forward gear 63c on the input side by the shift fork 69b, the coupling sleeve 72 comes in contact with the synchronizer ring 73a first, and then the synchronizer ring 73a is also brought into contact with the third forward gear 63c on the input side. At this time, the frictional force produced by the contact synchronizes the rotational speeds of the coupling sleeve 72 and the third forward gear 63c on the input side through the intermediary of the synchronizer ring 73a.

With the rotational speeds of the coupling sleeve 72 and the third forward gear 63c on the input side synchronized, the coupling sleeve 72 is further moved toward the third forward gear 63c on the input side causes the splines 74a formed on the coupling sleeve 72 to pass by the splines 75a formed on the synchronizer ring 73a and to engage the splines 76a formed on the third forward gear 63c on the input side. This sets an established speed change state in which motive power is transmitted between the input shaft 62 and the output shaft 61.

Similarly, moving the coupling sleeve 72, which has rotated together with the input shaft 62, toward the fourth forward gear 63d on the input side by the shift fork 69b synchronizes the rotational speeds of the coupling sleeve 72 and the fourth forward gear 63d on the input side through the intermediary of the synchronizer ring 73b. Then, the splines 74b formed on the coupling sleeve 72 passes by the splines 75b formed on the synchronizer ring 73b and engages the splines 76b formed on the fourth forward gear 63d on the input side.

FIG. 20B shows linearly disposed shift pieces 71a, 71b, 71c and 71d observed from the shift arm 65. In the selecting operation, the shift arm 65 is moved in a direction Psl, which is the selecting direction, shown in FIG. 20B, positioned at a 1st/2nd gear select position Psl_12, a 3rd/4th gear select position Psl_34, a 5th/6th gear select position Psl_56, or a reverse select position Psl_r, and then engaged with the shift piece 71a, 71b, 71c or 71d. In the shifting operation, the shift arm 65 is moved in a direction Psc, which is the shift direction, to establish a new speed (the first to sixth speed or reverse).

FIGS. 21A through 21D illustrate the operation of the shift arm 65 when a state wherein the second speed has been established is replaced by the third speed is established. Positioning of the shift arm 65 is carried out in the order of FIG. 21A, FIG. 21B, FIG. 21C, and FIG. 21D. FIG. 21A illustrates a state wherein the second speed has been established, the shift arm 65 being engaged with the shift piece 71a. The position Psl of the shift arm 65 in the selecting direction is set at the 1st/2nd gear select position Psl_12, while the position P_sc of the shift arm 65 in the shifting direction is set at the 1st speed shift position Psc_1.

In the step illustrated in FIG. 21B, the position Psc of the shift arm 65 in the shifting direction is set at the neutral position 0 to enable the selecting operation. In the step illustrated in FIG. 21C, the shift arm 65 is set at a 3rd/4th gear select position Psc_34 by the selecting operation. This causes the shift arm 65 to engage the shift piece 71b. In the step illustrated in FIG. 21D, the shift arm 65 is moved from the neutral position to a third speed shift position Psc_3 to establish the third speed.

Referring now to FIG. 22, the controller 1 has a target position calculator 112 for setting a target position Psc_cmd of the shift arm 65 in the shifting direction and a target position Psl_cmd of the shift arm 65 in the selecting direction, a shift controller 110 that controls a voltage Vsc to be applied to the shift motor 67 such that an actual position Psc of the shift arm 65 in the shifting direction coincides with the target position Psc_cmd, and a selection controller 111 that controls a voltage Vsl (corresponding to a control input to be supplied to a selection actuator in the present invention) to be applied to the selection motor 66 such that an actual position Psl of the shift arm 65 in the selecting direction coincides with the target position Psl_cmd.

The shift controller 110 has a sliding mode controller 113 that employs sliding mode control (corresponding to the response specifying control in the present invention) to determine the voltage Vsc to be applied to the shift motor 67, and a VPOLE_sc calculator 114 that sets a response specifying parameter VPOLE_sc in the sliding mode controller 113.

Referring to FIG. 23, the sliding mode controller 113 incorporated in the shift controller 110 includes a target value filter 121 (corresponding to the filtering means in the present invention) that carries out filtering computation according to an equation (81) below on the target position Psc_cmd of the shift arm 65 in the shifting direction so as to obtain a filtering target value Psc_cmd_f.

$$Psc\_cmd\_f(k) = -VPOLE\_f\_sc \cdot Psc\_cmd\_f(k) + (1 + VPOLE\_f\_sc) \cdot Psc\_cmd(k) \quad (81)$$

VPOLE_f_sc: Target value filter coefficient; and Psc_cmd_f(k): Filtering target value in k-th control cycle.

The sliding mode controller 113 has a subtracter 122 that uses the following equation (82) to model the construction for positioning the shift arm 65 in the shifting direction in the transmission 80, and calculates a difference E_sc between a filtering target value Psc_cmd_f(k) and a position Psc(k) of the shift arm 65 in the shifting direction, a switching function value calculator 123 calculating a value of a switching function σ_sc, a reaching law input calculator 124 calculating a reaching law input Urch_sc, an adaptation law input calculator 125 calculating an adaptation law input Uadp_sc, an equivalent control input calculator 126 calculating an equivalent control input Ueq_sr, and an adder 127 that adds the equivalent control input Ueq_sr, the reaching law input Urch_sr, and the adaptation law input Uadp_sc so as to obtain a control value Vsl of the voltage to be applied to the shift motor 67.

$$Psc(k+1) = a1\_sc \cdot Psc(k) + a2\_sc \cdot Psc(k-1) + b1\_sc \cdot Vsc(k) + b2\_sc \cdot Vsc(k-1) \quad (82)$$

where a1_sc, a2_sc, b1_sc, b2_sc: Model parameters

The switching function value calculator 123 calculates a switching function value σ_sc(k) according to the following equation (84) from a difference E_sc(k) calculated by the subtracter 122 according to the following equation (83).

$$E\_sc(k) = Psc(k) - Psc\_cmd\_f(k-1) \quad (83)$$

where E_sc(k): Difference between actual position Psc(k) and filtering target value Psc_cmd_f(k−1) of the shift arm in the shifting direction in a k-th control cycle $$\sigma\_sc(k) = E\_sc(k) + VPOLE\_sc \cdot E\_sc(k-1) \quad (84)$$

where σ_sc(k): Switching function value in a k-th control cycle; and VPOLE_sc: Switching function setting parameter (−1<VPOLE_sc<0).

The adaptation law input calculator 125 calculates a switching function integral value SUM_σsc(k) according to the following equation (85), and calculates an adaptation law input Uadp_sc(k) according to the following equation (86). The adaptation law input Uadp_sc(k) is used to absorb a modeling error or disturbance to place a difference state amount (E_sc(k), E_sc(k−1)) on a switching straight line (σ_sc(k)=0).

$$SUM\_\sigma sc(k) = SUM\_\sigma sc(k-1) + \sigma\_sc(k) \quad (85)$$

where SUM_σsc(k): Switching function integral value in a k-th control cycle $$\text{Uadp\_sc}(k) = -\frac{\text{Kadp\_sc}}{b1\_sc} \cdot \text{SUM\_}\sigma\text{sc}(k) \qquad (86)$$

where Uadp_sc(k): Adaptation law input in a k-th control cycle; and Kadp_sc: Feedback gain.

The reaching law input calculator 124 calculates the reaching law input Urch_sc(k) according to the following equation (87). The reaching law input Urch_sc(k) is used to place a difference state amount (E_sc(k), E_sc(k−1)) on a switching straight line (σ_sc(k)=0).

$$\text{Urch\_sc}(k) = -\frac{\text{Krch\_sc}}{b1\_sc} \cdot \sigma\_\text{sc}(k) \qquad (87)$$

where Urch_sc(k): Reaching law input in a k-th control cycle; and Krch_sc: Feedback gain.

The equivalent control input calculator 126 calculates an equivalent control input Ueq_sc(k) according to the following equation (88). Equation (88) is used to calculate, as an equivalent control input Ueq_sc(k), a control input Vsc(k) to the shift motor 67 obtained by substituting the above equations (84), (83) and (82) therein with σ_sc(k+1)=σ_sc(k). The equivalent control input Ueq_sc(k) is an input for restraining the difference state amount (E_sc(k), E_sc(k−1)) on a switching straight line (σ_sc(k)=0).

$$\begin{aligned}\text{Ueq\_sc}(k) = \frac{1}{b1\_sc}\{&(1 + \text{VPOLE\_sc} - a1\_sc) \cdot Psc(k) + \\ &(\text{VPOLE\_sc} - a2\_sc) \cdot Psc(k-1) - b2\_sc \cdot Vsc(k-1) + \\ &Psc\_cmd\_f(k) + (\text{VPOLE\_sc} - 1) \cdot Psc\_cmd\_f(k-1) - \\ &\text{VPOLE\_sc} \cdot Psc\_cmd\_f(k-2)\}\end{aligned} \qquad (88)$$

where Ueq_sc(k): Equivalent control input in a k-th control cycle

The adder 127 calculates a control input Vsc(k) to the shift motor 67 according to the following equation (89).

$$Vsc(k) = Ueq\_sc(k) + Urch\_sc(k) + Uadp\_sc(k) \qquad (89)$$

The sliding mode controller 113 having the construction explained above has 2 degrees of freedom that makes it possible to independently set the follow-up characteristic of the shift arm 65 to follow the target position Psc_cmd in the shifting direction and a convergent behavior for a difference between a target position Psc_cmd and an actual position Psc caused by disturbance. More specifically, the follow-up characteristic of the shift arm 65 to follow the target position Psc_cmd in the shifting direction can be set by changing the target value filter VPOLE_f_sc. Furthermore, the convergent behavior of the difference between the target position Psc_cmd and the actual position Psc caused by disturbance can be set by changing the switching function setting parameter VPOLE_sc.

Referring to FIG. 20A, the shift controller 110 performs the shifting operation of the shift arm 65 according to the following steps Mode1 through Mode4. The following will describe a case where the third speed is established by the synchronizer 60b shown in FIG. 19; however, the same applies to other cases where other speeds are established.

(1) Mode1 (Target Value Follow-up & Compliance Mode)

The shift controller 110 sets Mode1 from the moment the shifting operation is begun from the neutral position until the actual position Psc of the shift arm 65 reaches a standby position Psc_def of a synchronizer ring 73a (Psc<Psc_def).

(2) Mode2 (Rotational Synchronization Control Mode)

The shift controller 110 applies an appropriate pressing force to the synchronizer ring 73a after conditions Psc_def≦Psc≦Psc_scf (assumed position of contact between the coupling sleeve 72 and the synchronizer ring 73a) and ΔPsc<ΔPsc_sc (ΔPsc_sc: Determination value of the contact between the coupling sleeve 72 and the synchronizer ring 73a) are satisfied. This synchronizes the rotational speeds of the coupling sleeve 72 and the third forward gear 63c on the input side.

(3) Mode3 (Static Mode)

When a condition of Psc_scf<Psc is satisfied, the target value Psc_cmd is set to a shift completion target value Psc_end, and the switching function integral value SUM_σsc related to the above equation (44) is reset to prevent Psc from overshooting Psc_cmd (if an overshoot happens, a noise from a collision against a stopper member (not shown) is produced). This causes the coupling sleeve 72 to pass by the synchronizer ring 73a and engage the third forward gear 63c on the input side.

(4) Mode4 (Hold Mode)

After completion of the shifting operation and during the selecting operation, the disturbance restraining performance in the shift controller 110 is lowered to save power by decreasing electric power supplied to the shift motor 67.

FIG. 24A and FIG. 24B are graphs showing the behaviors of the shift arm 65 observed when a sliding mode controller of 1 degree of freedom that does not have the target value filter 121 shown in FIG. 19 is used to perform the shifting operation based on the aforesaid Mode1 through Mode4. The axes of ordinates of the upper graphs shown in FIGS. 24A and 24B are set to the target position Psc_cmd and the actual position Psc of the shift arm 65 in the shifting direction, while the axes of ordinates of the lower graphs are set to the control input Vsc to the shift motor 67. The axes of abscissa are set to common time axes t.

In the graph of FIG. 24A, x1 denotes the target position Psc_cmd, y1 denotes the actual position Psc, and z1 denotes the control input Vsc. In the graph of FIG. 24B, x2 denotes the target position Psc_cmd, y2 denotes the actual position Psc, and z2 denotes the control input Vsc.

The graph of FIG. 24A illustrates a case where the shifting operation is performed on a shift mechanism having standard dynamic characteristics assumed beforehand when designing the sliding mode controller. The graph of FIG. 24B illustrates a case where the shifting operation is performed on a shift mechanism that exhibits a lower friction than that of the standard dynamic characteristic and has a dynamic characteristic with a smaller reaction force at the time of rotational synchronization.

Referring to the graph of FIG. 24A, the control input Vsc suddenly increases when the mode shifts from Mode1 to Mode2 at $t_{32}$ and the target position Psc_cmd is changed from Psc_scf to Psc_sc, and when the mode shifts from Mode2 to Mode3 at $t_{33}$ and the target position Psc_cmd is changed from Psc_sc to Psc_end. Such an abrupt increase in the control input Vsc is within the range of dynamic characteristics predicted at the time of designing, so that the position Psc of the shift arm 65 stably follows the target positions Psc_sc and Psc_end.

Referring to the graph of FIG. 24B, because of the lower friction, an unwanted overshooting the target position Psc_cmd takes place at $t_{30}$ of Mode1 at which the shifting operation is begun. In addition, the smaller reaction force at rotational synchronization leads to a shorter time required for Mode2 ($t_{42}$ through $t_{43}$). In this case, the coupling sleeve 72 is pushed into the synchronizer ring 73a with an undue force, causing an inertial shock or percussive noise to be produced due to a sudden change in rotational speed. In Mode3, the actual position Psc excessively overshoots the target position Psc_cmd. In this case, the coupling sleeve 72 abrupt change of the position Psc of the shift arm 65 at rotational synchronization in Mode2 will be restrained. This makes it possible to prevent the coupling sleeve 72 from being suddenly pushed in, as shown in FIG. 24B, thereby permitting a stable shifting operation.

A VPOLE_sc calculator 114 changes the switching function parameter VPOLE_sc according to the following equation (90) in the aforesaid Mode1 through Mode4. This switches the disturbance restraining capability of the sliding mode controller 113 in each mode during the shifting operation.

$$\text{VPOLE\_sc} = \begin{cases} \text{VPOLE\_sc11}(=-0.8): Mode1(|Psc(k)| < |Psc\_def|) \\ \text{VPOLE\_sc12}(=-0.98): Mode1(|Psc(k)| \geq |Psc\_def|) \\ \text{VPOLE\_sc2}(=-0.85): Mode2(|Psc\_def(k)| \leq |Psc(k)| \leq |Psc\_scf|) \\ \text{VPOLE\_sc3}(=-0.7): Mode3(|Psc(k)| > |Psc\_scf|) \\ \text{VPOLE\_sc4}(=-0.9): Mode4 \end{cases} \quad (90)$$

collides with a stopper (not shown), producing a percussive noise that is uncomfortable for a driver.

FIG. 25A and FIG. 25B illustrate a case where the shifting operation is performed using the sliding mode controller 113 having 2 degrees of freedom shown in FIG. 23. The graph of FIG. 25A illustrates the case where the shifting operation is performed on a shift mechanism having the same dynamic characteristic as that in FIG. 24A. FIG. 25B illustrates the case where the shifting operation is performed on a shift mechanism having the same dynamic characteristic as that in FIG. 24B.

In the sliding mode controller 113 of the 2 degrees of freedom, the capability of the shift arm 65 to follow the target value Psc_cmd can be independently set by changing the target value filter coefficient VPOLE_f_sc in the above equation (81). Therefore, as shown in FIG. 25A, it is possible to achieve setting that ensures a smooth rise of the control input Vsc when the target position Psc_cmd is changed from Psc_scf to Psc_sc as the mode changes from Mode1 to Mode2 at $t_{52}$, and when the target position Psc_cmd is changed from Psc_sc to Psc_end as the mode changes from Mode2 to Mode3 at $t_{53}$.

Moreover, in the sliding mode controller 113 of the 2 degrees of freedom, a disturbance restraining capability (the convergent behavior for the difference E_sc(k) in the above equation (83)) can be independently set by changing the switching function setting parameter VPOLE_sc in the above equation (84). For this reason, as shown in FIG. 25B, even if the shift mechanism provides a low friction, an where Psc_def: Standby position of the synchronizer ring; and Psc_scf: Position of contact between the coupling sleeve and the synchronizer ring.

The target value filter 121 changes the target value filter coefficient VPOLE_f_sc according to the following equation (91) in the Mode1 through Mode4. This switches the follow-up capability level of the sliding mode controller 113 with respect to the target value Psc_cmd in each mode during the shifting operation.

$$\text{VPOLE\_f\_sc} = \begin{cases} \text{VPOLE\_f\_sc1}(=-0.8): Mode1 \\ \text{VPOLE\_f\_sc2}(=-0.98): Mode2(|Psc\_def(k)| \leq |Psc(k)| \leq |Psc\_scf|) \\ \text{VPOLE\_f\_sc3}(=-0.85): Mode3, Mode4(|Psc(k)| > |Psc\_scf|) \end{cases} \quad (91)$$

According to the above equation (91), in Mode1 wherein the coupling sleeve 72 moves to the standby position Psc_def of the synchronizer ring 73, the follow-up capability level for the actual position Psc of the shift arm 65 with respect to the target value Psc_cmd is set to a high level (VPOLE_f_sc=−0.8). In Mode2 and Mode3 wherein the target value Psc_cmd suddenly increases, the follow-up capability level of the actual position Psc with respect to the target value Psc_cmd is set to a low level (VPOLE_f_sc=−0.98, −0.9), thereby restraining the voltage applied to the shift motor 67 from abruptly increasing.

The selection controller 111 shown in FIG. 22 has a sliding mode controller 115 that employs sliding mode control (corresponding to the response specifying control in the present invention) to determine a voltage Vsl to be applied to the selection motor 66, a VPOLE_sl calculator 116 for setting a response specifying parameter VPOLE_sl in the sliding mode controller 115, and a partial parameter identifier 117 (corresponding to the identifying means in the present invention) for identifying model parameters b1_sl, b2_sl and c1_sl (corresponding to identification model parameters in the present invention) in the sliding mode control.

Referring to FIG. 26, the sliding mode controller 115 of the selection controller 111 models a selector 130 of the transmission 80 that moves the shift arm 65 in the selecting direction according to the following equation (92) representing the position Psl of the shift arm 65 in the selecting direction in terms of a voltage Vsl (corresponding to the control input to the selecting actuator in the present invention) applied to the selection motor 66 (corresponding to the selection actuator in the present invention).

$$Psl(k+1)=a1\_sl \cdot Psl(k)+a2\_sl \cdot Psl(k-1)+b1\_sl \cdot Vsl(k)+b2\_sl \cdot Vsl(k-1)+c1\_sl \tag{92}$$

where Psl(k+1), Psl(k), Psl(k−1): Positions of the shift arm in (k+1)th, k-th, and (k−1)th control cycles, respectively; Vsl(k), Vsl(k−1); Voltages applied to the selection motor in k-th and (k−1)th control cycles; a1_sl, a2_sl; Model parameters, and b1_sl(k), b2_sl(k), and c1_sl(k): Identification values of model parameters in a k-th control cycle.

The partial parameter identifier 117 carries out identification processing only on b1_sl and b2_sl, which are coefficients of a control input component term related to the voltage Vsl applied to the selection motor 66 and c1_sl, which is a disturbance component term that are closely related to changes in the dynamic characteristics of the selector 130, among model parameters a1_sl, a2_sl, b1_sl, b2_sl, and c1_sl in the above equation (92). b1_sl, b2_sl, and c1_sl correspond to the identification model parameters in the present invention.

When the above equation (92) is processed by delaying one control cycle to gather component terms related to the identification model parameters b1_sl, b2_sl, and c1_sl on the right side, and the remaining component terms on the left side, the following equation (93) is given.

$$Psl(k) - a1\_sl \cdot Psl(k-1) - a2\_sl \cdot Psl(k-2) = \\ b1\_sl(k) \cdot Vsl(k-1) + b2\_sl(k) \cdot Vsl(k-2) + c1\_sl(k) \tag{93}$$

If the left side of the above equation (93) is defined as W(k), as shown in the following equation (94), while the right side is defined as W_hat(k) as shown in the following equation (95), then W(k) will be a virtual output of a virtual plant 140 shown in FIG. 27. Therefore, W(k) may be considered to denote a model output of the virtual plant 140, and W_hat(k) may be considered to denote a model equation of the virtual plant 140.

$$W(k)=Psl(k)-a1\_sl \cdot Psl(k-1)-a2\_sl \cdot Psl(k-2) \tag{94}$$

where W(k): Model output of the virtual plant in a k-th control cycle $$W\_hat(k)=b1\_sl(k) \cdot Vsl(k-1)+b2\_sl(k) \cdot Vsl(k-2)+c1\_sl(k) \tag{95}$$

where W_hat(k): Model equation of the virtual plant in a k-th control cycle

The virtual plant 140 shown in FIG. 27 subtracts a component obtained by delaying Psl(k) one control cycle by a $Z^{-1}$ converter 141 and multiplied by a1_sl using a multiplier 143 and a component obtained by delaying Psl(k) two control cycles by $Z^{-1}$ converters 141 and 144 and multiplied by a2_sl using a multiplier 145 from a component of the position Psl(k) of the shift arm 65 by a subtracter 146, and outputs the result as W(k).

The model equation of the virtual plant 140 in the above equation (95) is formed only of the component terms related to the identification model parameters b1_sl(k), b2_sl(k), and c1_sl(k). Hence, the identification model parameters b1_sl(k), b2_sl(k), and c1_sl(k) can be sequentially identified by calculating the model parameters of the virtual plant 140 such that the output W(k) of the virtual plant 140 coincides with the model output W_hat(k), using a sequential identification algorithm.

The partial parameter identifier 117 carries out identification processing on the identification model parameters b1_sl(k), b2_sl(k), and c1_sl(k) according to the following equations (96) to (102). First, $\zeta\_sl(k)$ is defined by the equation (96), and then $\theta\_sl(k)$ is defined by the equation (97). An output using the model parameters that have been calculated in the preceding control cycle, namely, b1_sl(k−1), b2_sl(k−1), and c1_sl(k−1), are taken as W_hat'(k) as shown in the following equation (98) in place of the model parameters b1_sl(k), b2_sl(k), and c1_sl(k) in the above equation (95).

$$\zeta\_sl^T(k)=[Vsl(k-1) \; Vsl(k-2) \; 1] \tag{96}$$

$$\theta\_sl^T(k)=[b1\_sl(k) \; b2\_sl(k) \; c1\_sl(k)] \tag{97}$$

$$W\_hat'(k) = \tag{98}$$
$$b1\_sl(k-1) \cdot Vsl(k-1) + b2\_sl(k-1) \cdot Vsl(k-2) + c1\_sl(k-1) = $$
$$\theta\_sl^T(k-1) \cdot \zeta\_sl(k)$$

A deviation E_id_sl(k) of the model output W_hat'(k) from the output W(k) of the virtual plan 140 is calculated according to the following equation (99) as a modeling error in the above equation (98). Hereinafter, the deviation E_id_sl(k) will be referred to as an identification error E_id_sl(k).

$$E\_id\_sl(k)=W(k)-W\_hat'(k) \tag{99}$$

where E_id_sl(k): Difference between the virtual plant output W(k) and the model output W_hat'(k) in a k-th control cycle The partial parameter identifier 117 calculates P_sl, which is a tertiary square matrix, according to the recurrence formula of the following equation (100), and then calculates a tertiary vector KP_sl, which is a gain coefficient vector, that defines a scale of change based on the identification error E_id_sl(k) according to the following equation (101).

$$P\_sl(k+1) = \tag{100}$$
$$\frac{1}{\lambda_1\_sl}\left\{I - \frac{\lambda_2\_sl \cdot P\_sl(k) \cdot \varsigma\_sl(k) \cdot \varsigma\_sl^T(k)}{\lambda_1\_sl + \lambda_2\_sl \cdot \varsigma\_sl^T(k) \cdot P\_sl(k) \cdot \varsigma\_sl(k)}\right\} \cdot P\_sl(k)$$

where I: 3×3 unit matrix; and $\lambda_1\_sl$, $\lambda_2\_sl$: Identification weighting parameters $$KP\_sl(k) = \frac{P\_sl(k) \cdot \varsigma\_sl(k)}{1+\varsigma\_sl^T(k) \cdot P\_sl(k) \cdot \varsigma\_sl(k)} \tag{101}$$

The meaning of each setting of the identification weighting parameters $\lambda_1\_sl$ and $\lambda_2\_sl$ in the above equation (100) is shown in Table 2 below.

TABLE 2

Settings of $\lambda_1\_sl$ and $\lambda_2\_sl$ and meanings thereof

| $\lambda_1\_sl, \lambda_2\_sl$ | Meaning |
| --- | --- |
| 1, 0 | Fixed gain |
| 1, 1 | Method of least squares |
| 1, $\lambda$ | Gradually decreasing gain; $\lambda$: Variable |
| $\lambda$, 1 | Method of weighted least squares; $\lambda$: Variable |

The partial parameter identifier 117 calculates an identification value $\theta\_sl^T(k) = [b1\_sl(k)\ b2\_sl(k)\ c1\_sl(k)]$ of a new model parameter according to the following equation (102).

$$\theta\_sl(k) = \theta\_sl(k-1) + KP\_sl(k) \cdot E\_id\_sl(k) \quad (102)$$

Referring to FIG. 26, the sliding mode controller 115 has a target value filter 131 (corresponding to the filtering means in the present invention) that calculates a filtering target value Psl_cmd_f by carrying out filtering computation according to the following equation (103) on the target position Psl_cmd in the selecting direction of the shift arm 65 (see FIG. 19).

$$Psl\_cmd\_f(k) = \quad (103)$$
$$-VPOLE\_f\_sl \cdot Psl\_cmd\_f(k-1) + (1 + VPOLE\_f\_sl) \cdot Psl\_cmd(k)$$

where VPOLE_f_sl: Target value filter coefficient; and Psl_cmd_f(k): Filtering target value in a k-th control cycle.

The sliding mode controller 115 has a subtracter 132 that calculates a difference E_sl between the actual position Psl of the shift arm 65 in the selecting direction and the filtering target position Psl_cmd_f, a switching function value calculator 133 calculating a value of a switching function $\sigma\_sl$, a reaching law input calculator 134 calculating a reaching law input Urch_sl, an equivalent control input calculator 135 calculating an equivalent control input Ueq_sl, and an adder 136 that adds the equivalent control input Ueq_sl and the reaching law control input Urch_sl so as to obtain a control value Vsl of the voltage to be applied to the selection motor 66 of the selector 130.

The switching function value calculator 133 calculates a switching function value $\sigma\_sl(k)$ according to the following equation (105) from a difference E_sl(k) calculated by the subtracter 132 according to the following equation (104).

$$E\_sl(k) = Psl(k) - Psl\_cmd\_f(k-1) \quad (104)$$

where E_sl(k): Difference between an actual position and a target position of the shift arm in a k-th control cycle $$\sigma\_sl(k) = E\_sl(k) + VPOLE\_sl \cdot E\_sl(k-1) \quad (105)$$

where $\sigma\_sl(k)$: Switching function value in a k-th control cycle; and VPOLE_sl: Switching function setting parameter ($-1 < VPOLE\_sl < 0$).

The reaching law input calculator 134 calculates the reaching law input Urch_sl(k) according to the following equation (106). The reaching law input Urch_sl(k) is used to place a difference state amount (E_sl(k), E_sl(k−1)) on a switching straight line having the switching function $\sigma\_sl$ set to 0 ($\sigma\_sl(k)=0$).

$$Urch\_sl(k) = -\frac{Krch\_sl}{b1\_sl(k)} \cdot \sigma\_sl(k) \quad (106)$$

where Urch_sl(k): Reaching law input in a k-th control cycle; and Krch_sl: Feedback gain.

The equivalent control input calculator 135 calculates an equivalent control input Ueq_sl(k) according to the following equation (107). A control value Vsl(k) to the selection motor 66 obtained by substituting the above equations (104), (103) and (93) into the equation (107), with $\sigma\_sl(k+1) = \sigma\_sl(k)$, is calculated as an equivalent control input Ueq_sl(k).

$$Ueq\_sl(k) = \frac{1}{b1\_sl(k)}\{(1 + VPOLE\_sl - a1\_sl) \cdot Psl(k) + \quad (107)$$
$$(VPOLE\_sl - a2\_sl) \cdot Psl(k-1) - b2\_sl(k) \cdot Vsl(k-1) +$$
$$Psl\_cmd\_f(k) + (VPOLE\_sl - 1) \cdot Psl\_cmd\_f(k-1) -$$
$$VPOLE\_sl \cdot Psc\_cmd\_f(k-1) - c1\_sl(k)\}$$

where Ueq_sl(k): Equivalent control input in a k-th control cycle

The adder 136 calculates a control value Vsl to the selection motor 66 of the selector 130 according to the following equation (108).

$$Vsl(k) = Ueq\_sl(k) + Urch\_sl(k) \quad (108)$$

As described above, the partial parameter identifier 117 carries out identification processing only on b1_sl, b2_sl, and c1_sl, which are closely related to changes in the dynamic characteristics of the selector 130, among model parameters a1_sl, a2_sl, b1_sl, b2_sl, and c1_sl in the above equation (92). The sliding mode controller 115 of the selection controller 111 uses b1_sl(k), b2_sl(k), and c1_sl(k) identified by the partial parameter identifier 117 to calculate the control input Vsl of the voltage to be applied to the selection motor 66.

In this case, the number of model parameters to be identified can be reduced, making it possible to achieve a reduced time required for a model parameter to converge to an optimum value. Moreover, the amount of computation is reduced with a resultant shortened computation time, as compared with a case where the identification processing is carried out on all model parameters. This allows a control cycle of the selection controller 111 to be set shorter, leading to improved controllability of the selection controller 111.

FIG. 28 is a graph showing displacement of the shift arm 65 during the selecting operation, the axis of ordinates indicating the actual position Psl and the target position Psl_cmd of the shift arm 65 in the selecting direction, while the axis of abscissa indicating time t. At $t_{71}$ when the target position is changed from Psl_cmd70 to Psl_cmd71 and the selecting operation is begun, a modeling error is quickly absorbed by the identification processing implemented on the model parameters b1_sl(k), b2_sl(k), and c1_sl(k) by the partial parameter identifier 117.

With this arrangement, the position Psl of the shift arm 65 converges to the target position Psl_cmd71 without overshooting the target position Psl_cmd71 or generating vibrations. Then, the selecting operation is finished in a short time at $t_{72}$ when the conditions for determining that the selecting operation is completed are satisfied, the conditions being (1)ΔPsl (=Psl−Psl_cmd)<D_Pslf (determination value of change rate) and (2)|Psl−Psl_cmd61|<E_Pslf (determination value of difference).

FIG. 29A is a graph illustrating a behavior of the shift arm 65 observed when the selecting operation is performed using a sliding mode controller of 1 degree of freedom that has no target value filter 131 shown in FIG. 26. FIG. 29B is a graph showing a behavior of the shift arm 65 when the selecting operation is performed using a sliding mode controller 115 of 2 degree of freedom shown in FIG. 26.

The axes of ordinates of the graphs shown in FIGS. 29A and 29B indicate the target position Psl_cmd and the actual position Psl of the shift arm 65, while the axes of abscissa both indicate time t. Referring to FIG. 29A, $x_{10}$ denotes the target position Psl_cmd, $y_{10}$ denotes displacement of the actual position Psl in a selector having a friction characteristic in a predicted standard range, $z_{10}$ denotes displacement of the actual position Psl in a selector having a lower friction than the standard range, and $u_{10}$ denotes displacement of the actual position Psl in a selector having a higher friction than the standard range.

Similarly, in FIG. 29B, $x_{11}$ denotes the target position Psl_cmd, $y_{11}$ denotes displacement of the actual position Psl in a selector having a friction characteristic in a predicted standard range, $z_{11}$ denotes displacement of the actual position Psl in a selector having a lower friction than the standard range, and $u_{11}$ denotes displacement of the actual position Psl in a selector having a higher friction than the standard range.

In the sliding mode controller of 1 degree of freedom, the switching function setting parameter VPOLE_sl is the only parameter for setting the convergent behavior for the difference E_sl between the target position Psl_cmd and the actual position Psl of the shift arm 65 in the selecting direction. For this reason, if the switching function setting parameter VPOLE_sl is set to promptly converge the difference E_sl, assuming that the selector has a friction in the standard range, then the convergent time varies, depending on the magnitude of friction, as shown in FIG. 29A.

More specifically, at $y_{10}$ in the standard range, the actual position Psl quickly converges to the target position Psl_cmd51, while at $z_{10}$ of a low friction, the actual position Psl considerably overshoots the target position Psl_cmd51 with vibrations produced, resulting in a longer time required for convergence to the target position Psl_cmd51. At $u_{10}$ of a high friction also, load increases at movement, resulting in a longer time required for convergence to the target position Psl_cmd51.

Meanwhile, in the sliding mode controller 115 having 2 degrees of freedom, the follow-up capability of the shift arm 65 to follow the target value Psl_cmd can be independently set by changing the target value filter coefficient VPOLE_f_sl in the above equation (103). Hence, as shown in FIG. 29B, setting can be made such that the control input Vsl smoothly rises even at the low friction $z_{11}$ when the target position Psl_cmd is changed from Psl_cmd50 to Psl_cmd51 at $t_{91}$. This makes it possible to restrain an overshoot of the target position Psl_cmd and the vibration of the shift arm 65 caused by the overshoot, thus preventing the time for convergence to the target position Psl_cmd51 from being prolonged.

Moreover, in the sliding mode controller 115 having 2 degrees of freedom, a disturbance restraining capability (the convergent behavior for the difference E_sl(k) in the above equation (104)) can be independently set by changing the switching function setting parameter VPOLE_sl in the above equation (105). Hence, setting the disturbance restraining capability at a high level makes it possible to quickly converge the position Psl of the shift arm 65 to the target position Psl_cmd51 even at the high friction $u_{11}$, as shown in FIG. 29B. Moreover, at the low friction $z_{11}$ also, the position Psl of the shift arm 65 can be quickly converged to the target position Psl_cmd51 while restraining the occurrence of vibration.

In the transmission 80, there are some cases where a shift occurs between the target value Psl_cmd of each preset speed selection position and a target value Psl_cmd* corresponding to a true selected position because of mechanical play, individual variations of parts, or the like. FIGS. 30A and 30B illustrate a case where such a shift takes place at the 3rd/4th gear select position.

Referring to FIG. 30A, a target value Psl_cmd34 of the 3rd/4th gear select position is shifted toward the shift piece 71a with respect to a true target value Psl_cmd34'. Thus, if the shift arm 65 positioned at Psl_cmd34 is shifted from the neutral position to the 3rd speed shift position, then the shift arm 65 and the shift piece 71a interfere with each other, preventing the shifting operation from being accomplished.

The shift arm 65 and all shift pieces 71a through 71d are chamfered. Therefore, in the case of manual transmission (MT) in which the shifting operation and the selecting operation are performed by drivers' operating force rather than an actuator, such as a motor, the driver who feels the interference against the shift arm 65 slightly weakens his or her holding force in the selecting direction. This causes the shift arm 65 to be shifted toward the true target value Psl_cmd34 along the chamfered portion, as illustrated in FIG. 30B, thus allowing the shifting operation to be accomplished.

FIGS. 31A and 31B are graphs showing a transition of the position Psc in the shifting direction and the actual position Psl in the selecting direction of the shift arm 65 during the shifting operation in the MT described above. In the graph of FIG. 31A, the axis of ordinates indicates the actual position Psc in the shifting direction, while the axis of abscissa indicates time t. In the graph of FIG. 31B, the axis of ordinates indicates the actual position Psl in the selecting direction, while the axis of abscissa indicates time t, as in the graph of FIG. 31A.

The shifting operation is begun at $t_{100}$ in the graphs of FIGS. 31A and 31B, and the shift arm 65 starts moving toward a target value Psc_cmd3 indicating the 3rd speed shift position, as shown in FIG. 31A. At $t_{101}$, the shift arm 65 and the shift piece 71a interfere with each other, and the shift arm 65 is shifted to the true target value Psl_cmd34* from the target value Psl_cmd34 of the 3rd/4th gear select position from $t_{101}$ through $t_{102}$, as illustrated in FIG. 31B. This allows the shift arm 65 to move to the target value Psc_cmd3 of the 3rd shift position, as shown in FIG. 31A, while avoiding the interference between the shift arm 65 and the shift piece 71a.

In an automated manual transmission (AMT) according to the present embodiment in which the shifting operation and the selecting operation are performed by a shift motor 67 and a selection motor 66, if an attempt is made to position and hold the shift arm 65 at the target value Psl_cmd34 of the 3rd/4th gear select position, then the shift arm 65 cannot be shifted in the selecting direction when the shift arm 65 and the shift piece 71a interfere with each other. This prevents the shifting operation from being accomplished.

FIG. 32A illustrates a case where the shift arm 65 has been slightly shifted in the selecting direction because of its interference with the shift piece 71a when the shift arm 65 at the target value Psl_cmd34 of the 3rd/4th gear select position in the AMT is moved to the target value Psc_cmd3 of the 3rd speed shift position. In this case, the selection controller 111 determines an output voltage Vsl to be applied to the selection motor 66 such that the position of the shift arm 65 in the selecting direction is set back to Psl_cmd34 by eliminating the shift E_sl. This causes a force Fsl to be produced in the selecting direction.

Here, a component of Fsl in the direction of a tangent a on chamfered portions of the shift arm 65 and the shift piece 71*a* is denoted as Fsl1, a component in a β direction of the normal line of the tangent α is denoted as Fsl2, a component in an α direction of the tangent of a force Fsc in the shifting direction generated by the shifting operation is denoted as Fsc1, and a component in a β direction of the normal line is denoted as Fsc2. The shifting operation stops at the moment Fsc1 and Fsl1 are balanced.

FIG. 32B shows displacement of the shift arm 65 during the shifting operation described above. The axis of ordinates of the upper graph indicates the actual position Psc of the shift arm 65 in the shifting direction, the axis of ordinates of the lower graph indicates the actual position Psl of the shift arm 65 in the selecting direction, and the axes of abscissa provide common time axes t. At $t_{110}$, the shifting operation is begun. The target value Psl_cmd34 of the 3rd/4th gear select position has been shifted from the true target value Psl_cmd34\*, so that the shift arm 65 and the shift piece 71*a* start to interfere with each other at $t_{111}$.

The chamfered portion causes the shift arm 65 to be slightly shifted in the selecting direction, but to stop moving in the selecting direction at $t_{112}$ when Fsc1 and Fsl1 are balanced and also stop moving in the shifting direction. This interrupts the shifting operation, preventing the shift arm 65 from reaching the target value Psc_cmd3 of the 3rd speed shift position.

At this time, the shift controller 50 increases the control value Vsc of the voltage applied to the shift motor 67 to move the shift arm 65 to the target value Psc_cmd3 of the 3rd speed shift position. The selection controller 111 increases the control value Vsl of the voltage applied to the selection motor 66 to move the shift arm 65 to the target value Psl_cmd34 of the 3rd/4th speed selection position. This causes an excessive voltage to be applied to the shift motor 67 and the selection motor 66, which may damage the shift motor 67 and the selection motor 66.

The selection controller 111 uses different switching function setting parameters VPOLE_sl in the above equation (105) for the selecting operation and the shifting operation, respectively, so as to change the disturbance restraining capability level. The graphs in FIG. 33 show response specifying characteristics of a sliding mode controller 115 of the selection controller 111. The axes of ordinates indicate the difference E_sl, the switching function σ_sl, and disturbance d, respectively, from the top, while the axes of abscissa all indicate time k. The graphs in FIG. 33 show responses of a control system observed when VPOLE_sl is set to −0.5, −0.8, −0.99, and −1.0, respectively, with a step disturbance d being applied under a condition wherein the switching function σ_sl=0 in the above equation (105) and the difference E_sl=0 in the above equation (104).

As is obvious from FIG. 33, as an absolute value of VPOLE_sl is set to be smaller, the influences exerted on the difference E_sl by the disturbance d is reduced. Conversely, as an absolute value of VPOLE_sl is increased toward 1, the difference E_sl permitted by the sliding mode controller 115 increases. At this time, the behavior of the switching function σ_sl is the same regardless of the value of VPOLE_sl, so that it can be seen that the level of capability of restraining the disturbance d can be specified by setting the value of VPOLE_sl.

The VPOLE_sl calculator 116 of the selection controller 111 calculates different values of VPOLE_sl for the shifting operation and a non-shifting operation (selecting operation), as shown in the following equation (109).

$$\text{VPOLE\_sl} = \begin{cases} \text{VPOLE\_sl\_l}(=-0.95) & \ldots \text{Ohter than the selecting operation} \\ \text{VPOLE\_sl\_h}(=-0.7) & \ldots \text{Selecting operation} \end{cases} \quad (109)$$

where e.g., VPOLE_sl_l=−0.95, VPOLE_sl_h=−0.7 so that |VPOLE_sl_l|>|VPOLE_sl_h|

The selection controller 111 determines that the shifting operation is being performed if the relationships expressed by the following two equations (110) and (111) hold.

$$|Psc\_cmd| > Psc\_cmd\_vp (\approx 0.3 \text{ mm}) \quad (110)$$

where Psc_cmd: Target value in the shifting direction; and Psc_cmd_vp: Preset reference value (e.g., 0.3 mm) of the amount of displacement from neutral position (Psc_cmd=0).

$$|\Delta Psl| < dpsl\_vp (\approx 0.1 \text{ mm/step}) \quad (111)$$

where ΔPsl: Amount of displacement in the selecting direction from the preceding control cycle; and dpsl_vp: Preset reference value (e.g., 0.1 mm/step) of displacement amount a control cycle.

FIG. 34A shows the displacement of the shift arm 65 when the disturbance restraining capability level is set to be lower than that used for the selecting operation according to the above equation (109), VPOLE_sl in the shifting operation being set as VPOLE_sl_l, and the shift arm 65 is shifted to the target value Psc_cmd3 of the 3rd speed shift position, as in the case shown in FIG. 32A.

In FIG. 34A, the disturbance restraining capability level in the sliding mode controller 115 of the selection controller 111 has been set to be low, so that the interference between the shift arm 65 and the shift piece 71*a* causes the shift arm 65 to be shifted in the selecting direction from the target position Psl_cmd34 of the 3rd/4th gear select position. When the difference E_sl from the Psl_cmd34 is produced, the voltage Vsl applied to the selection motor 66 is reduced to cancel the difference E_sl.

Therefore, the force Fsl in the selecting direction produced by the drive of the selection motor 66 is reduced, and the component Fsc1 in the α direction of the tangent of the force Fsc in the shifting direction that is generated by the drive of the shift motor 67 becomes larger than the component Fsl1 in the α direction of the tangent of Fsl. This causes a force Ft in the α direction of the tangent to be generated. The force Ft moves the shift arm 65 in the α direction of the tangent, thus displacing the position of the shift arm 65 in the selecting direction from Psl_cmd to Psl_cmd*. This makes it possible to prevent the shift arm 65 and the shift piece 71*a* from interfering with each other, permitting the shift arm 65 to move in the shifting direction.

The graphs in FIG. 34B show displacement of the shift arm 65 in FIG. 34A explained above. The axes of ordinates indicate the actual position Psc of the shift arm 65 in the shifting direction, the actual position Psl thereof in the selecting direction, and the switching function setting parameter VPOLE_sl from the top. The axes of abscissa all indicate time t.

The moment the shifting operation is begun at $t_{121}$, the setting of VPOLE_sl in the sliding mode controller 115 is switched from VPOLE_sl_h to VPOLE_sl_l by the VPOLE_sl calculator 116 of the selection controller 111, so that the disturbance restraining capability level of the sliding mode controller 115 is lowered.

When the shift arm 65 and the shift piece 71a interfere with each other at $t_{122}$, the shift arm 65 shifts in the selecting direction from the 3rd/4th gear target position Psl_cms34. At $t_{123}$, the position of the shift arm 65 in the selecting direction reaches the true 3rd/4th gear target position Psl_cmd34*. Thus, shifting the shift arm 65 in the selecting direction allow the shifting arm 65 to move in the shifting direction from the neutral position to the 3rd speed shift target position Psc_cmd3 by clearing the interference of the shift piece 71a.

Figure 35:
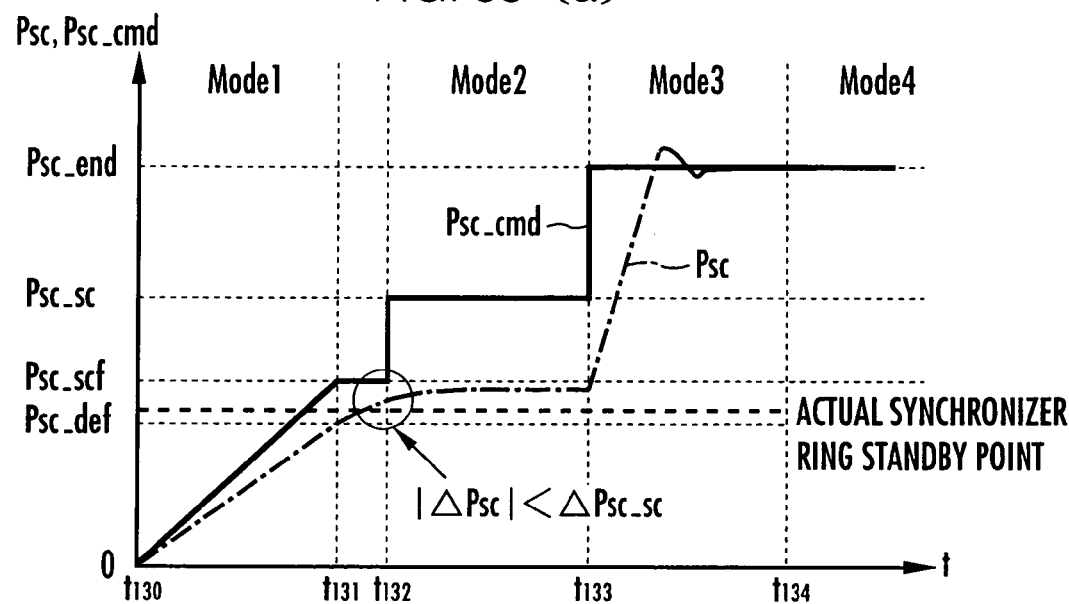
FIGS. 35A and 35B are graphs showing displacements of the shift arm and set response specifying parameters in the shifting operation.
Figure 35:
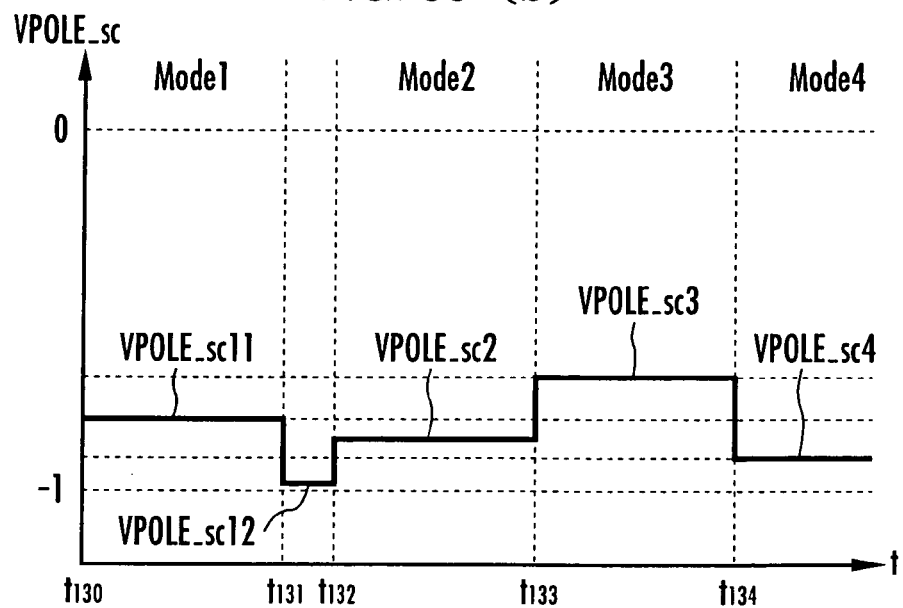
Figure 36:
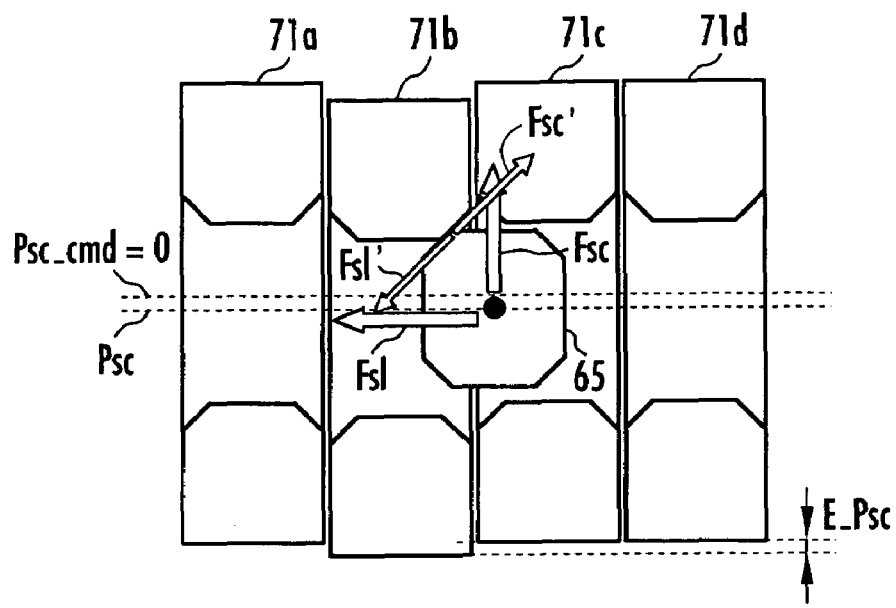
FIGS. 36A and 36B are explanatory diagrams of the selecting operation in the automated manual transmission.
Figure 36:
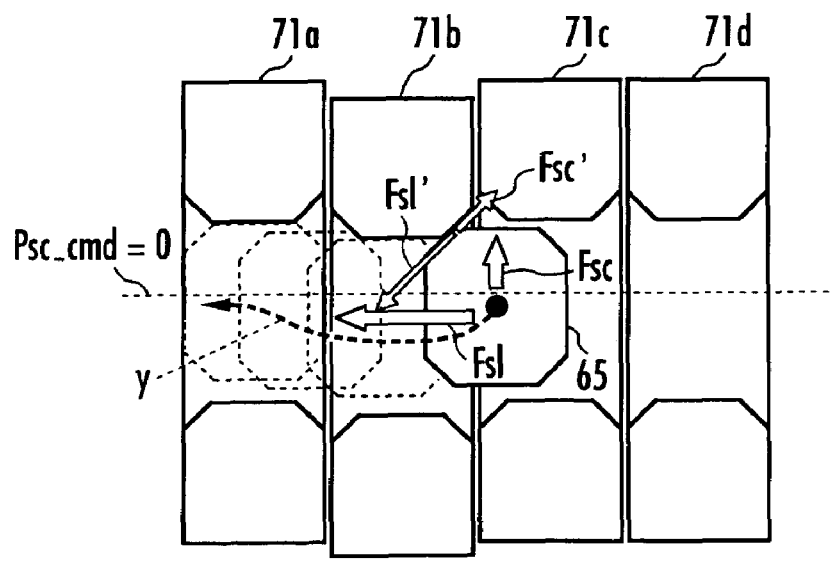

Referring now to FIG. 35, the shift controller 110 changes the switching function setting parameter VPOLE_sc according to the above equation (90) in Mode1 through Mode4 described above. Thus, changing the switching function setting parameter VPOLE_sc makes it possible to change the disturbance restraining capability level of the shift controller 110, as in the case of the aforesaid selection controller 111.

FIG. 35A shows a graph in which the axis of ordinates indicates the actual position Psc and the target position Psc_cmd of the shift arm 65 in the shifting direction, and the axis of abscissa indicates time t. FIG. 35B shows a graph in which the axis of ordinates indicates the switching function setting parameter VPOLE_sc, and the axis of abscissa indicates time t, which also applies to the graph of FIG. 35A. In this case, the following advantages can be obtained in steps of Mode1 through Mode4.

(1) Mode1 ($t_{130}$ Through $t_{132}$: Target Value Follow-up & Compliance Mode)

The VPOLE_sc calculator 114 of the shift controller 110 shown in FIG. 23 sets and holds VPOLE_sc to VPOLE_sc1 (=−0.8) until the actual position Psc of the shift arm 65 reaches the standby position Psc_def of the synchronizer ring 73a (Psc<Psc_def) after the shifting operation is begun from the neutral position. This enhances the disturbance restraining capability of the shift controller 110, resulting in enhanced capability of the shift arm 65 to follow the target position Psc_cmd.

The moment the actual position Psc of the shift arm 65 reaches the standby position Psc_def of the synchronizer ring 73a, the VPOLE_sc calculator 114 sets VPOLE_sc to VPOLE_sc2 (=−0.98) so as to lower the disturbance restraining capability level of the shift controller 110. This provides a shock absorbing effect when the coupling sleeve 72 and the synchronizer ring 73a come into contact, making it possible to restrain the occurrence of percussive noises or restrain the coupling sleeve 72 from being forcibly pushed into the synchronizer ring 73a.

(2) Mode2 ($t_{132}$ Through $t_{133}$: Rotational Synchronization Control Mode)

The shift controller 110 sets the target value Psc_cmd to Psc_sc, and VPOLE_sc to VPOLE_sc2 (=−0.85), and then applies an appropriate pressing force to the synchronizer ring 73a after conditions Psc_def≦Psc≦Psc_scf and ΔPsc<ΔPsc_sc (ΔPsc_sc: Determination value of the contact between the coupling sleeve 72 and the synchronizer ring 73a) are satisfied. Thus, the shift controller 110 synchronizes the rotational speeds of the coupling sleeve 72 and the third forward gear 63c on the input side.

(3) Mode3 ($t_{133}$ to $t_{134}$: Static Mode)

When a condition of Psc_scf<Psc is satisfied, the shift controller 110 sets the target value Psc_cmd to a shift completion target value Psc_end. Furthermore, in order to prevent Psc from overshooting Psc_cmd (if an overshoot happens, a noise from a collision against a stopper member (not shown) is produced), the shift controller 110 resets the switching function integral value SUM_σsc, and sets VPOLE_sc to VPOLE_sc3 (=−0.7) to increase the disturbance restraining capability. This causes the coupling sleeve 72 to pass by the synchronizer ring 73a and engage the third forward gear 63c on the input side.

(4) Mode4 ($t_{134}$ and after: Hold Mode)

After completion of the shifting operation and during the selecting operation, the shift controller 110 sets VPOLE_sc to VPOLE_sc4 (=−0.9) to lower the level of the disturbance restraining performance in the shift controller 110 to reduce electric power supplied to the shift motor 67 so as to save electric power. As illustrated in FIG. 36A, if the selecting operation is performed by moving the shift arm 65 from the 5th/6th gear select position to the 1st/2nd gear select position with a positional shift E_Psc present between the shift piece 71b and the shift piece 71c, then the chamfered portions of the shift arm 65 and the shift piece 71b come in contact.

At this time, if the disturbance restraining capability of the shift controller 110 is maintained at a high level, then a component Fsl' in the tangential direction of a chamfered portion of the force Fsl in the selecting direction produced by the drive of the selection motor 66 interferes with a component Fsc' in the tangential direction of a chamfered portion of the force Fsc in the shifting direction produced by the drive of the shifting motor 67, causing the shifting operation of the shift arm 65 to be interrupted. Furthermore, the control for positioning to the target position by the shift controller 110 and the selection controller 111 increases the voltage applied to the selection motor 66 and the shift motor 67, and the selection motor 66 and the shift motor 67 may be damaged.

In the selecting operation, therefore, VPOLE_sc is set to VPOLE_sc4 (=−0.9) to lower the level of disturbance restraining capability of the shift controller 110 so as to decrease the force Fsc in the shifting direction, as shown in FIG. 36B. With this arrangement, the shift arm 65 easily shifts in the shifting direction, as indicated by a path y in FIG. 36B, so that the shift arm 65 can be promptly moved to the 1st/2nd gear select position, avoiding the interference with the shift piece 71b.

Referring now to the flowcharts shown in FIG. 37 through FIG. 41, the procedure for carrying out the control over the transmission 80 by the controller 1 will be explained. The flowcharts shown in FIGS. 37 and 38 illustrate the procedure for carrying out the speed changing operation of the transmission 80 by the controller 1 after the clutch OFF operation is begun in STEP30 of FIG. 15. The controller 1 first determines in STEP130 of FIG. 37 whether a current gear selection position NGEAR of the transmission 80 coincides with the gear selection target value NGEAR_cmd.

If it is determined that the gear selection position NGEAR coincides with the gear selection target value NGEAR_cmd and that the speed changing operation is completed, then the controller 1 proceeds to STEP145 wherein it clears clocking time tm_shift on a speed changing operation reference timer. In the next STEP146, the controller 1 resets a gear disengagement completion flag F_SCN (F_SCN=0) set upon completion of gear disengagement processing in the transmission 80, and resets a select completion flag F_SLF (F_SLF=0) set upon completion of the selecting operation in the transmission 80.

The controller 1 then proceeds to STEP161 wherein the controller 1 maintains a current gear selection position by holding the target position Psc_cmd of the shift arm 65 in the shifting direction by the shift controller 110 and the target position Psl_cmd of the shift arm 65 in the selecting direction by the selection controller 111 at current values, and then proceeds to STEP133 of FIG. 38.

At this time, the VPOLE_sc calculator 114 of the shift controller 110 sets the response specifying parameter VPOLE_sc in the sliding mode controller 113 of the shift controller 110 to VPOLE_sc4 (=−0.9). This lowers the level of disturbance restraining capability of the shift controller 110, thus saving electric power of the shift motor 67.

Furthermore, the VPOLE_sl calculator 116 of the selection controller 111 sets the response specifying parameter VPOLE_sl in the sliding mode controller 115 of the selection controller 111 to VPOLE_sl_1 (=−0.95). This lowers the level of disturbance restraining capability of the selection controller 111, thus saving electric power in the selection motor 66.

If, on the other hand, it is determined in STEP130 that a current gear selection position NGEAR of the transmission 80 does not coincide with the gear selection target value NGEAR_cmd and that the speed changing operation of the transmission 80 is in process, then the controller 1 proceeds to STEP131.

In STEP131, the controller 1 determines whether the clocking time tm_shift on the timer, which was started in STEP13 of FIG. 14, has exceeded a clutch OFF time TM_CLOFF. If it is determined that the clocking time tm_shift on the timer has not exceeded the clutch OFF completion time TM_CLOFF and the clutch OFF step has not been completed, then the controller 1 proceeds to STEP132 wherein it carries out the same processing as that in STEP161 to maintain a current gear selection position.

If, on the other hand, it is determined in STEP131 that the clocking time tm_shift on the timer has exceeded the clutch OFF completion time TM_CLOFF and the clutch OFF step has been completed, then the controller 1 proceeds to STEP150 wherein the controller 1 determines whether the clocking time tm_shift on the timer has exceeded a gear position change completion time TM_SCHG.

In STEP150, if it is determined that the clocking time tm_shift on the timer has not exceeded the gear position change completion time TM_SCHG and the gear position change step is being implemented, then the controller 1 proceeds to STEP151 to perform the shifting/selecting operation, and then proceeds to STEP133 of FIG. 38.

If, on the other hand, it is determined in STEP150 that the clocking time tm_shift on the timer has exceeded the gear position change completion time TM_SCHG and the gear position change step has been completed, then the controller 1 proceeds to STEP160 wherein the controller 1 determines whether the clocking time tm_shift on the timer has exceeded a clutch ON completion time TM_CLON.

In STEP160, if it is determined that the clocking time tm_shift on the timer has not exceeded the clutch ON completion time TM_CLON and the clutch ON step is being implemented, then the controller 1 performs the processing in the aforesaid STEP161, and then proceeds to STEP133 of FIG. 38.

If, on the other hand, it is determined in STEP160 that the clocking time tm_shift on the timer has exceeded the clutch ON completion time TM_CLON (TM_CLON<tm_shift) and the clutch ON step has been completed, then the controller 1 proceeds to STEP170 wherein the controller 1 sets the current gear selection position NGEAR to the gear selection target value NGEAR_cmd. The controller 1 then proceeds to STEP161 to carry out the processing described above, and proceeds to STEP133 of FIG. 38.

Processing of STEP133 through STEP137 and STEP180 shown in FIG. 38 is carried out by the sliding mode controller 113 of the shift controller 110. In STEP133, the sliding mode controller 113 uses the filtering target value Psc_cmd_f(k) calculated by the target value filter 121 according to the above equation (81) to calculate E_sc(k) according to the above equation (83) and also calculate σ_sc(k) according to the above equation (84).

If it is found in the subsequent STEP134 that a shift-to-mode-3 flag F_Mode2to3, which is set when moving from Mode2 to Mode3, has been set (F_Mode2to3=1), then the controller 1 proceeds to STEP135 to reset the switching function integral value SUM_σsc(k) calculated according to the above equation (85)(SUM_σsc=0). On the other hand, if it is found in STEP134 that the shift-to-mode-3 flag F_Mode2to3 has been reset (F_Mode2to3=0), then the controller 1 proceeds to STEP180 to update the switching function integral value SUM_σsc(k) according to the above equation (85), and then proceeds to STEP136.

The sliding mode controller 113 calculates the equivalent control input Ueq_sc(k), the reaching law input Urch_sc(k), and the adaptation law input Uadp_sc(k) in STEP136 according to the above equations (86) to (88), and further calculates the control input Vsc(k) of voltage applied to the shift motor 67 according to the above equation (89) in STEP137 so as to control the shift motor 67.

In the subsequent STEP138 through STEP140, processing is carried out by the sliding mode controller 115 of the selection controller 111 and a partial parameter identifier 117. In STEP138, the sliding mode controller 115 calculates E_sl(k) according to the above equation (104) using the filtering target value Psl_cmd_f(k) calculated by the target value filter 131 according to the above equation (103), and further calculates σ_sl(k) according to the above equation (105).

In the subsequent STEP139, the partial parameter identifier 117 carries out identification processing according to the above equations (98) through (102) to calculate model parameters b1_sl(k), b2_sl(k), and c1_sl(k). The sliding mode controller 115 calculates the reaching law input Urch_sl(k) according to the above equation (106), and further calculates the equivalent control input Ueq_sl(k) according to the above equation (107). The sliding mode controller 115 then calculates a control input command value Vsl(k) of a voltage applied to the selection motor 66 according to the above equation (108) in STEP140, and proceeds to the next STEP141 wherein the controller 1 terminates the speed changing operation.

FIG. 39 shows a flowchart of the shifting/selecting operation in STEP151 of FIG. 37. In STEP190, if it is determined that the gear disengagement completion flag F_SCN, which is set upon completion of the gear disengagement processing in the transmission 80, has been reset (F_SCN=0) and the gear disengagement is in process, then the controller 1 proceeds to STEP191.

Processing in STEP191 and STEP192 is carried out by the target position calculator 112 shown in FIG. 22. The target position calculator 112 holds the target position Psl_cmd of the shift arm 65 in the selecting direction at a current position in STEP191, and sets the target position Psc_cmd of the shift arm 65 in the shifting direction to zero indicating the neutral position in STEP192. Processing in STEP193 is carried out by the VPOLE_sc calculator 114 and the VPOLE_sl calculator 116 shown in FIG. 22. The VPOLE_sl calculator 116 sets VPOLE_sl to VPOLE_sl_l (−0.95), and the VPOLE_sc calculator 114 sets VPOLE_sc to VPOLE_sc l1 (=−0.8).

With this arrangement, the level of disturbance restraining capability of the selection controller 111 is lowered, while the range of tolerance of shift for the shift arm 65 in the shifting direction is expanded. Thus, the shift arm 65 can be smoothly moved in the shifting direction, minimizing the influences of interference between the shift arm 65 and a shift piece 71.

In the subsequent STEP194, if the position (in an absolute value) of the shift arm 65 in the shifting direction is below a preset neutral determination value Psc_N (e.g., 0.15 mm), then it is determined that the gear disengagement processing is finished, and the controller 1 proceeds to STEP195 to set the gear disengagement completion flag F_SCN (F_SCN=1) before it proceeds to STEP196 wherein it terminates the shifting/selecting operation.

Meanwhile, if it is determined in STEP190 that the gear disengagement completion flag F_SCN (F_SCN=1) has been set, indicating the end of the gear disengagement processing, then the controller 1 proceeds to STEP200. Processing steps in STEP200 through STEP203 and STEP210 are implemented by the target position calculator 112. The target position calculator 112 determines in STEP200 whether a selection completion flag F_SLF has been set.

If it is determined that the selection completion flag F_SLF has been reset (F_SLF=0), meaning that the selecting operation is in process, then the target position calculator 112 proceeds to STEP201 to search a NGEAR_cmd/Psl_cmd_table map shown in FIG. 39 to acquire a set value Psl_cmd_table of each gear in the selecting direction that corresponds to NGEAR_cmd.

In the next STEP202, the target position calculator 112 sets the set value Psl_cmd_table acquired by the map search to a target value Psl_cmd of the shift arm 65 in the selecting direction.

In the subsequent STEP203, the target position calculator 112 holds the target value Psc_cmd of the shift arm 65 in the shifting direction to a current value, and sets Psc_cmd_tmp specifying an increase width of a target value in the shifting direction to zero. In the next STEP204, processing is carried out by a VPOLE_sc calculator 114 and the VPOLE_sl calculator 116. The VPOLE_sl calculator 116 sets VPOLE_sl to VPOLE_sl_h (=−0.7), and the VPOLE_sc calculator 114 sets VPOLE_sc to VPOLE_sc4 (=−0.9).

Thus, the disturbance restraining capability of the shift controller 110 is lowered, and the shift arm 65 easily shifts in the shifting direction during the selecting operation, allowing the selecting operation to be smoothly accomplished even if the shift arm 65 and a shift piece 71 interfere with each other, as described above with reference to FIG. 36B.

If an absolute value of a difference between the current position and a target position of the shift arm 65 in the selecting direction |Psl_Psl_cmd| reduces below a selection completion determination value E_Pslf (e.g., 0.15 mm) in STEP205, and if a moving speed ΔPsl of the shift arm 65 in the selecting direction reduces below a selection speed convergence determination value D_Pslf (e.g., 0.1 mm/step) in STEP206, then the controller 1 determines that the selecting operation is completed and proceeds to STEP207. The controller 1 then sets the selection completion flag F_SLF (F_SLF=1) and proceeds to STEP196 wherein it terminates the shifting/selecting operation.

Meanwhile, if it is determined in STEP200 that the selection completion flag F_SLF has been set, indicating the end of the selecting operation, then the controller 1 proceeds to STEP210. The processing steps in STEP210 through STEP211 are implemented by the target position calculator 112. The target position calculator 112 holds the target position Psl_cmd of the shift arm 65 in the shifting direction at a current value in STEP210, and then calculates a rotational synchronization target value, which will be discussed hereinafter, in STEP211.

Processing in the next STEP212 is carried out by the VPOLE_sl calculator 116. The VPOLE_sl calculator 116 sets VPOLE_sl to VPOLE_sl_l (=−0.95). Thus, the disturbance restraining capability of the selection controller 111 is lowered, and the shifting operation of the shift arm 65 can be smoothly accomplished even if the shift arm 65 and a shift piece 71 interfere with each other, as described above with reference to FIG. 34. The controller 1 then proceeds from STEP212 to STEP196 wherein it terminates the shifting/selecting operation.

FIG. 40 is a flowchart of calculating a rotational synchronization target value in STEP211 of FIG. 39. The calculation of the rotational synchronization target value is carried out mainly by the target position calculator 112.

In STEP220, the target position calculator 112 searches an NGEAR_cmd/Psc_def,_scf,_end,_table map shown in FIG. 40 to acquire a standby position Psc_def of a synchronizer ring in each of synchronizers 60a to 69c and each of the reverse gear trains 83, 85, and 86 that corresponds to gear selection target value NGEAR_cmd, a position Psc_scf where the rotational synchronization between the coupling sleeve and synchronized gears (the 1st forward gear 64a on the output side, the 2nd forward gear 64b on the output side, the 3rd forward gear 63c on the input side, the 4th forward gear 63d on the input side, the 5th forward gear 63e on the input side, the 6th forward gear 63f on the input side, the 2nd reverse gear 83, and the 3rd reverse gear 86) through the intermediary of the synchronizer rings begins, a position Psc_sc where the rotational synchronization ends, and a position Psc_end where the shifting operation ends.

In the subsequent STEP221, the target position calculator 112 acquires a displacement speed D_Psc_cmd_table of the shifting operation based on the gear selection target value NGEAR_cmd. Shift shocks at low gear and the occurrence of noises of contact between a synchronizer ring and the coupling sleeve are restrained by changing the displacement speed D_Psc_cmd_table according to a selected speed.

In the next STEP222, the target position calculator 112 sets Psc_def_table, Psc_scf_table, Psc_sc_table, Psc_end_table, and D_Psc_cmd_table acquired by the aforesaid map search to corresponding target values Psc_def, Psc_scf, Psc_sc, Psc_end, and D_Psc_cmd, respectively. In the following STEP223, a halfway target position Psc_cmd_tmp of the shift arm 65 in the shifting operation is set.

After STEP224 of FIG. 41, processing of Mode1 through Mode4 described above is carried out. If it is determined in STEP224 that the position Psc of the shift arm 65 in the shifting direction has not exceeded Psc_scf and the rotational synchronization of the coupling sleeve and a synchronizer ring is not completed, then the controller 1 proceeds to STEP225.

In STEP225, the controller 1 sets a Mode 1·2 flag F_mode12 indicating that the processing of Mode1 or Mode2 is being implemented (F_mode12=1). In the next STEP226, if it is determined that the position Psc of the shift arm 65 in the shifting direction has not exceeded Psc_def, that is, if the shift arm 65 has not exceeded a standby position of a synchronizer ring, then the controller 1 proceeds to STEP227.

In STEP227, the processing of Mode1 is implemented. The VPOLE_sc calculator 114 of the shift controller 110 sets VPOLE_sc to VPOLE_sc_11 (=−0.8). This increases the level of disturbance restraining capability of the shift controller 110, leading to improved capability of following the target position Psc_cmd.

If it is determined in STEP226 that the position Psc of the shift arm 65 in the shifting direction has exceeded Psc_def and the shift arm 65 has reached the standby position of the synchronizer ring, then the controller 1 proceeds to STEP260 wherein it determines whether a change amount ΔPsc of the position of the shift arm 65 in the shifting direction has exceeded a determination value ΔPsc_sc of contact between the coupling sleeve and the synchronizer ring.

If it is determined that ΔPsc is still below ΔPsc_sc, indicating that the coupling sleeve and the synchronizer ring are not yet in contact, then the controller 1 proceeds to STEP261. If ΔPsc has exceeded ΔPsc_sc, indicating that the coupling sleeve and the synchronizer ring are in contact, then the controller 1 proceeds to STEP270.

In STEP261, processing of Mode1 is carried out. The VPOLE_sc calculator 114 sets VPOLE_sc to VPOLE_sc12 (=−0.98). This lowers the level of disturbance restraining capability of the shift controller 110, making it possible to reduce an impact when the coupling sleeve and the synchronizer ring comes into contact.

In STEP270, processing of Mode2 is carried out. The VPOLE_sc calculator 114 sets VPOLE_sc to VPOLE_sc2 (=−0.85). This increases the level of disturbance restraining capability of the shift controller 110, making it possible to apply an appropriate pressing force to the synchronizer ring so as to synchronize the rotational speed of the coupling sleeve and a synchronized gear.

In STEP271, the target position calculator 112 sets Psc_sc to the target position Psc_cmd of the shift arm 65 in the shifting direction, and proceeds to STEP230 wherein the processing for calculation of rotational synchronization target value is terminated.

Meanwhile, if it is determined in STEP224 that the position Psc of the shift arm 65 in the shifting direction has exceeded Psc_scf, that is, if the synchronization of the rotational speeds of the coupling sleeve and the synchronized gear is completed, then the controller 1 proceeds to STEP240. The controller 1 determines in STEP240 whether the Mode 1·2 flag F_mode12 has been set.

If it is determined in STEP240 that the Mode 1·2 flag F_mode12 has been set (F_mode12=1), that is, if the Mode1 or Mode2 is being implemented, then the controller 1 proceeds to STEP250 wherein it sets the shift-to-mode3 flag F_mode2to3 (F_mode2to3=1) and resets the Mode 1·2 flag F_mode 1·2 (F_mode1·2=0). The controller 1 then proceeds to STEP242. If it is determined in STEP240 that the Mode 1·2 flag has been reset (F_mode12=0), that is, if Mode2 has already been finished, then the controller 1 proceeds to STEP241 wherein it resets the shift-to-mode3 flag F_mode2to3 (F_mode2to3=0) before proceeding to STEP242.

In STEP242, the VPOLE_sc calculator 114 of the shift controller 110 sets VPOLE_sc to VPOLE_sc3 (=−0.7). In the next STEP243, the target position calculator 112 sets the target value Psc_cmd of the shift arm 65 in the shifting direction to Psc_end. This increases the level of disturbance restraining capability of the shift controller 110 to prevent the shift arm 65 from overrunning a shift completion position Psc_end. The controller 1 then proceeds from STEP243 to STEP230 wherein it ends the processing of the calculation of a rotational synchronization target value.

In the second embodiment, b1_sl, b2_sl, and c1_sl out of the model parameters a1_sl, a2_sl, b1_sl, b2_sl, and c1_sl in the above equation (92) have been taken as the identification model parameters, and a1_sl and a2_sl have been taken as non-identification model parameters. However, the selection of the identification model parameters is not limited to the above; alternatively, other identification model parameters closely connected to changes in dynamic characteristics of a selector may be selected according to the specifications of transmissions.

Furthermore, the shift controller 110 and the selection controller 111 in the second embodiment have adopted the sliding mode control as the response specifying control in accordance with the present invention. Alternatively, however, a different type of response specifying control, such as back stepping control, may be adopted.

What is claimed is:

1. A plant control system for determining a control input value for a plant such that an output value of the plant coincides with a target output value, comprising:

filtering means for carrying out a predetermined filtering computation on the target output value to calculate a filtering target value that converges to the target output value with a response delay; and control input determining means that uses response specifying control that allows a convergent behavior for a difference between the filtering target value and the output value of the plant to be variably specified so as to calculate a reaching law input based on a switching function value that defines the convergent behavior for the difference, thereby determining a control input to the plant on the basis of the reaching law input.

2. The plant control system according to claim 1, wherein the control input determining means calculates an equivalent control input in the response specifying control on the basis of the filtering target value and the output value of the plant, and determines a control input value for the plant on the basis of the equivalent control input.

3. The plant control system according to claim 1, wherein the control input determining means calculates an adaptation law input in the response specifying control based on the switching function value and determines a control input value for the plant on the basis of the adaptation law input.

4. The plant control system according to claim 1, wherein a convergent speed for the difference between the filtering target value and the output value of the plant that is defined by the switching function is set to be higher than a speed at which the filtering target value specified in the filtering computation converges to the target output value.

5. The plant control system according to claim 1, comprising identifying means for identifying a model parameter for setting a model equation of the plant on the basis of the control input value for the plant and the output value of the plant, wherein
the control input determining means determines the control input value for the plant by using the model parameter identified by the identifying means.

6. The plant control system according to claim 5, comprising storing means that stores data of a correlation map showing a correlation between output values of the plant and reference values of the model parameter that changes according to the output values, wherein
the identifying means modifies the reference values determined by applying output values of the plant to the correlation map on the basis of the control input values for the plant and output values of the plant so as to identify the model parameters.

7. The plant control system according to claim 5, wherein
the model equation of the plant is set using a plurality of the model parameters, and some of a plurality of the model parameters are used as identifying model parameters for identification, and
the identifying means identifies the identifying model parameter so as to minimize a difference between an output of a virtual plant that outputs an equation comprised of a component term other than a component term related to the identifying model parameter of the model equation and an output of a model equation of the virtual plant comprised of a component term related to the identifying parameter of the model equation.

8. The plant control system according to claim 2, comprising estimating means for estimating a level of disturbance applied to the plant, wherein
the control input determining means uses the level of disturbance estimated by the estimating means to calculate the equivalent control input.

9. The plant control system according to any one of claims 1 to 8, wherein
the plant comprises a transmission having a plurality of speed stages,
a shift arm provided on the transmission establishes each predetermined speed stage by being displaced from a neutral position by a shifting operation,
the output of the plant comprises a position of the shift arm, and
the control input to the plant comprises a control input for an actuator that moves the shift arm.

10. A plant control system according to claim 7, wherein
the plant comprises a selecting mechanism of a transmission having a plurality of speed stages,
a shift arm provided on the transmission selectively engages, by a selecting operation, with a shift piece fixed to each shift fork for the plurality of speed stages,
a shift fork corresponding to the selectively engaged shift piece is displaced by the shifting operation from the neutral position to establish each predetermined speed stage,
the output of the plant comprises a position of the shift arm in the selecting direction, and
the control input for the plant comprises a control input for a selecting actuator for moving the shift arm in the selecting direction.

11. The plant control system according to claim 10, wherein
the model equation of the plant expresses a position of the shift arm in the selecting direction at each predetermined control cycle by a positional component term related to a selecting direction of the shift arm in a previous control cycle, a control input component term related to a control input for the selecting actuator in the previous control cycle, and a disturbance component term,
a plurality of the model parameters comprise coefficients of the position component term and the control input component term and the disturbance component term, and
a coefficient of the control input component term and the disturbance component term are taken as the identifying model parameters.

12. A plant control system for determining a control input value for a plant such that an output value of the plant coincides with a target output value, comprising:
filtering means for carrying out predetermined filtering computation on the target output value to calculate a filtering target value that converges to the target output value with a response delay;
output predicting means for calculating an output predicted value that predicts an output value of the plant after a dead time of the plant elapses on the basis of an output value of the plant and the control input value; and
control input determining means that uses response specifying control that allows a convergent behavior for a difference between the filtering target value and the output predicted value to be variably specified so as to calculate a reaching law input based on a switching function value that defines the convergent behavior for the difference, thereby determining a control input value for the plant on the basis of the reaching law input.

13. The plant control system according to claim 12, wherein the control input determining means calculates an equivalent control input in the response specifying control on the basis of the filtering target value and the output predicted value, and determines the control input value for the plant on the basis of the equivalent control input.

14. The plant control system according to claim 12, wherein the control input determining means calculates an adaptation law input in the response specifying control based on the switching function value and determines a control input value for the plant on the basis of the adaptation law input.

15. The plant control system according to claim 12, wherein a convergent speed for the difference between the filtering target value and the output predicted value that is specified by the switching function is set to be higher than a speed at which the filtering target value specified in the filtering computation converges to the target output value.

16. The plant control system according to claim 12, comprising:
identifying means for identifying a model parameter for setting a model equation of the plant on the basis of the control input value for the plant and the output value of the plant, wherein
the control input determining means determines a control input value for the plant by using the model parameter identified by the identifying means.

17. The plant control system according to claim 16, comprising storing means that stores data of a correlation map showing a correlation between the output values of the plant and the reference values of the model parameter that change according to the output values, wherein the identifying means modifies the reference values determined by applying the output values of the plant to the correlation map on the basis of the control input values for the plant and output values of the plant so as to identify the model parameters.

18. The plant control system according to claim 13, comprising:

estimating means for estimating a level of disturbance applied to the plant, wherein the control input determining means uses the level of disturbance estimated by the estimating means to calculate the equivalent control input.

19. The plant control system according to any one of claims 1 to 8 and claims 12 to 18, wherein the plant comprises a transmitting mechanism for transmitting motive power from a drive shaft to a driven shaft through the intermediary of a clutch, and comprises an actuator for actuating at least one of a clutch disc of a drive shaft and a clutch disc of a driven shaft so as to change a distance between the clutch disc of the drive shaft and the clutch disc of the driven shaft, and the output of the plant comprises a rotational speed of the driven shaft and a control input for the plant comprises the distance between the clutch disc of a drive shaft and a clutch disc of the driven shaft.

20. A plant control system according to any one of claims 1 to 8 and claims 12 to 18, wherein the plant comprises an internal combustion engine comprising intake air volume adjusting means for adjusting an intake air volume, and the output of the plant comprises a rotational speed of the internal combustion engine, and the control input for the plant comprises a manipulated variable for the intake air volume adjusting means.

* * * * *